(12) United States Patent
Higuchi et al.

(10) Patent No.: US 11,873,753 B2
(45) Date of Patent: Jan. 16, 2024

(54) VALVE DEVICE AND FLUID CIRCULATION CIRCUIT

(71) Applicant: DENSO CORPORATION, Kariya (JP)

(72) Inventors: Akira Higuchi, Kariya (JP); Takehito Mizunuma, Kariya (JP); Ryou Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 17/686,786

(22) Filed: Mar. 4, 2022

(65) Prior Publication Data

US 2022/0186657 A1 Jun. 16, 2022

Related U.S. Application Data

(63) Continuation of application No. PCT/JP2020/030380, filed on Aug. 7, 2020.

(30) Foreign Application Priority Data

Sep. 10, 2019 (JP) .................................. 2019-164850

(51) Int. Cl.
*F16K 11/074* (2006.01)
*F01P 7/16* (2006.01)
(Continued)

(52) U.S. Cl.
CPC .................. *F01P 7/16* (2013.01); *F16K 3/08* (2013.01); *F16K 11/074* (2013.01); *F25B 41/42* (2021.01);
(Continued)

(58) Field of Classification Search
CPC .. F01P 7/16; F16K 3/08; F16K 11/074; F16K 11/0743; F16K 27/045; F25B 41/42; B60H 1/00485; Y10T 137/86533
See application file for complete search history.

(56) References Cited

U.S. PATENT DOCUMENTS 5,044,605 A * 9/1991 Korfgen .................... F16K 3/08
251/304
5,316,042 A * 5/1994 Lim ......................... F16K 3/08
137/625.11
(Continued)

FOREIGN PATENT DOCUMENTS

EP 3037698 12/2015
JP 48-39285 11/1973
(Continued)

*Primary Examiner* — Matthew W Jellett
*Assistant Examiner* — Christopher D Ballman
(74) *Attorney, Agent, or Firm* — Nixon & Vanderhye P.C.

(57) ABSTRACT

A valve device includes a housing integrally or separately having a flow path formation part where at least one flow path hole through which a fluid passes is formed. The valve device includes: a drive part that outputs a rotational force; and a rotation part that rotates about a predetermined axis by the rotational force output from the drive part. The rotation part includes a shaft and a rotor increasing or decreasing an opening degree of the flow path hole with rotation of the shaft. The rotor has a sliding surface that slides while facing an opening surface of the flow path formation part where the flow path hole is opened. At least a part of the rotation part is rotatably held by the housing.

15 Claims, 29 Drawing Sheets

(51) Int. Cl.
    *F25B 41/42*        (2021.01)
    *F16K 3/08*         (2006.01)
    *F16K 27/04*        (2006.01)

(52) U.S. Cl.
    CPC ......... *F16K 11/0743* (2013.01); *F16K 27/045* (2013.01); *F16K 27/047* (2013.01); *Y10T 137/86533* (2015.04)

(56) References Cited

U.S. PATENT DOCUMENTS

| | | | | |
|---|---|---|---|---|
| 5,950,576 A * | 9/1999 | Busato | ............ | F01P 7/16 137/625.46 |
| 6,032,869 A | 3/2000 | Ito et al. | | |
| 8,074,678 B2 * | 12/2011 | Kee | ............ | F16K 3/08 251/208 |
| 9,638,340 B2 * | 5/2017 | Bachofer | ............ | F16K 11/0743 |
| 9,803,759 B2 * | 10/2017 | Bachofer | ............ | E04F 13/148 |
| 9,803,760 B2 * | 10/2017 | Morein | ............ | F16K 11/0853 |
| 9,874,284 B2 * | 1/2018 | Bachofer | ............ | F16K 11/0746 |
| 10,391,839 B2 * | 8/2019 | Kawakubo | ............ | F25B 29/003 |
| 10,687,658 B2 * | 6/2020 | Fischer | ............ | A47J 31/4489 |
| 10,753,075 B2 * | 8/2020 | Funari | ............ | F16K 31/041 |
| 10,914,390 B2 * | 2/2021 | Chapman | ............ | F16K 11/0853 |
| 11,054,043 B2 * | 7/2021 | Chapman | ............ | F16K 5/184 |
| 11,112,015 B2 * | 9/2021 | Chapman | ............ | F16K 5/188 |
| 11,181,203 B1 * | 11/2021 | Wang | ............ | F16K 11/0445 |
| 11,221,077 B2 * | 1/2022 | Park | ............ | F16K 17/048 |
| 11,572,957 B2 * | 2/2023 | Chapman | ............ | F16K 27/06 |
| 11,585,451 B2 * | 2/2023 | Chapman | ............ | F16K 11/0743 |
| 2015/0122359 A1 | 5/2015 | Tsuchiya et al. | | |
| 2015/0233483 A1 | 8/2015 | Bachofer | | |
| 2016/0167481 A1 | 6/2016 | Makihara et al. | | |
| 2019/0301619 A1 | 10/2019 | Wu et al. | | |

FOREIGN PATENT DOCUMENTS

| | | |
|---|---|---|
| JP | 2016-125574 | 7/2016 |
| JP | 2020-200902 | 12/2020 |
| WO | 2020/213635 | 10/2020 |

\* cited by examiner

EQUIPMENT COOLING MODE

OUTSIDE AIR COOLING MODE

OUTSIDE AIR HEAT-ABSORPTION MODE

VALVE DEVICE AND FLUID CIRCULATION CIRCUIT

CROSS REFERENCE TO RELATED APPLICATION

The present application is a continuation application of International Patent Application No. PCT/JP2020/030380 filed on Aug. 7, 2020, which designated the U.S. and claims the benefit of priority from Japanese Patent Application No. 2019-164850 filed on Sep. 10, 2019. The entire disclosures of all of the above applications are incorporated herein by reference.

TECHNICAL FIELD

The present disclosure relates to a valve device and a fluid circulation circuit having the valve device.

BACKGROUND ART

A valve device regulates an opening degree of a flow path hole formed in a fixed disc inside a housing.

SUMMARY

According to an aspect of the present disclosure, a valve device includes: a housing integrally or separately having a flow path formation part where at least one flow path hole through which a fluid passes is formed; a drive part that outputs a rotational force; and a rotation part that rotates about a predetermined axis by the rotational force output from the drive part. The rotation part includes: a shaft; and a rotor that increases or decreases an opening degree of the flow path hole with rotation of the shaft. At least a part of the rotation part is rotatably held by the housing.

DESCRIPTION OF EMBODIMENTS

Figure 1:
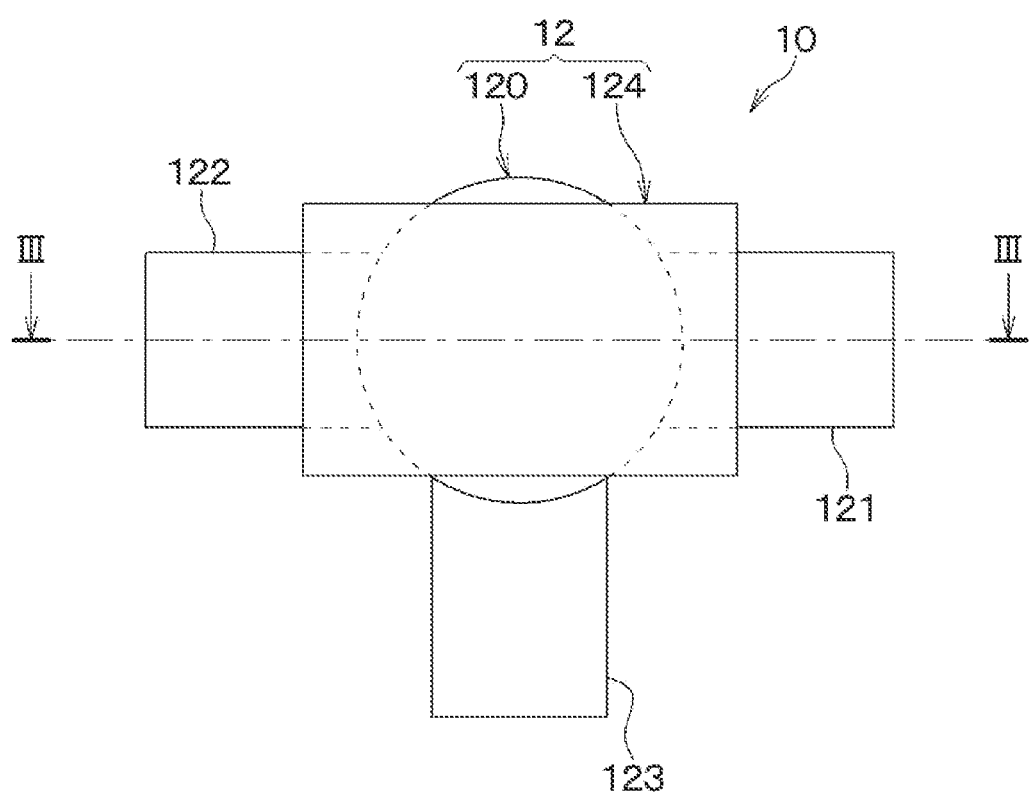
FIG. 1 is a schematic plan view of a valve device according to a first embodiment.

To begin with, examples of relevant techniques will be described.

Conventionally, there is known a valve device that regulates an opening degree of a flow path hole formed in a fixed disc disposed inside a housing by a valve disc coupled to one end of a shaft via an intermediate element. In the valve device, the end of the shaft is held by the fixed disc.

Meanwhile, in a configuration where the end of the shaft is held by the fixed disc, when the position of the fixed disc deviates inside the housing, the position of the end of the shaft is deviates following the deviation, and the shaft is inclined, which makes the posture of a rotor unstable. A configuration in which the posture of the rotor is unstable is not preferred since causing a deterioration in accuracy of flow rate control and unintended fluid leakage. This was found through intensive studies by the present inventors. The present disclosure provides a valve device and a fluid circulation circuit capable of restricting a change in the posture of a rotation part.

According to an aspect of the present disclosure, a valve device includes:
- a housing integrally or separately having a flow path formation part where at least one flow path hole through which a fluid passes is formed;
- a drive part that outputs a rotational force; and
- a rotation part that rotates about a predetermined axis by the rotational force output from the drive part.

The rotation part includes:
- a shaft; and
- a rotor having a sliding surface that slides while facing an opening surface of the flow path formation part where the flow path hole is opened, the rotor increasing or decreasing an opening degree of the flow path hole with rotation of the shaft.

At least a part of the rotation part is rotatably held by the housing.

According to another aspect of the present disclosure, a valve device includes:
- a housing integrally or separately having a flow path formation part where at least one flow path hole through which a fluid passes is formed;
- a drive part that outputs a rotational force; and
- a rotation part that rotates about a predetermined axis by the rotational force output from the drive part.

The rotation part includes:
- a shaft; and
- a rotor that increases or decreases an opening degree of the flow path hole with rotation of the shaft.

At least a part of the rotation part is rotatably held by the housing.

According to another aspect of the present disclosure, a fluid circulation circuit includes:
- a plurality of devices in which a fluid passes; and
- a valve device that regulates a flow rate of the fluid passing in the plurality of devices.

The valve device includes:
- a housing integrally or separately having a flow path formation part where at least one flow path hole in which the fluid passes is formed;
- a drive part that outputs a rotational force; and
- a rotation part that rotates about a predetermined axis by the rotational force output from the drive part.

The rotation part includes:
- a shaft; and
- a rotor having a sliding surface that slides while facing an opening surface of the flow path formation part where the flow path hole is opened, the rotor increasing or decreasing an opening degree of the flow path hole with rotation of the shaft.

At least a part of the rotation part is rotatably held by the housing.

As described above, when at least a part of the rotation part is rotatably held by the housing, the positional deviation of the end of the shaft inside the housing is less likely to occur as compared to a case where the rotation part is held by a member attached to the housing. Therefore, according to the valve device and the fluid circulation circuit of the present disclosure, a change in the posture of the shaft due to the positional deviation of the shaft is restricted, so that the posture of the rotation part can be stabilized.

A reference numeral attached to each constituent element or the like shows an example of the correspondence between the constituent element or the like and a specific constituent element or the like described in an embodiment to be described later.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

The present embodiment will be described with reference to FIGS. 1 to 6. In the present embodiment, an example will be described where a valve device 10 of the present disclosure is applied to a control valve for a vehicle. Although not illustrated, the valve device 10 illustrated in FIG. 1 is applied to a fluid circulation circuit that circulates a fluid (in the present example, cooling water) to a power source for travelling, a radiator, and the like, and the fluid circulating in the fluid circulation circuit flows.

The valve device 10 can increase or decrease the flow rate of the fluid in the flow path via the valve device 10 in the fluid circulation circuit and can also block the flow of the fluid in the flow path. As the fluid, for example, LLC containing ethylene glycol is used. LLC is an abbreviation for long life coolant.

Figure 2:
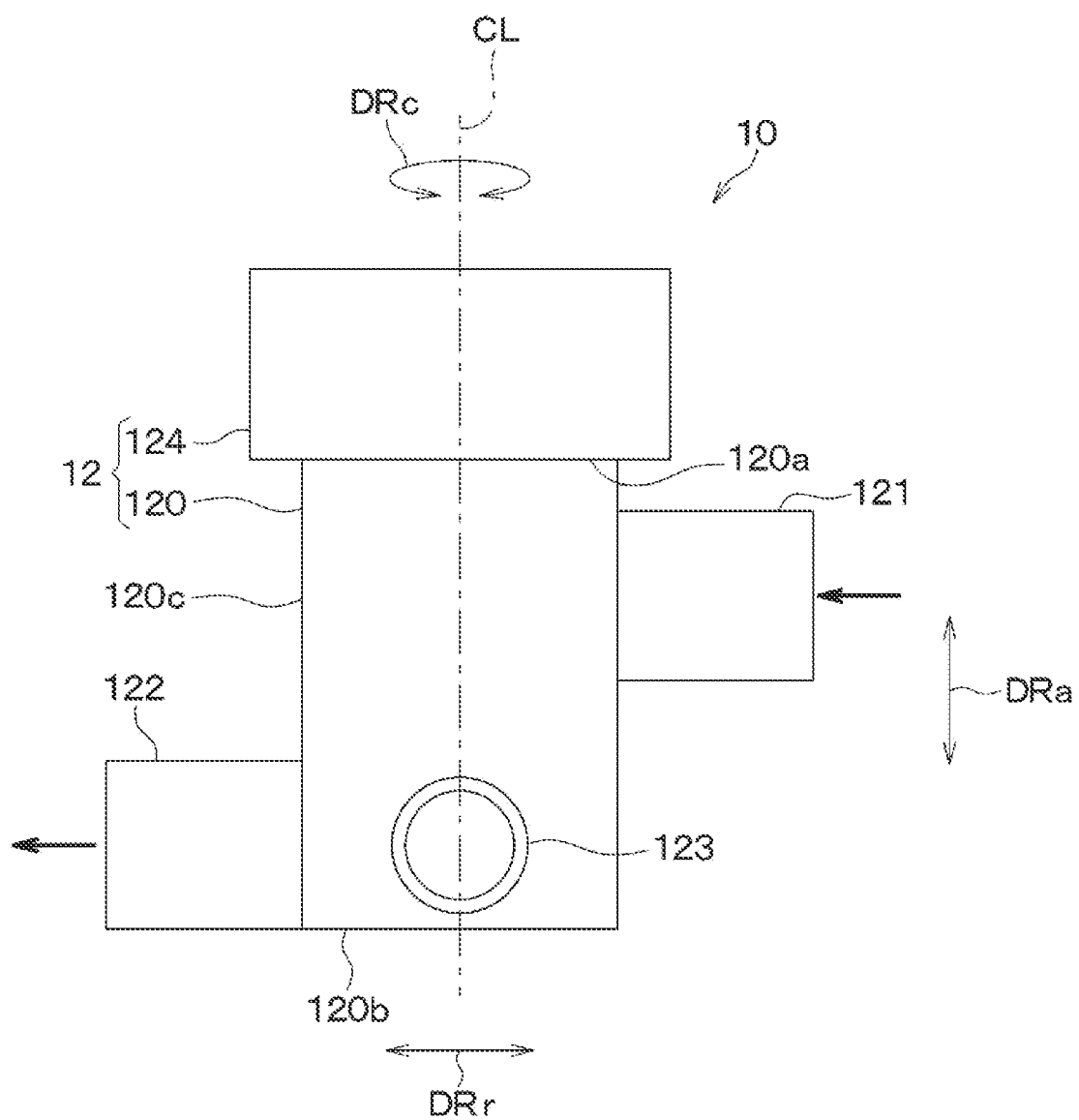
FIG. 2 is a schematic front view of the valve device according to the first embodiment.

As illustrated in FIGS. 1 and 2, the valve device 10 has a housing 12 forming an outer shell. The valve device 10 is formed of a three-way valve where an inlet 121 into which a fluid flows, a first outlet 122 from which the fluid is allowed to flow out, and a second outlet 123 from which the fluid is allowed to flow out are provided in the housing 12. The valve device 10 not only functions as a flow path switching valve but also functions as a flow rate regulating valve that regulates a flow rate ratio between the fluid flowing from the inlet 121 to the first outlet 122 and the fluid flowing from the inlet 121 to the second outlet 123.

The valve device 10 is configured as a disc valve that performs a valve switching operation by a disc-shaped valve body rotating around an axis CL of a shaft 20 to be described later. In the present embodiment, various configurations and the like will be described with a direction along the axis CL of the shaft 20 to be described later as an axial direction DRa and with a direction orthogonal to the axial direction DRa and radially extending from the axial direction DRa as a radial direction DRr. In the present embodiment, various configurations and the like will be described with a direction around the axis CL as a circumferential direction DRc.

Figure 3:
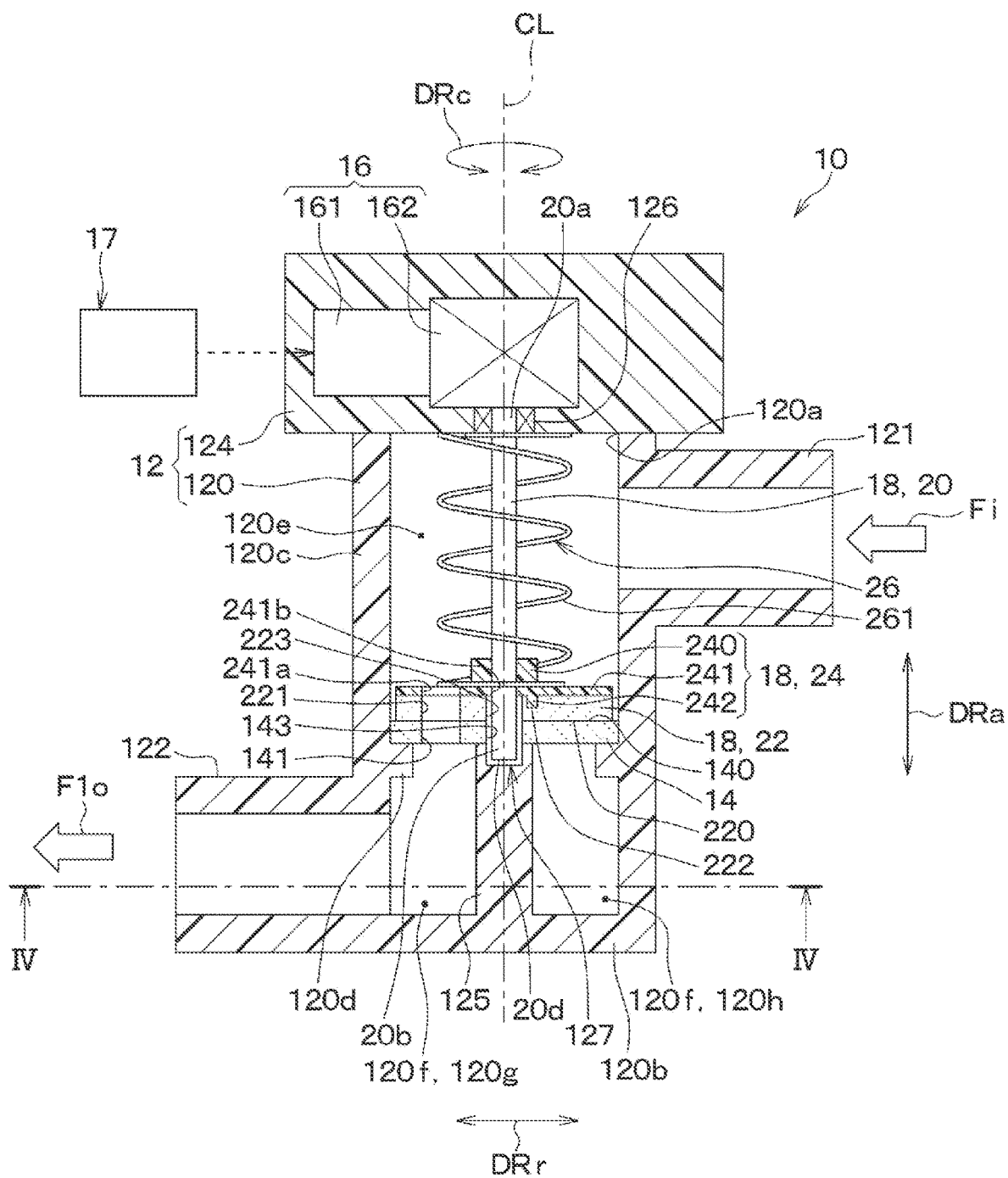
FIG. 3 is a schematic cross-sectional view taken along a line III-III in FIG. 1.

As illustrated in FIG. 3, in the valve device 10, a stator 14, a drive part 16, a rotation part 18, an energization member 26, and the like are housed inside the housing 12.

The housing 12 is a non-rotating member that does not rotate. The housing 12 is formed of, for example, a resin material or the like. The housing 12 includes a bottomed cylindrical body 120 extending along the axial direction DRa and a body cover 124 that closes an opening 120a of the body 120.

The body 120 has a bottom wall 120b forming a bottom surface and a side wall 120c surrounding the axis CL. The side wall 120c has an inlet 121 at a position closer to the opening 120a than the bottom wall 120b, and a first outlet 122 and a second outlet 123 are formed at positions closer to the bottom wall 120b than the opening 120a.

An annular protrusion 120d protruding so as to approach the axis CL is formed inside the side wall 120c. The protrusion 120d is provided to dispose the stator 14 inside the body 120. Although not illustrated, the protrusion 120d is provided with a detent pin, and the pin restricts the movement of the stator 14 in the circumferential direction DRc. The detent of the stator 14 may be achieved by means except for the detent pin.

The inside of the body 120 is partitioned into an inlet-side space 120e and an outlet-side space 120f by the stator 14. The inlet-side space 120e is a space communicating with the inlet 121 inside the housing 12. The outlet-side space 120f is a space communicating with the first outlet 122 and the second outlet 123 inside the housing 12.

A plate-shaped partition 125 that partitions the outlet-side space 120f into a first-outlet-side space 120g and a second-outlet-side space 120h is set inside the body 120. The partition 125 is provided so as to cross the outlet-side space 120f along the radial direction DRr.

The stator 14 is formed of a disc-shaped member, and a thickness direction of the stator 14 is along the axial direction DRa. The stator 14 has an opening surface 140 as a surface on which a rotor 22 to be described later slides. The opening surface 140 is a sealing surface corresponding to a sliding surface 220 of the rotor 22 to be described later.

The stator 14 is desirably formed of a material having a small linear expansion coefficient and excellent wear resistance as compared to the constituent material of the housing 12. The stator 14 is made of a high hardness material having higher hardness than the housing 12. Specifically, the stator 14 is made of ceramic. In the stator 14, only a portion forming the opening surface 140 may be formed of a material such as ceramic, having a small linear expansion coefficient and excellent wear resistance as compared to the constituent material of the housing 12.

The stator 14 constitutes a flow path formation part formed with a flow path hole through which a fluid passes. Thus, in the valve device 10 of the present embodiment, the stator 14 which is the flow path formation part is configured as a member separate from the housing 12.

Figure 4:
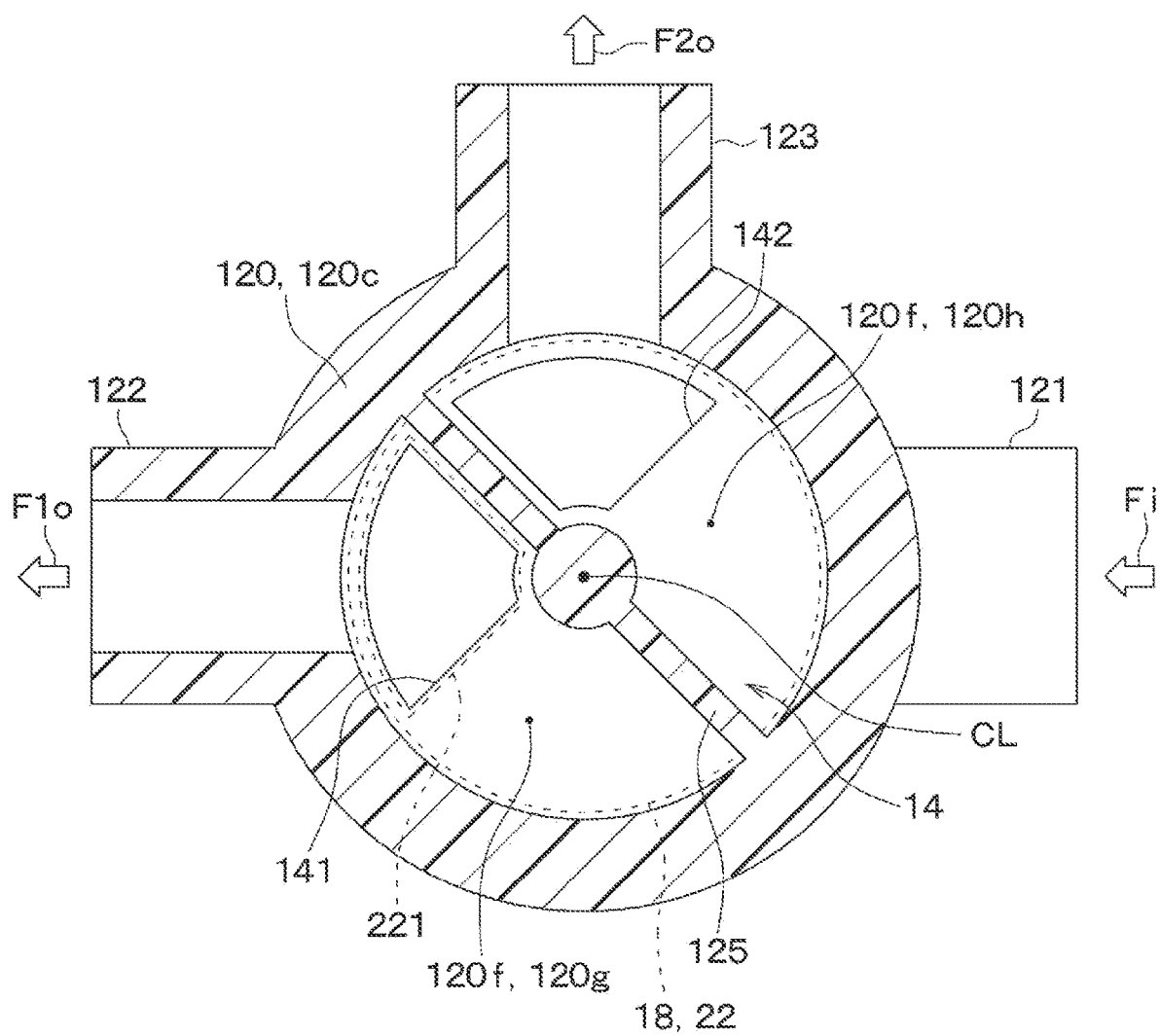
FIG. 4 is a schematic cross-sectional view taken along a line IV-IV in FIG. 3.

As illustrated in FIG. 4, in the stator 14, a first flow path hole 141 and a second flow path hole 142 through which the fluid passes are formed. The first flow path hole 141 and the second flow path hole 142 are formed in the stator 14 at positions away from the axis CL of the shaft 20 so as not to overlap the axis CL of the shaft 20. The first flow path hole 141 and the second flow path hole 142 are sector-shaped (i.e., fan-shaped) through holes, and the first flow path hole 141 and the second flow path hole 142 function as communication paths for communicating the inlet-side space 120e and the outlet-side space 120f. The first flow path hole 141 and the second flow path hole 142 are not limited to the sector shape but may have another shape such as a circular shape or an elliptical shape.

Specifically, the first flow path hole 141 is provided in a portion of the stator 14 corresponding to the first-outlet-side space 120g so as to communicate with the first-outlet-side space 120g. The second flow path hole 142 is provided in a portion of the stator 14 corresponding to the second-outlet-side space 120h so as to communicate with the second-outlet-side space 120h.

Returning to FIG. 3, a stator insertion hole 143 through which an other-end-side portion 20b of the shaft 20 to be described later is inserted is formed in a substantially central portion of the stator 14. An other-end-side portion 20b of the shaft 20 is a portion of the shaft 20 opposite to a one-end-side portion 20a to which a rotational force is transmitted from the drive part 16 in the axial direction DRa. The stator insertion hole 143 has an inner diameter larger than the diameter of the shaft 20 so that the shaft 20 does not slide.

The drive part 16 is a device for outputting a rotational force. The drive part 16 includes a motor 161 as a drive source and a gear part 162 as a power transmission member that transmits the output of the motor 161 to the shaft 20.

The motor 161 is a drive source that rotates by receiving power supply. As the motor 161, for example, a servo motor or a brushless motor is employed. The motor 161 rotates in accordance with a control signal from a valve controller 17 electrically coupled to the motor 161.

The valve controller 17 is a computer having a memory that is a non-transitory tangible storage medium, a processor, and the like. The valve controller 17 executes a computer program stored in the memory and executes various control processing in accordance with the computer program.

The gear part 162 has a plurality of gears. The gear part 162 transmits the rotational operation of the motor 161 to the rotation part 18 by the meshing of the plurality of gears to rotate the rotation part 18. Specifically, the gear part 162 transmits the rotational operation of the motor 161 to the shaft 20 of the rotation part 18 to rotate the shaft 20 and the rotor 22 constituting the rotation part 18. The gear part 162 of the present embodiment is formed of a gear mechanism including a helical gear or a spur gear as a gear.

In the valve device 10, the rotation part 18 rotates about the axis CL of the shaft 20 by the output of the drive part 16. The rotation part 18 includes the shaft 20, the rotor 22 as a valve body, and an intermediate element 24 that couples the rotor 22 to the shaft 20.

The shaft 20 is a rotation shaft that rotates about a predetermined axis CL by the rotational force output from the drive part 16. The shaft 20 extends along the axial direction DRa. The shaft 20 has the one-end-side portion 20a to which the rotational force is transmitted from the drive part 16 to one side in the axial direction DRa and the other-end-side portion 20b opposite to the one-end-side portion 20a in the axial direction DRa. The one-end-side portion 20a is coupled to the gear part 162. In the shaft 20, a portion between the one-end-side portion 20a and the other-end-side portion 20b is coupled to the rotor 22 in a relatively non-rotatable manner via the intermediate element 24.

The valve device 10 of the present embodiment has a both-end holding structure in which both sides of the shaft 20 in the axial direction DRa are rotatably held by the housing 12. The one-end-side portion 20a of the shaft 20 is rotatably held by a one-end-side bearing part 126 provided in the body cover 124. The one-end-side bearing part 126 is formed of a plain bearing that receives the one-end-side portion 20a by a plain surface. The one-end-side bearing part 126 may be formed of another bearing such as a ball bearing instead of the plain bearing.

On the other hand, the other-end-side portion 20b of the shaft 20 is rotatably held with respect to the body 120 of the housing 12. The holding structure of the other-end-side portion 20b of the shaft 20 will be described later in detail.

The rotor 22 is a valve body that increases or decreases the opening degree of the first flow path hole 141 and the opening degree of the second flow path hole 142 with the rotation of the shaft 20. The opening degree of the first flow path hole 141 is a degree to which the first flow path hole 141 is opened, and the full opening and the full closing of the first flow path hole 141 are expressed as 100% and 0%, respectively. The full opening of the first flow path hole 141 is, for example, a state where the first flow path hole 141 is not closed by the rotor 22 at all. The fully closing of the first flow path hole 141 is, for example, a state where the entire first flow path hole 141 is closed by the rotor 22. The opening degree of the second flow path hole 142 is similar to the opening degree of the first flow path hole 141.

The rotor 22 is formed of a disc-shaped member a thickness direction of which is the axial direction DRa. The rotor 22 is disposed in the inlet-side space 120e so as to face the stator 14 in the axial direction DRa. The rotor 22 has a sliding surface 220 facing the opening surface 140 of the stator 14. The sliding surface 220 is a sealing surface that seals the opening surface 140 of the stator 14.

The rotor 22 is desirably formed of a material having a small linear expansion coefficient and excellent wear resistance as compared to the constituent material of the housing 12. The rotor 22 is made of a high hardness material having higher hardness than the housing 12. Specifically, the rotor 22 is made of ceramic. In the rotor 22, only a portion forming the sliding surface 220 may be formed of a material, such as ceramic, having a small linear expansion coefficient and excellent wear resistance as compared to the constituent material of the housing 12.

A rotor hole 221 is formed in the rotor 22 at a position eccentric to axis CL of shaft 20. The rotor hole 221 is a through hole penetrating in the axial direction DRa. The rotor hole 221 is formed in a portion of the rotor 22 overlapping the first flow path hole 141 and the second flow path hole 142 in the axial direction DRa at the time of rotation around the axis CL of the shaft 20 of the rotor 22.

A rotor insertion hole 223 through which the shaft 20 is inserted is formed in a substantially central portion of the rotor 22. The rotor insertion hole 223 has an inner diameter larger than the diameter of the shaft 20 so that the shaft 20 does not slide.

In the valve device 10, when the rotor 22 is rotated such that the rotor hole 221 overlaps the first flow path hole 141 in the axial direction DRa, the first flow path hole 141 is opened. In the valve device 10, when the rotor 22 is rotated such that the rotor hole 221 overlaps the second flow path hole 142 in the axial direction DRa, the second flow path hole 142 is opened.

The rotor 22 is configured to be able to regulate a flow rate ratio of the fluid passing through the first flow path hole 141 and the fluid passing through the second flow path hole 142. That is, the rotor 22 is configured such that the opening degree of the second flow path hole 142 decreases as the opening degree of the first flow path hole 141 increases.

The intermediate element 24 constitutes a part of a coupling structure that couples the rotor 22 to the shaft 20. The intermediate element 24 also functions as a rotation-restriction mechanism that restricts the rotation of the rotor 22. The intermediate element 24 couples the rotor 22 to the shaft 20 such that a gap is formed between the other-end-side portion 20b and the rotor 22. The intermediate element 24 is provided at a position closer to the one-end-side portion 20a in the axial direction DRa than the rotor 22.

The intermediate element 24 includes an intermediate boss 240 covering the outer periphery of the shaft 20, an intermediate disc 241, and an intermediate pin 242 protruding from the intermediate disc 241 toward the rotor 22 along the axial direction DRa.

The intermediate boss 240 is a portion coupled to the shaft 20 by coupling means such as press-fitting, fitting, or bonding so as to be rotatable integrally with the shaft 20. The intermediate boss 240 has a cylindrical shape having an inner diameter substantially equivalent to the outer diameter of the shaft 20.

The intermediate disc 241 is a portion expanding in a disc shape outward in the radial direction DRr from the intermediate boss 240. The intermediate disc 241 has a size capable of covering the surface of the rotor 22 opposite to the sliding surface 220. In the intermediate disc 241, an intermediate hole 241a having a shape corresponding to the rotor hole 221 is formed in a portion facing the rotor hole 221 in the axial direction DRa of the shaft 20. An intermediate insertion hole 241b through which the shaft 20 is inserted is formed in a substantially central portion of the intermediate disc 241.

The intermediate pin 242 is a member that transmits the rotation of the shaft 20 to the rotor 22. The intermediate pin 242 can be fitted into a pin reception part 222 formed on the surface of the rotor 22 opposite to the sliding surface 220.

The intermediate element 24 is configured to restrict the rotation of the rotor 22 by fitting the intermediate pin 242 into the pin reception part 222. The rotation-restriction mechanism of the rotor 22 is not limited to the above-described one but may be achieved by another means.

Figure 5:
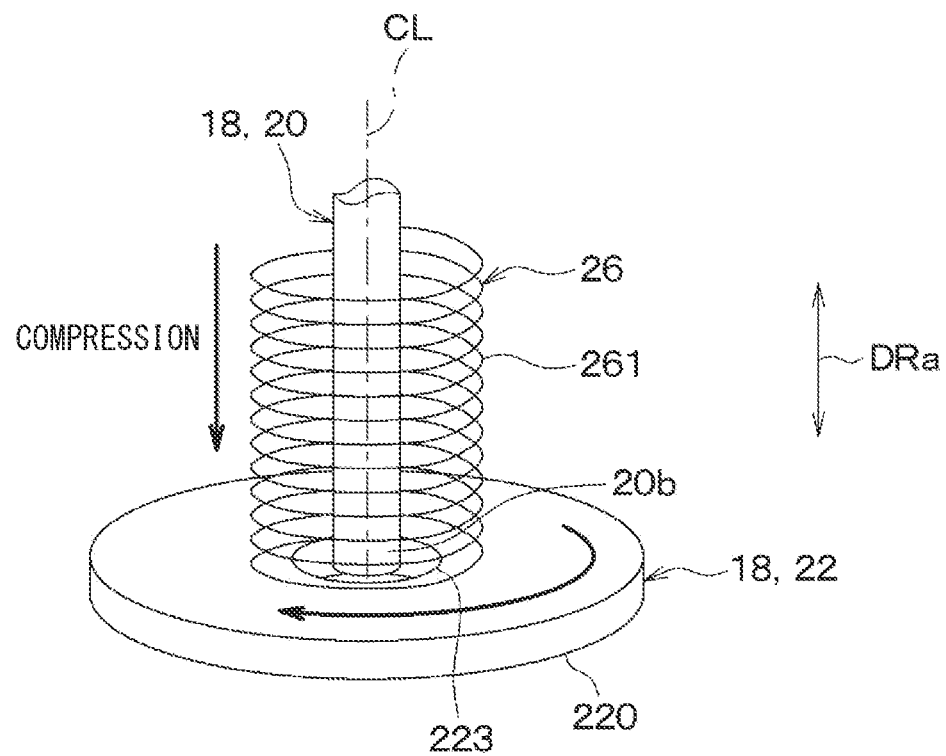
FIG. 5 is an explanatory view for explaining an energization part of the valve device according to the first embodiment.

The energization member 26 is a member that energizes the rotor 22 toward the stator 14 corresponding to the flow path formation part. As illustrated in FIG. 5, the energization member 26 is formed of a coil-shaped compression spring 261 that applies a compressive load to the rotor 22. A compression spring 261 is an elastic member that elastically deforms in the axial direction DRa of the shaft 20.

The compression spring 261 is formed by being wound around the axis CL of shaft 20. That is, the shaft 20 is disposed inside the compression spring 261. The compression spring 261 is disposed in a compressed state between drive part 16 and rotor 22.

Specifically, the compression spring 261 is disposed inside the housing 12 such that the one-side end in the axial direction DRa is in contact with the body cover 124 and the other-side end in the axial direction DRa is in contact with the rotor 22. The compression spring 261 is not fixed to at least one of the rotor 22 and the body cover 124 so as not to function as a torsion spring.

As the compression spring 261, a spring having close ends at both ends is employed so as to be hardly inclined with respect to the axis CL of the shaft 20. In the closed-ended spring, the winding angle of only a winding at the spring end is changed, and the end of a spring wire is attached to the adjacent winding so as to improve the installation of the spring. As the compression spring 261, a spring having open ends at both ends may be employed.

The compression spring 261 presses the rotor 22 against the stator 14, whereby a contact state between the opening surface 140 of the stator 14 and the sliding surface 220 of the rotor 22 is held. This contact state is a state where the opening surface 140 of the stator 14 and the sliding surface 220 of the rotor 22 are in surface contact.

Figure 6:
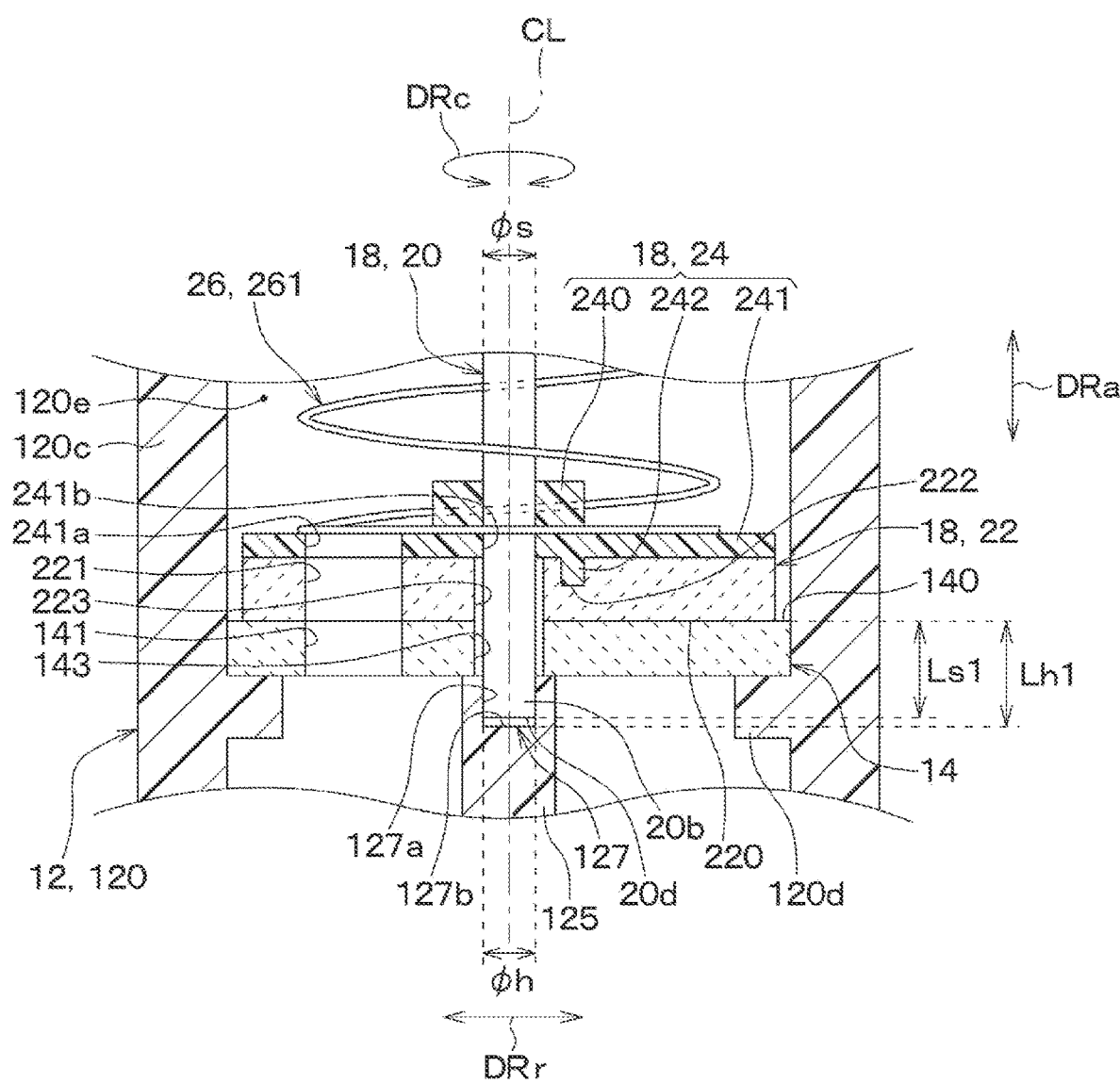
FIG. 6 is a schematic cross-sectional view illustrating a part of the valve device according to the first embodiment.

Subsequently, the holding structure of the other-end-side portion 20b of the shaft 20 of the present embodiment will be described with reference to FIG. 6. As illustrated in FIG. 6, the other-end-side portion 20b of the shaft 20 is rotatably held by an end reception groove 127 formed in the body 120.

The end reception groove 127 is formed on the upper end face of the substantially central portion of the partition 125 set in the body 120. The end reception groove 127 is a recess that is recessed from the opening 120a of the body 120 toward the bottom wall 120b. In the present embodiment, the end reception groove 127 constitutes an end reception part that receives at least a part of the other-end-side portion 20b of the shaft 20.

In the end reception groove 127, an inner diameter ϕh of the groove side surface 127a is larger than an outer diameter ϕs of the other-end-side portion 20b so that the other-end-side portion 20b of the shaft 20 is rotatable. That is, the end reception groove 127 and the other-end-side portion 20b have fitting dimensions such that the end reception groove 127 and the other-end-side portion 20b are fitted with a gap.

The groove depth of the end reception groove 127 is set such that the end face 20d of the other-end-side portion 20b of the shaft 20 does not come into contact with a groove bottom surface 127b. For example, the groove depth of the end reception groove 127 is set such that a length Lh1 from the sliding surface 220 of the rotor 22 to the groove bottom surface 127b is larger than a length Ls1 from the sliding surface 220 of the rotor 22 to the end face 20d of the shaft 20.

Next, the operation of the valve device 10 of the present embodiment will be described. In the valve device 10, as illustrated in FIGS. 3 and 4, the fluid flows from the inlet 121 into the inlet-side space 120e as indicated by an arrow Fi. When the first flow path hole 141 is open, the fluid flows from the inlet-side space 120e to the first-outlet-side space 120g via the first flow path hole 141. The fluid flowing into the first-outlet-side space 120g flows out of the first-outlet-side space 120g to the outside of the valve device 10 via the first outlet 122 as indicated by an arrow F1o. In this case, the flow rate of the fluid passing through first flow path hole 141 is determined in accordance with the opening degree of first flow path hole 141. That is, the flow rate of the fluid flowing from inlet 121 to first outlet 122 via first flow path hole 141 increases as the opening degree of first flow path hole 141 increases.

On the other hand, when the second flow path hole 142 is open, the fluid flows from the inlet-side space 120e into the second-outlet-side space 120h via the second flow path hole 142. The fluid flowing into the second-outlet-side space 120h flows out of the second-outlet-side space 120h to the outside of the valve device 10 via the second outlet 123 as indicated by an arrow F2o. In this case, the flow rate of the fluid passing through second flow path hole 142 is determined in accordance with the opening degree of second flow path hole 142. That is, the flow rate of the fluid flowing from the inlet 121 to the second outlet 123 via the second flow path hole 142 increases as the opening degree of the second flow path hole 142 increases.

In the valve device 10 described above, at least a part of the rotation part 18 is rotatably held by the housing 12 instead of the stator 14 constituting the flow path formation part. Specifically, in the valve device 10 of the present embodiment, at least a part of the other-end-side portion 20b of the shaft 20 constituting the rotation part 18 is rotatably held with respect to the housing 21. With such a configuration, as compared to a configuration in which the rotation part 18 is held by a member attached to the housing 12, the positional deviation of the end of the shaft 20 inside the housing 12 is less likely to occur.

Therefore, according to the valve device 10 of the present embodiment, a change in the posture of the shaft 20 due to the positional deviation of the shaft 20 is restricted, so that the posture of the rotor 22 can be stabilized. It is thus possible to restrict a deterioration in the accuracy of the flow rate control of the fluid due to changes in the postures of the shaft 20 and the rotor 22 and the occurrence of unintended fluid leakage. That is, the valve device 10 of the present embodiment can ensure the accuracy of fluid flow rate control and restrict unintended fluid leakage.

Specifically, the groove depth of the end reception groove 127 provided in the housing 12 is set such that the inner diameter ϕh of the groove side surface 127a is larger than the outer diameter ϕs of the other-end-side portion 20b, and the end face 20d of the other-end-side portion 20b of the shaft 20 does not come into contact with the groove bottom surface 127b. It is thereby possible to restrict a sliding loss in the holding structure of the other-end-side portion 20b of the shaft 20 and to ensure wear resistance.

In the valve device 10, the one-end-side bearing part 126 that rotatably supports the one-end-side portion 20a of the shaft 20 is provided inside the housing 12. Hence, both sides of the shaft 20 in the axial direction DRa are rotatably held by the housing 12. With such a structure, it is possible to sufficiently restrict the positional deviation of the end of the shaft 20 and to restrict the change in the posture of the shaft 20 due to the positional deviation of the end of the shaft 20.

In the valve device 10, the rotor 22 is made of ceramic. Ceramic is a material having a small linear expansion coefficient and a small dimensional change due to water absorption and is also excellent in wear resistance. Therefore, when the rotor 22 is made of ceramic, the relative positional relationship between the rotor 22 and the shaft 20 and the relative positional relationship between the rotor 22 and the housing 12 are stabilized, so that the accuracy of the flow rate control of the fluid can be ensured, and unintended fluid leakage can be restricted.

Further, in the valve device 10, the rotor 22 is pressed against the stator 14 by the energization member 26. Therefore, the valve device 10 can hold the posture of the rotor 22 in a posture in contact with the stator 14.

Here, the energization member 26 is formed of the compression spring 261 that is an elastic member elastically deformed in the axial direction DRa of the shaft 20. Thus, a load for pressing the sliding surface 220 of the rotor 22 against the opening surface 140 of the stator 14 can be sufficiently ensured, thereby facilitating the contact state between the sliding surface 220 and the opening surface 140 to be held.

Specifically, the shaft 20 is disposed inside the compression spring 261. Hence, the load of the compression spring 261 on the rotor 22 is restricted from being biased in the circumferential direction DRc of the shaft 20, thereby facilitating the contact state between the sliding surface 220 and the opening surface 140 to be held.

Modification of First Embodiment

In the first embodiment, the member employing the coil-shaped compression spring 261 has been illustrated as the energization member 26, but the energization member 26 is not limited to the compression spring 261. The energization member 26 may be formed of, for example, a cylindrical elastic body that elastically deforms in the axial direction DRa of the shaft 20. This also applies to the following embodiments.

In the first embodiment, the valve device 10 in which the flow path hole is formed in the stator 14 configured separately from the housing 12 has been illustrated, but the valve device 10 is not limited thereto. In the valve device 10, for example, a flow path hole may be formed directly in the housing 12. That is, in the valve device 10, the flow path formation part may be configured integrally with the housing 12. In this case, the sliding portion of the housing 12 where the rotor 22 slides is desirably formed of a material, such as ceramic, having a small linear expansion coefficient and excellent wear resistance as compared to the constituent materials of the portions except for the sliding portion. This also applies to the following embodiments.

As in the first embodiment, it is desirable that the groove depth of the end reception groove 127 be set such that the inner diameter ϕh of the groove side surface 127a is larger than the outer diameter ϕs of the other-end-side portion 20b and the shaft 20 does not come into contact with the groove bottom surface 127b, but it is not limited thereto. The end reception groove 127 may have a groove depth set such that the inner diameter ϕh of the groove side surface 127a is about the same as the outer diameter ϕs of the other-end-side portion 20b, or the shaft 20 comes into contact with the groove bottom surface 127b. This also applies to the second embodiment.

Second Embodiment

Next, a second embodiment will be described with reference to FIG. 7. In the present embodiment, a portion different from the first embodiment will be mainly described.

Figure 7:
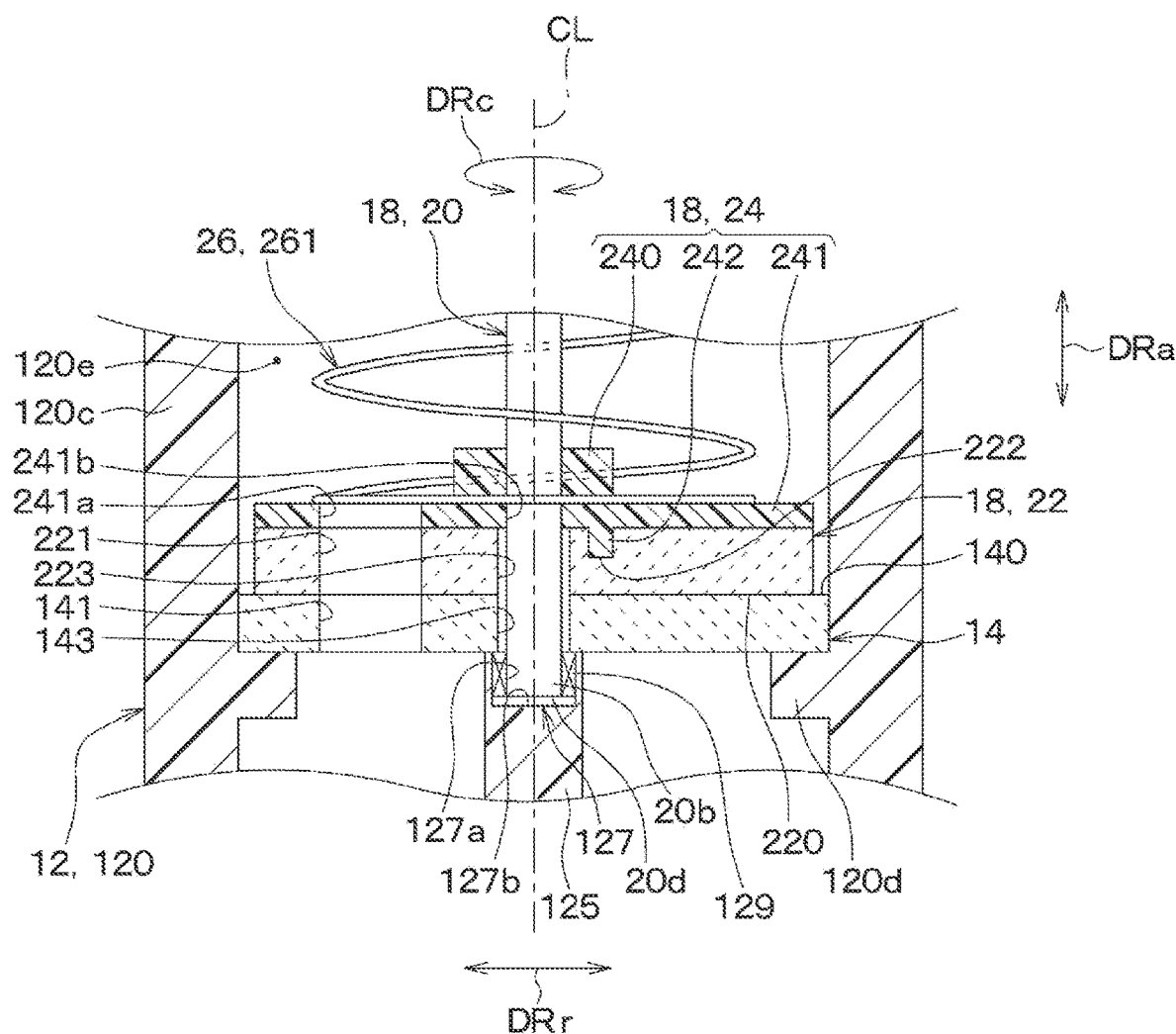
FIG. 7 is a schematic cross-sectional view illustrating a part of a valve device according to a second embodiment.

As illustrated in FIG. 7, an other-end-side bearing part 129 rotatably supporting the other-end-side portion 20b is provided inside the end reception groove 127. As a result, the other-end-side portion 20b of the shaft 20 is rotatably supported by the housing 12 via the other-end-side bearing part 129.

Specifically, the other-end-side bearing part 129 is formed of a plain bearing that receives the other-end-side portion 20b by a plain surface. The other-end-side bearing part 129 may be formed of another bearing such as a ball bearing instead of the plain bearing.

The other configurations are similar to those of the first embodiment. As in the first embodiment, the valve device 10 of the present embodiment can obtain effects exhibited by a configuration similar or equal to those of the first embodiment.

In the valve device 10 of the present embodiment, the other-end-side bearing part 129 is provided inside the end reception groove 127. Thereby, the position of the other-end-side portion 20b of the shaft 20 can be restricted with high accuracy.

Third Embodiment

Next, a third embodiment will be described with reference to FIGS. 8 and 9. In the present embodiment, a portion different from the first embodiment will be mainly described.

Figure 8:
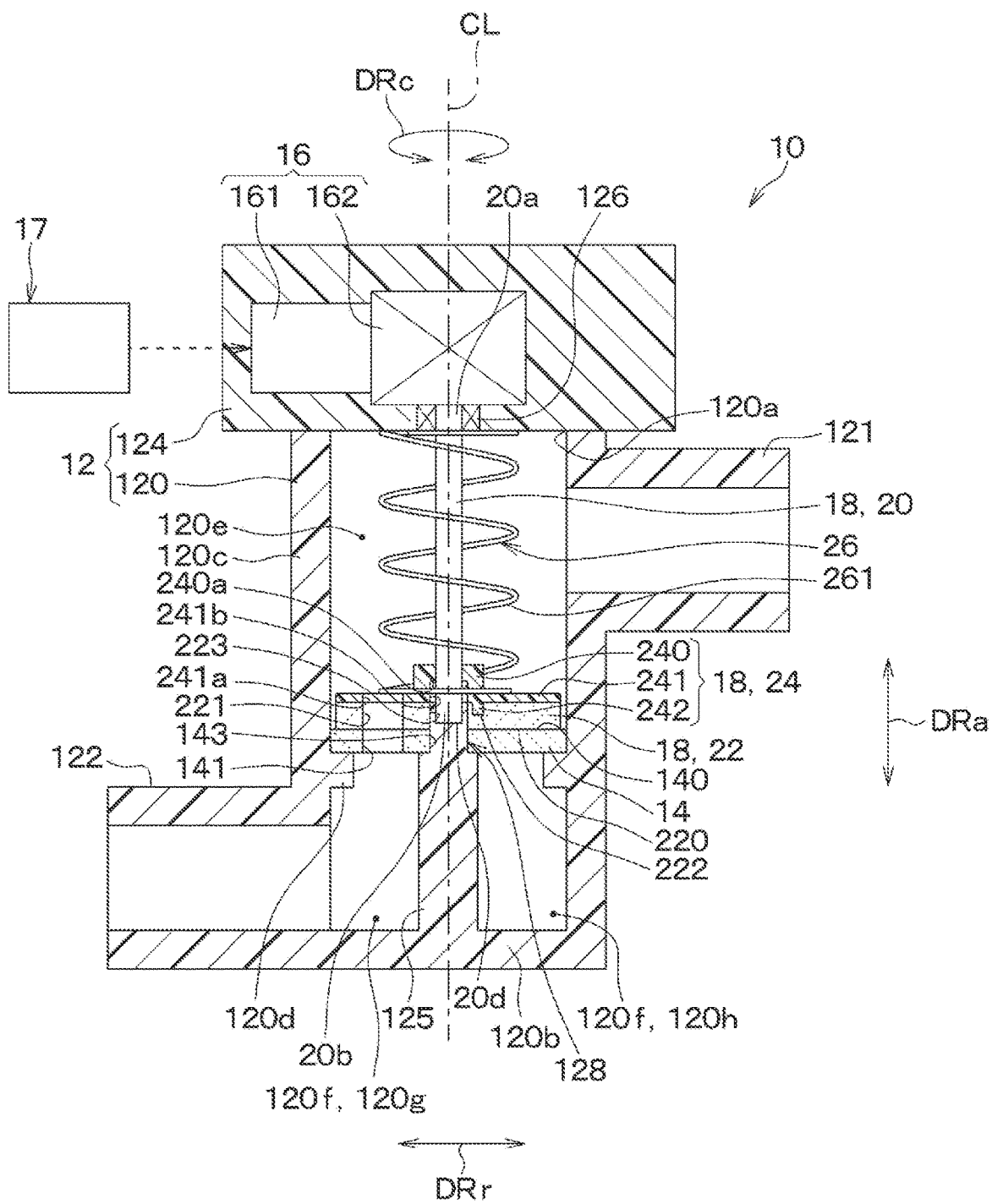
FIG. 8 is a schematic cross-sectional view illustrating a valve device according to a third embodiment.
Figure 9:
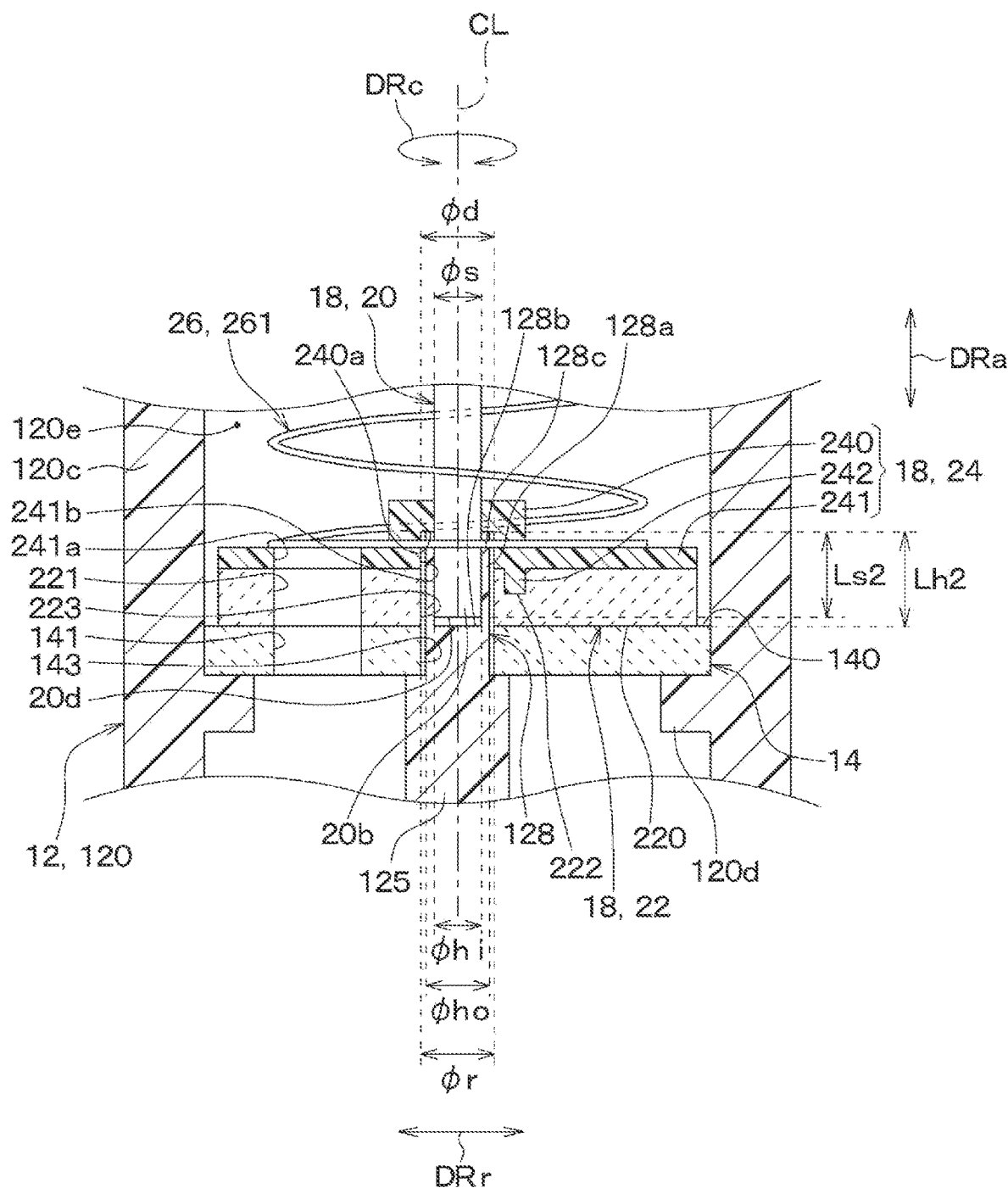
FIG. 9 is a schematic cross-sectional view illustrating a part of a valve device according to a third embodiment.

As illustrated in FIGS. 8 and 9, the intermediate element 24 is formed with a recess 240a recessed away from the rotor 22 at a substantially central portion of the intermediate boss 240. The recess 240a has a diameter ϕd larger than an outer diameter ϕho of an end reception part 128 to be described later so as to be able to receive a distal end 128c of an end reception part 128. The diameter ϕd of the recess 240a is substantially equivalent to a diameter ϕr of the rotor insertion hole 223.

The other-end-side portion 20b of the shaft 20 is rotatably held by a pipe-shaped end reception part 128 formed in the body 120. The end reception part 128 is disposed at a position where the end reception part 128 overlaps at least a part of the rotation part 18 in the radial direction DRr of the shaft 20 so as to function as a rotation guide that guides the rotation of the rotation part 18. Unlike the end reception groove 127 of the first embodiment, the end reception part 128 protrudes from the bottom wall 120b side toward the opening 120a side, from the upper end face of the substantially central portion of the partition 125 set in the body 120.

Specifically, the end reception part 128 extends along the axial direction DRa of the shaft 20 such that the distal end 128c is located in the recess 240a of the intermediate element 24. The dimension of the end reception part 128 in the axial direction DRa is larger than a value obtained by adding the thickness of the rotor 22 and the thickness of the stator 14.

The end reception part 128 is formed in a bottomed cylindrical shape having a cylindrical side wall 128a surrounding the outer periphery of the other-end-side portion 20b of the shaft 20 and a bottom wall 128b facing the end face 20d of the other-end-side portion 20b.

In the end reception part 128, an inner diameter ϕhi of the side wall 128a is larger than an outer diameter ϕs of the other-end-side portion 20b so that the other-end-side portion 20b of the shaft 20 is rotatable. That is, the end reception part 128 and the other-end-side portion 20b have fitting dimensions such that the end reception part 128 and the other-end-side portion 20b are fitted with a gap.

The groove depth of the end reception part 128 is set such that the end face 20d of the other-end-side portion 20b of the shaft 20 does not come into contact with the bottom wall 128b. For example, the groove depth of the end reception part 128 is set such that a length Lh2 from the distal end 128c of the end reception part 128 to the bottom wall 128b is larger than a length Ls2 from the distal end 128c of the end reception part 128 to the end face 20d of the shaft 20. Specifically, the groove depth of the end reception part 128 is set such that the length Ls2 from the distal end 128c of the end reception part 128 to the end face 20d of the shaft 20 is half or more of the length Lh2 from the distal end 128c of the end reception part 128 to the bottom wall 128b.

The end reception part 128 is configured such that the bottom wall 128b is located to overlap the sliding surface 220 of the rotor 22 in the radial direction DRr of the shaft 20. The shaft 20 is configured such that the end face 20d of the other-end-side portion 20b is located to overlap the inside of the rotor 22 in the radial direction DRr of the shaft 20. In the shaft 20, the end face 20d of the other-end-side portion 20b is positioned at a position closer to the bottom wall 128b than the distal end 128c of the end reception part 128.

The outer diameter ϕho of the end reception part 128 is smaller than the diameter ϕr of the rotor insertion hole 223 so as not to directly contact the rotor 22. The diameter of the stator insertion hole 143 is substantially equivalent to the diameter ϕr of the rotor insertion hole 223. The diameter of the stator insertion hole 143 may be substantially equivalent to the outer diameter ϕho of the end reception part 128.

Here, in the valve device 10 of the present embodiment, the shaft 20 is rotatably held on the inner surface of the end reception part 128. The valve device 10 may be configured such that the other-end-side bearing part 129 is provided inside the end reception part 128 and the shaft 20 is rotatably held by the other-end-side bearing part 129.

The other configurations are similar to those of the first embodiment. As in the first embodiment, the valve device 10 of the present embodiment can obtain effects exhibited by a configuration similar or equal to those of the first embodiment.

Specifically, in the valve device 10, at least a part of the rotation part 18 is rotatably held with respect to the end reception part 128 of the housing 12 instead of the stator 14 constituting the flow path formation part. Accordingly, as compared to a case where the rotation part 18 is held by a member attached to the housing 12, the positional deviation of the end of the shaft 20 inside the housing 12 is less likely to occur.

Therefore, according to the valve device 10 of the present embodiment, it is possible to restrict a change in the posture of the shaft 20 due to the positional deviation of the shaft 20 and stabilize the posture of the rotor 22. It is thus possible to restrict a deterioration in the accuracy of the flow rate control of the fluid due to changes in the postures of the shaft 20 and the rotor 22 and the occurrence of unintended fluid leakage.

The end reception part 128 is disposed at a position where the end reception part 128 overlaps at least a part of the rotation part 18 in the radial direction DRr of the shaft 20 so as to function as a rotation guide that guides the rotation of the rotation part 18.

Thus, when the end reception part 128 of the housing 12 functions as a rotation guide of the rotation part 18, the position of the rotation center of the rotation part 18 is restricted with high accuracy, so that it is possible to ensure the accuracy of the flow rate control of the fluid and restrict unintended fluid leakage.

The end reception part 128 is formed in a bottomed cylindrical shape and is disposed inside the rotation part 18 so as to overlap the rotor 22 in the radial direction DRr of the shaft 20. When the end reception part 128 is positioned inside the rotor 22 as described above, the end reception part 128 can function as a holding part of the shaft 20 and as a rotation guide of the rotation part 18.

Modification of Third Embodiment

Figure 10:
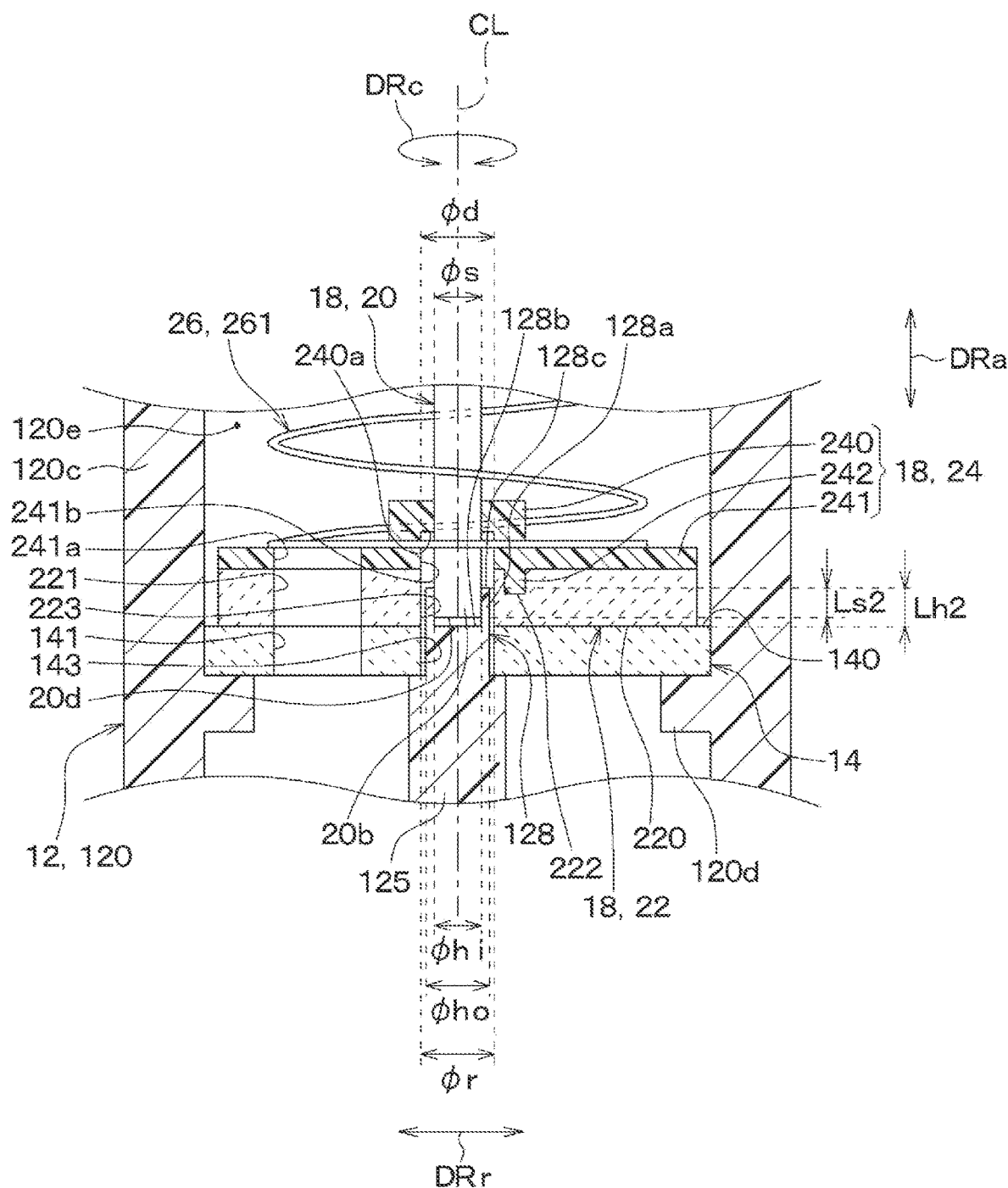
FIG. 10 is a schematic cross-sectional view illustrating a modification of the valve device according to the third embodiment.

The end reception part 128 of the third embodiment extends along the axial direction DRa of the shaft 20 such that the distal end 128c is located in the recess 240a of the intermediate element 24, but it is not limited thereto. For example, as illustrated in FIG. 10, the end reception part 128 may extend along the axial direction DRa of the shaft 20 such that the distal end 128c is located inside the rotor 22. In the end reception part 128 illustrated in FIG. 10, the dimension in the axial direction DRa is larger than the thickness of the stator 14 and smaller than a value obtained by adding the thickness of the rotor 22 and the thickness of the stator 14. When the end reception part 128 illustrated in FIG. 10 is employed, the recess 240a may not be provided in the intermediate boss 240. Thereby, the end reception part 128 can function as a rotation guide of the rotor 22.

Fourth Embodiment

Next, a fourth embodiment will be described with reference to FIGS. 11 and 12. In the present embodiment, a portion different from the third embodiment will be mainly described.

Figure 11:
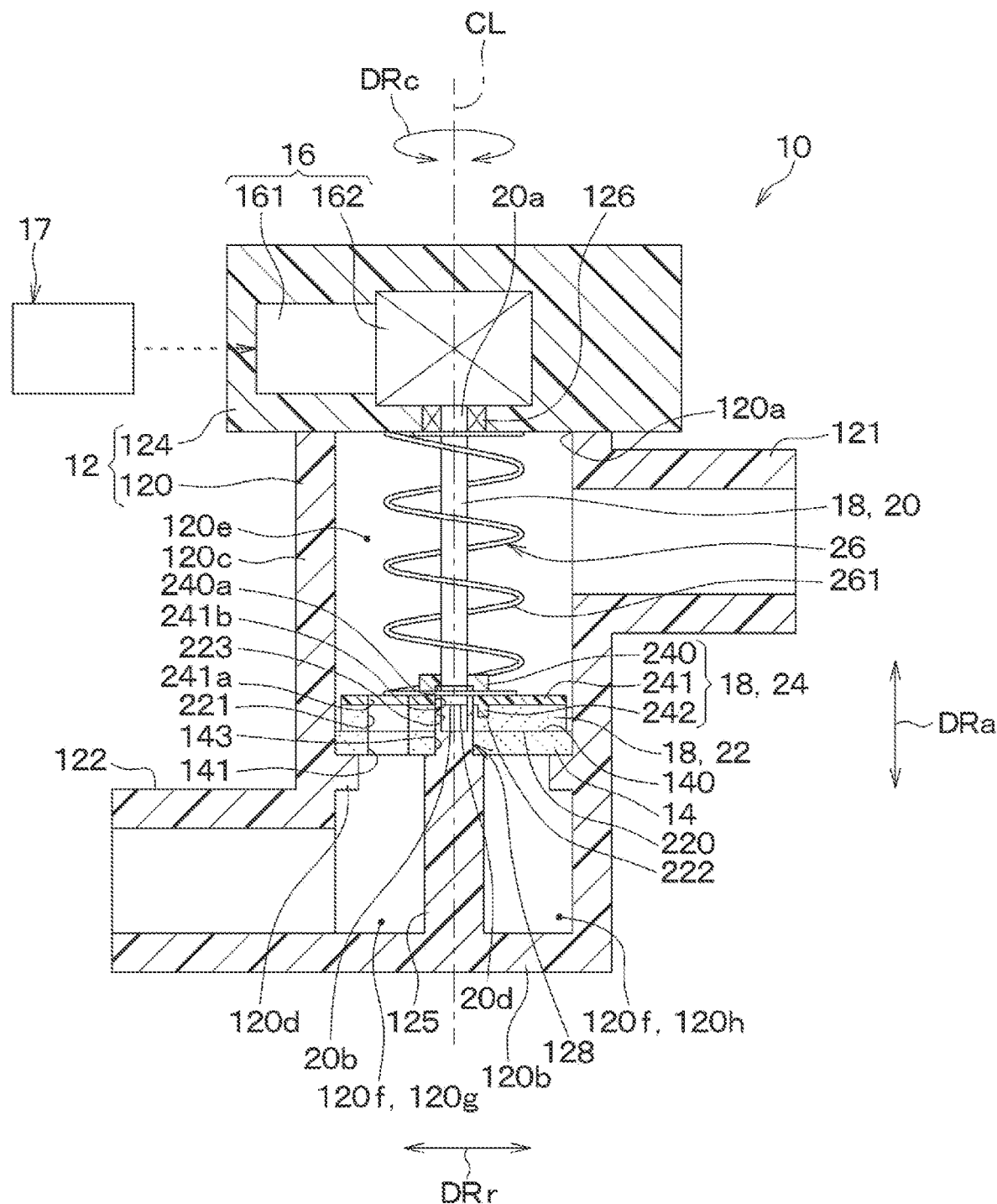
FIG. 11 is a schematic cross-sectional view illustrating a valve device according to a fourth embodiment.
Figure 12:
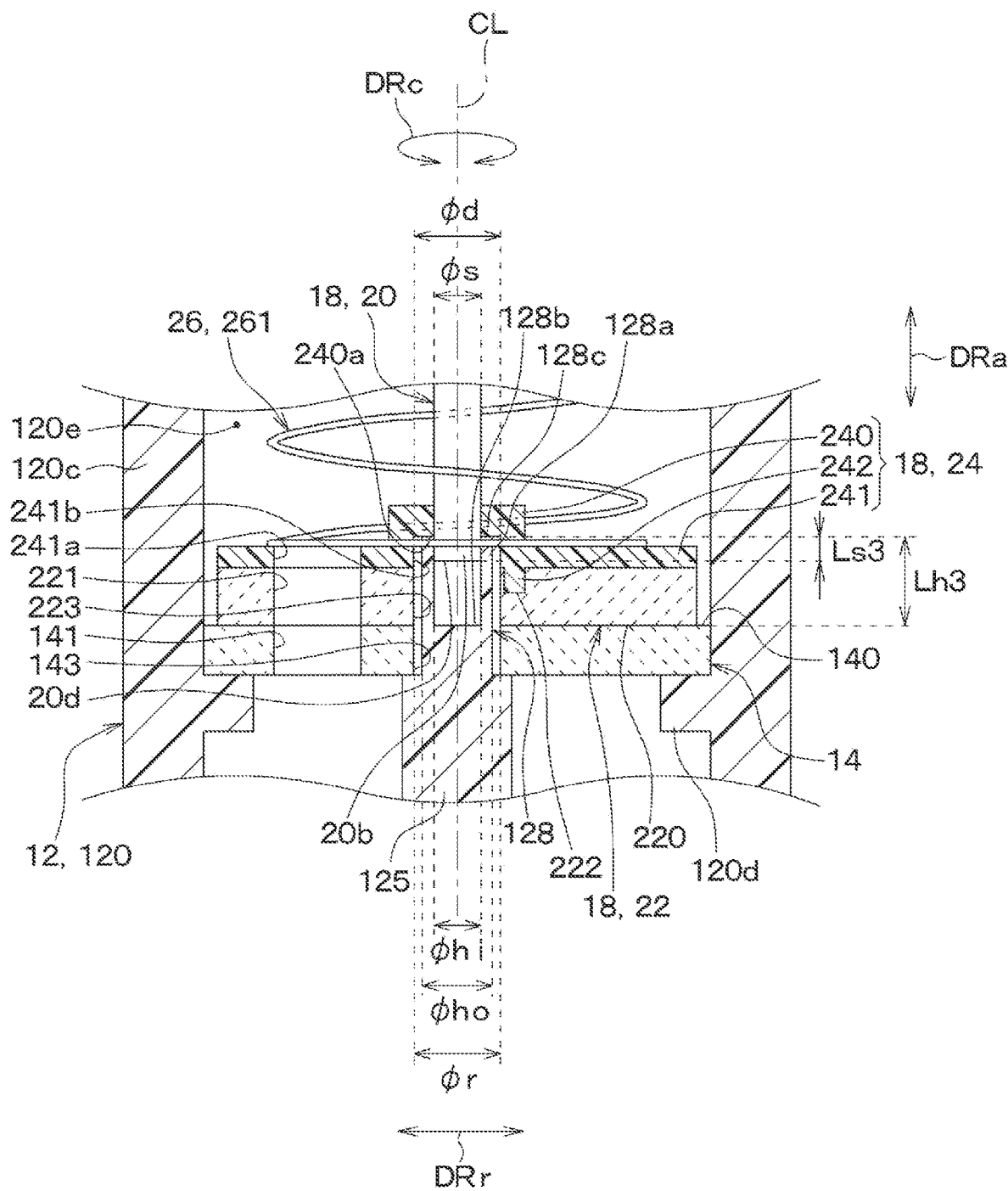
FIG. 12 is a schematic cross-sectional view illustrating a part of the valve device according to the fourth embodiment.

As illustrated in FIGS. 11 and 12, the end reception part 128 is configured such that the bottom wall 128b is located to overlap the sliding surface 220 of the rotor 22 in the radial direction DRr of the shaft 20.

The shaft 20 of the present embodiment is configured such that the end face 20d of the other-end-side portion 20b is located to overlap the inner side of the intermediate element 24 in the radial direction DRr of the shaft 20. Specifically, the length of the shaft 20 in the axial direction DRa of the shaft 20 is set such that the end face 20d of the other-end-side portion 20b is located inside the recess 240a. In the shaft 20, the end face 20d of the other-end-side portion 20b is positioned at a position closer to the distal end 128c than the bottom wall 128b of the end reception part 128.

The groove depth of the end reception part 128 is set such that a length Lh3 from the distal end 128c of the end reception part 128 to the bottom wall 128b is larger than a length Ls3 from the distal end 128c of the end reception part 128 to the end face 20d of the shaft 20. Specifically, the groove depth of the end reception part 128 is set such that the length Ls3 from the distal end 128c of the end reception part 128 to the end face 20d of the shaft 20 is half or less of the length Lh3 from the distal end 128c of the end reception part 128 to the bottom wall 128b.

The other configurations are similar to those of the third embodiment. As in the third embodiment, the valve device 10 of the present embodiment can obtain effects exhibited by a configuration similar or equal to those of the third embodiment.

The valve device 10 of the present embodiment is configured such that the end face 20d of the other-end-side portion 20b of the shaft 20 is located to overlap the inner side of the intermediate element 24 in the radial direction DRr of the shaft 20. Thereby, the length of the shaft 20 in the axial direction DRa can be reduced as compared to a case where the end face 20d of the other-end-side portion 20b is located to overlap the inner side of the rotor 22 in the radial direction DRr of the shaft 20. In this case, at the time of holding a part of the shaft 20 inside the end reception part 128, the shaft 20 is less likely to come into contact with the inside of the end reception part 128, so that galling of the shaft 20 due to contact with the inside of the end reception part 128 can be restricted. The galling means damage to the surface caused by aggregation of partial adhesive wear occurring at a contact part.

First Modification of Fourth Embodiment

In the fourth embodiment, the bottom wall 128b of the end reception part 128 is configured to be located to overlap the sliding surface 220 of the rotor 22 in the radial direction DRr of the shaft 20, but the end reception part 128 is not limited thereto.

Figure 13:
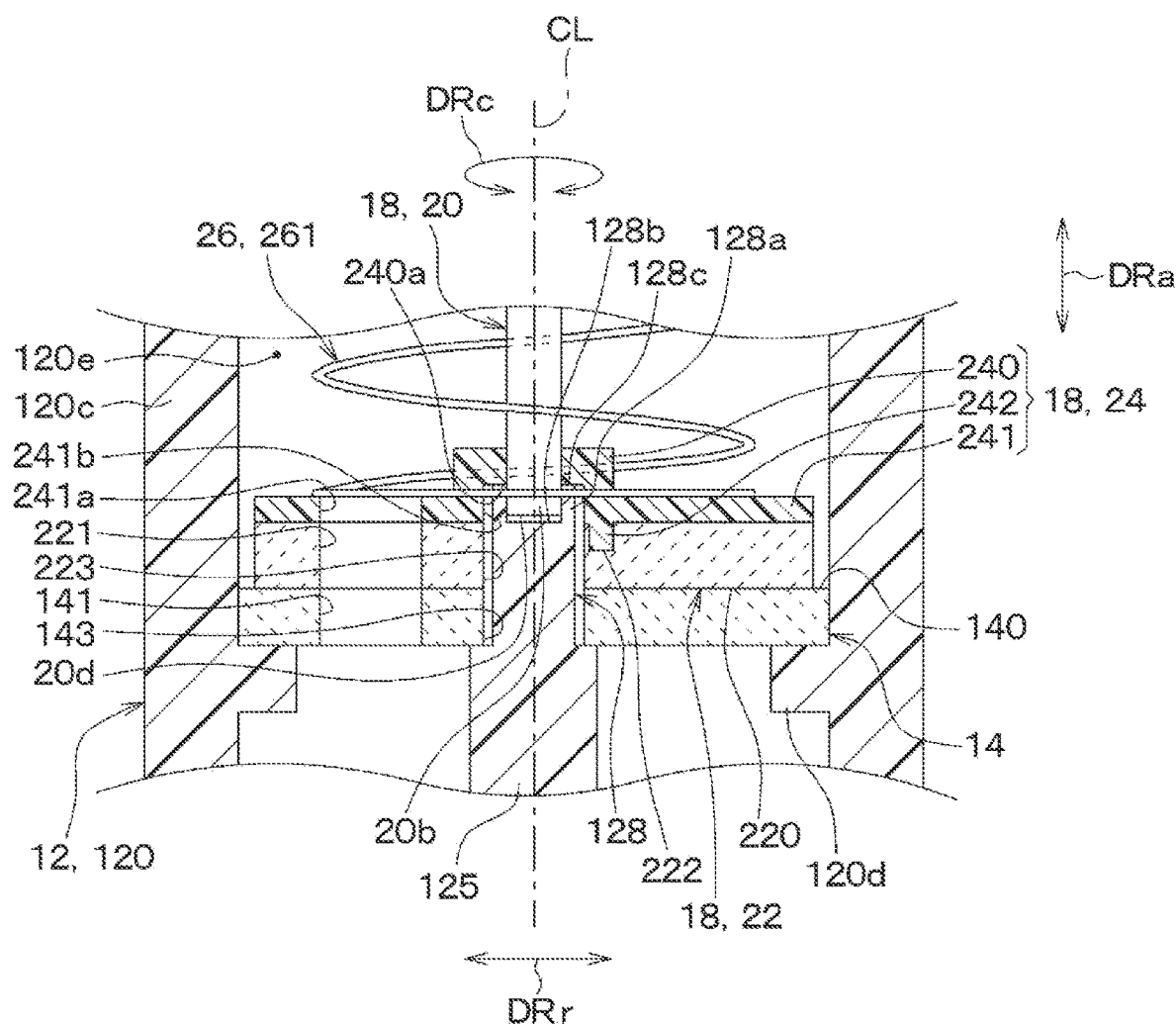
FIG. 13 is a schematic cross-sectional view illustrating a first modification of the valve device according to the fourth embodiment.

For example, as illustrated in FIG. 13, the end reception part 128 may be configured such that the bottom wall 128b is located to overlap the surface of the rotor 22 on the side opposite to the sliding surface 220 in the radial direction DRr of the shaft 20.

Second Modification of Fourth Embodiment

Figure 14:
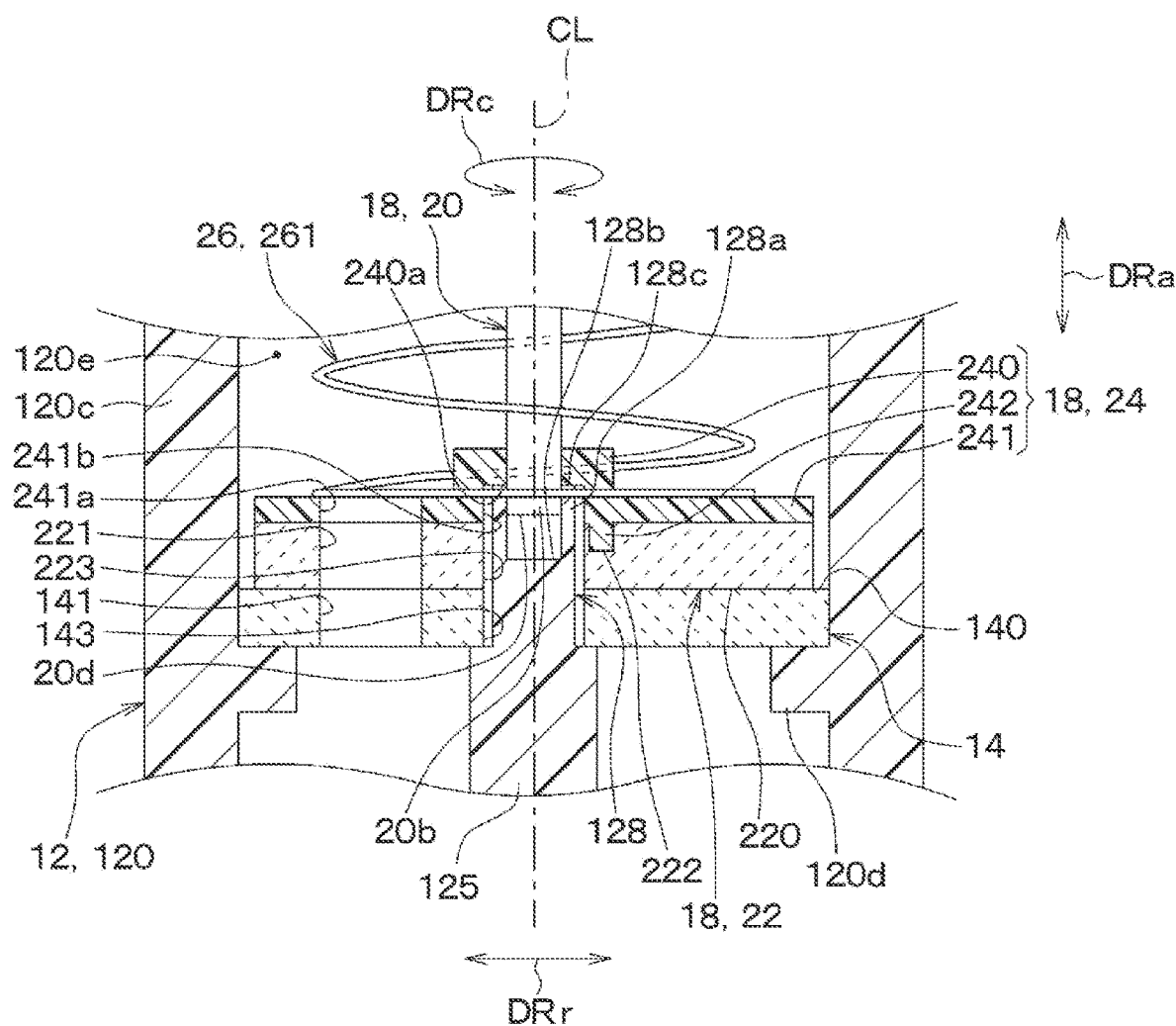
FIG. 14 is a schematic cross-sectional view illustrating a second modification of the valve device according to the fourth embodiment.

For example, as illustrated in FIG. 14, the end reception part 128 may be configured such that the bottom wall 128b is located to overlap the inner side of the rotor 22 in the radial direction DRr of the shaft 20.

Other Modifications of Fourth Embodiment

The position of the bottom wall 128b of the end reception part 128 is not limited to the above-described position but may be set to, for example, a position where the bottom wall 128b overlaps the inside of the stator 14 in the radial direction DRr of the shaft 20.

Fifth Embodiment

Next, a fifth embodiment will be described with reference to FIGS. 15 and 16. In the present embodiment, a portion different from the first embodiment will be mainly described.

Figure 15:
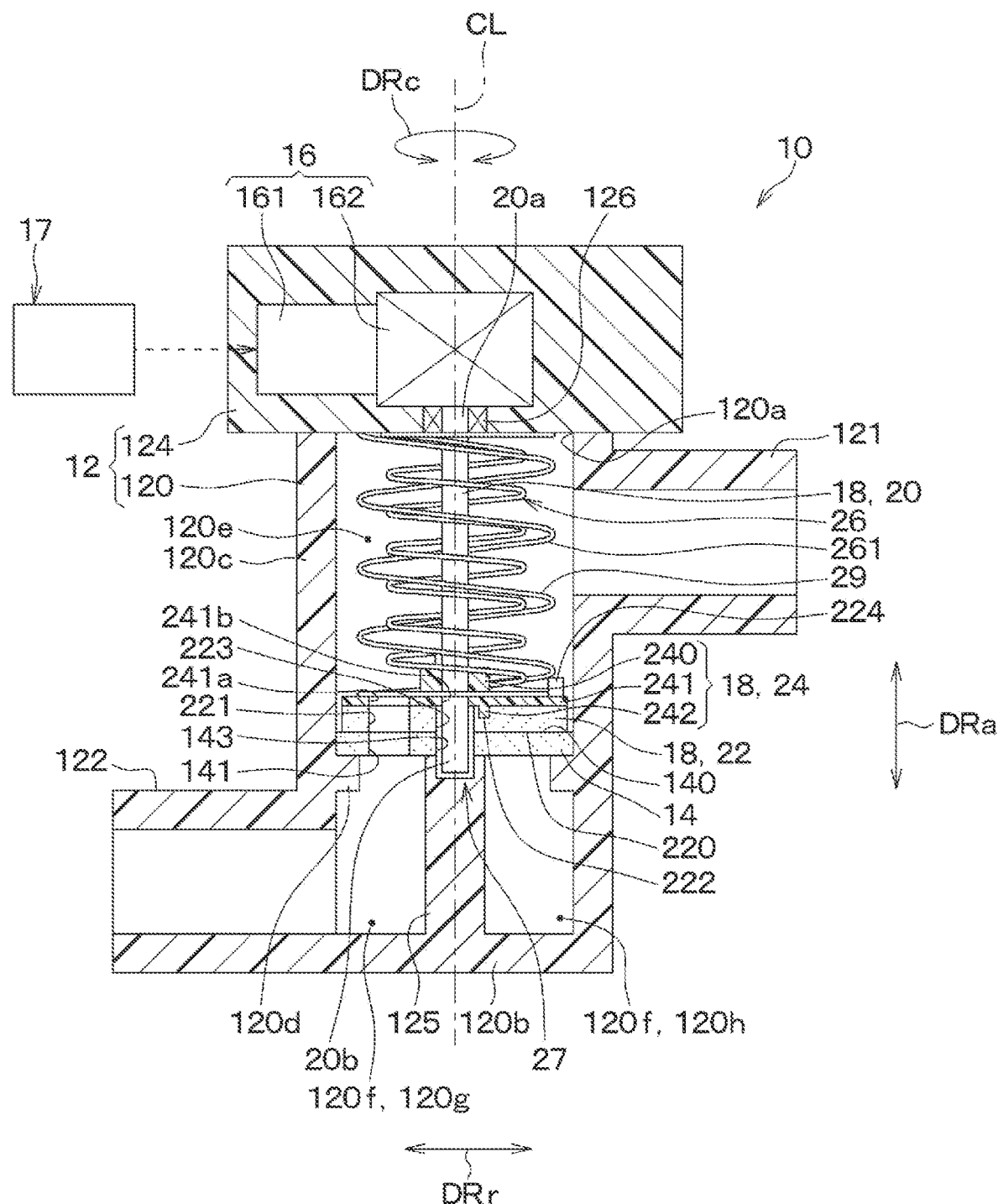
FIG. 15 is a schematic cross-sectional view illustrating a valve device according to a fifth embodiment.
Figure 16:
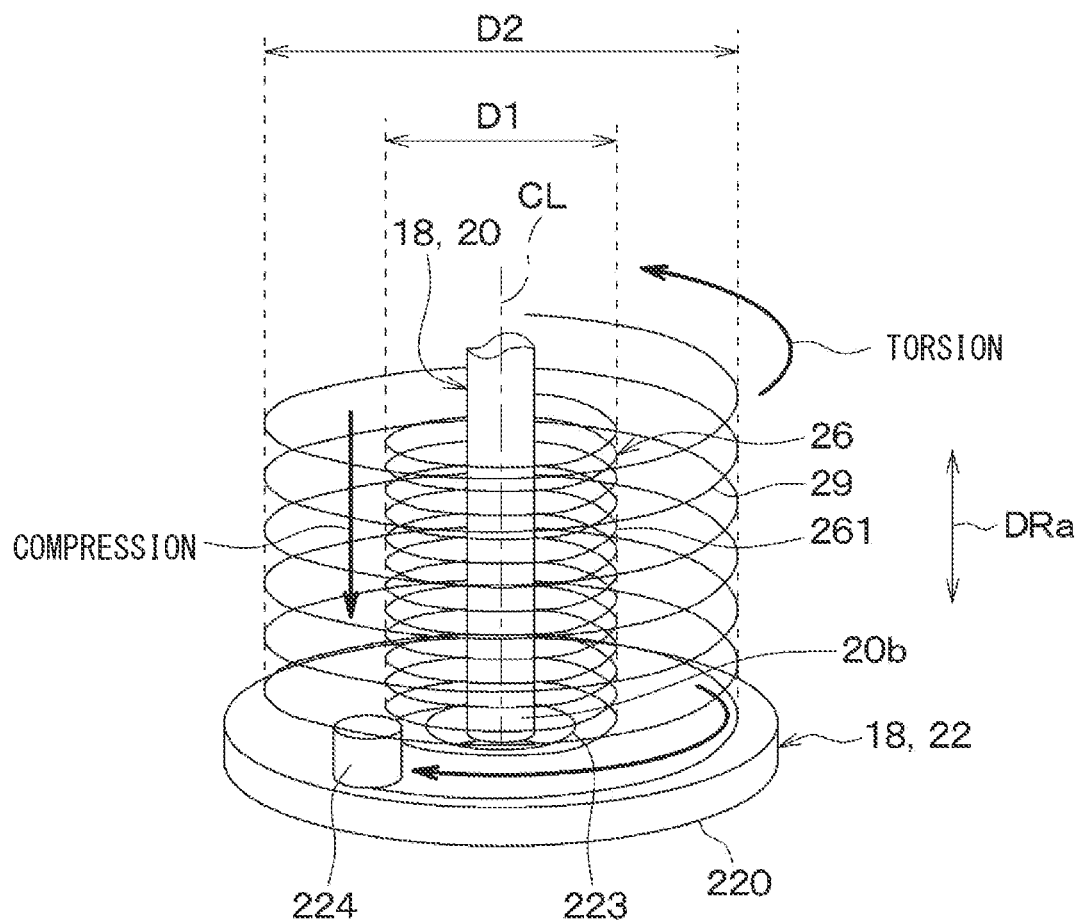
FIG. 16 is an explanatory view for explaining a compression spring and a torsion spring of the valve device according to the fifth embodiment.

As illustrated in FIGS. 15 and 16, the valve device 10 includes a coil-shaped torsion spring 29 that energizes the rotor 22 to one side in the circumferential direction DRc around the axis CL of the shaft 20. The torsion spring 29 is disposed between the drive part 16 and the rotor 22. The torsion spring 29 is formed by being wound around the axis CL of the shaft 20. A coil diameter D2 of the torsion spring 29 is larger than a coil diameter D1 of the compression spring 261. The compression spring 261 is disposed inside the torsion spring 29.

Unlike the compression spring 261, the torsion spring 29 is fixed to each of the rotor 22 and the body cover 124. In the torsion spring 29, one end side in the axial direction DRa is coupled to the body cover 124 in a relatively non-rotatable manner, and the other end side in the axial direction DRa is coupled to the rotor 22 in a relatively non-rotatable manner. Although various methods for coupling the torsion spring 29 to the rotor 22 are conceivable, for example, the end of the torsion spring 29 is coupled to the rotor 22 by being locked to a fixing pin 224 fixed to the rotor 22.

The torsion spring 29 is used in a state of being twisted in the circumferential direction DRc to generate elastic deformation. The torsion spring 29 generates an energizing force for energizing the rotor 22 to one side in the circumferential direction DRc by its own elastic deformation. The torsion spring 29 is merely twisted in the circumferential direction DRc and is not compressed in the axial direction DRa.

The other configurations are similar to those of the first embodiment. As in the first embodiment, the valve device 10 of the present embodiment can obtain effects exhibited by a configuration similar or equal to those of the first embodiment.

Here, in a case where the rotor 22 and the shaft 20 are configured separately, a relative positional deviation may occur between the rotor 22 and the shaft 20 in the circumferential direction DRc. Such positional deviation is not preferred since causing fluid leakage.

In contrast, when the rotor 22 is energized to one side in the circumferential direction DRc of the shaft 20 by the torsion spring 29, it is possible to restrict occurrence of relative positional deviation between the rotor 22 and the shaft 20 in the circumferential direction DRc.

Modification of Fifth Embodiment

In the fifth embodiment described above, the valve device 10 with the torsion spring 29 added thereto has been illustrated, but the valve device 10 is not limited thereto. In the valve device 10, for example, one end side of the compression spring 261 may be fixed to the housing 12, and the other end side may be fixed to the rotor 22 so that the compression spring 261 also functions as a torsion spring.

Sixth Embodiment

Next, a sixth embodiment will be described with reference to FIGS. 17 and 18. In the present embodiment, a portion different from the first embodiment will be mainly described.

Figure 17:
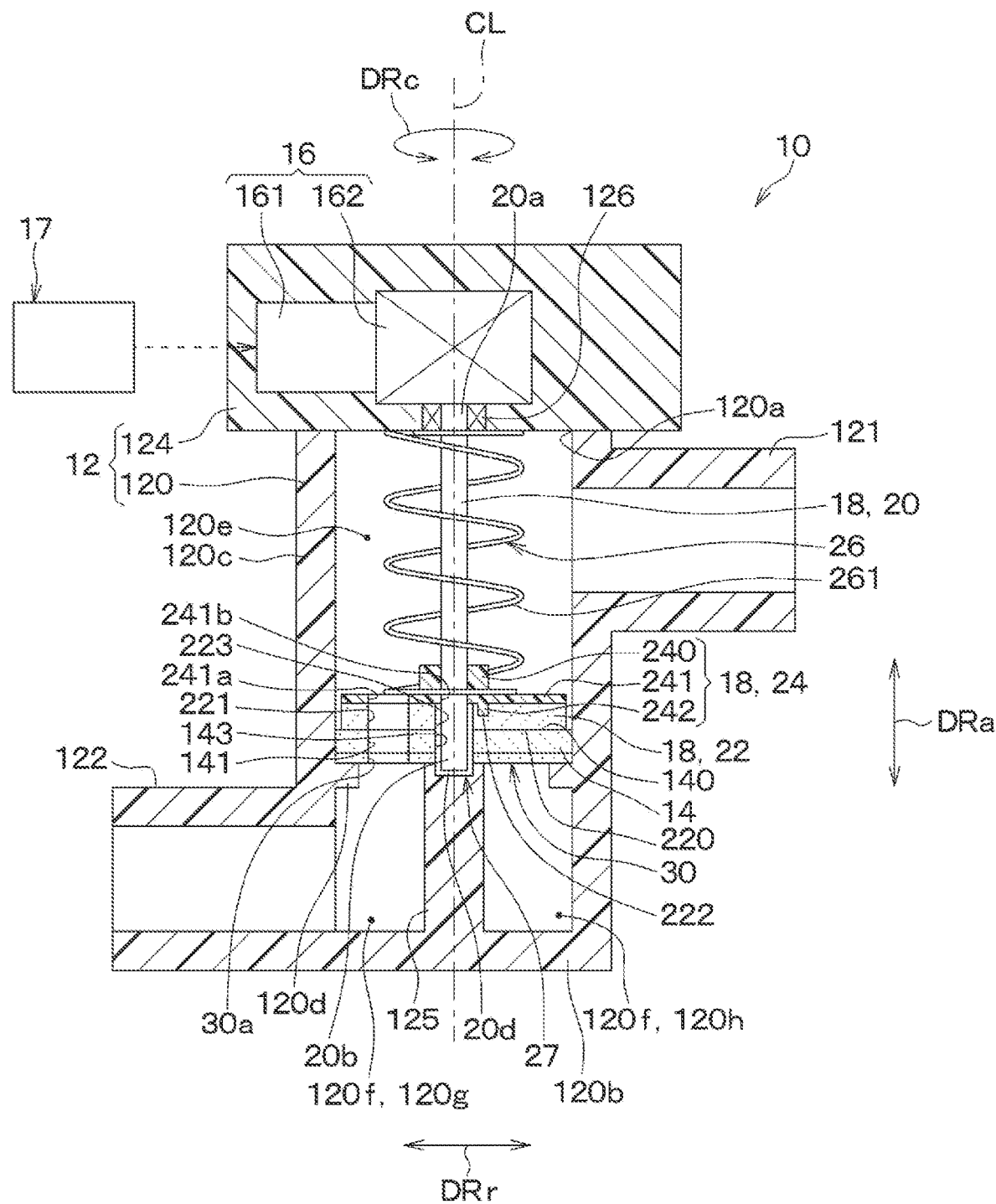
FIG. 17 is a schematic cross-sectional view illustrating a valve device according to a sixth embodiment.
Figure 18:
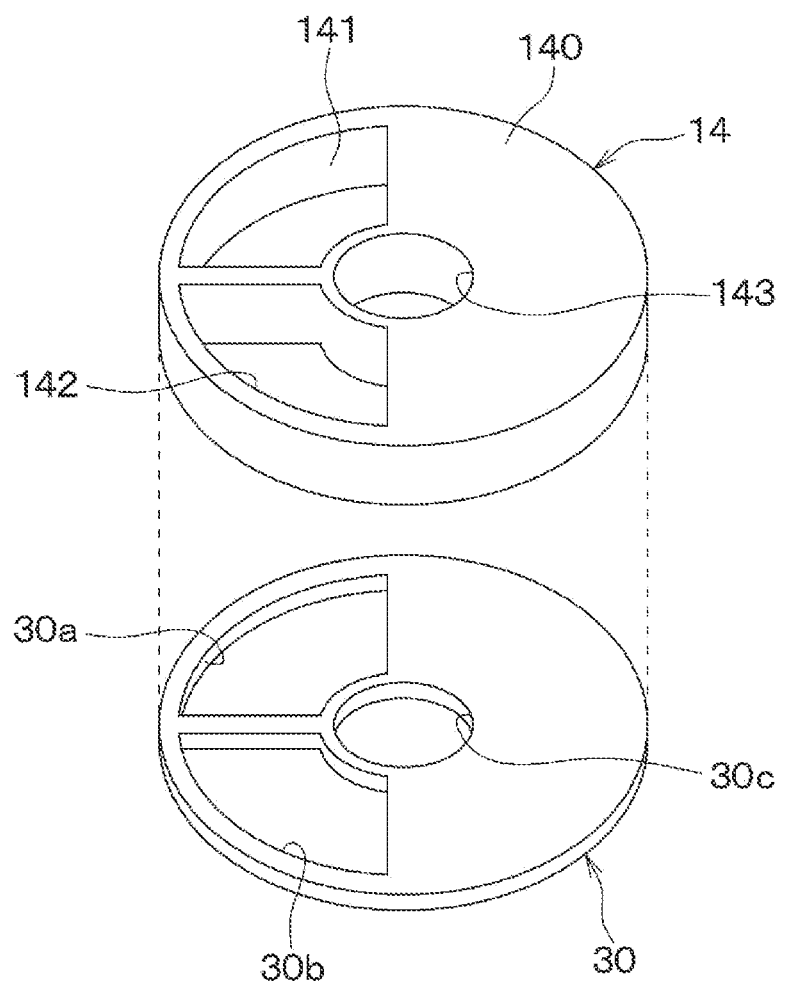
FIG. 18 is an explanatory view for explaining a sealing member of the valve device according to the sixth embodiment.

As illustrated in FIG. 17, in the valve device 10, a sealing member 30 is disposed between the stator 14 and the housing 12. The sealing member 30 is interposed between the stator 14 and the protrusion 120d of the housing 12. This restricts fluid leakage from the gap between the stator 14 and the protrusion 120d of the housing 12.

The sealing member 30 is configured to be elastically deformable in the axial direction DRa. As illustrated in FIG. 18, the sealing member 30 is formed of a disc-shaped member a thickness direction of which is the axial direction DRa. The sealing member 30 has an outer diameter equivalent to that of the stator 14 so as to overlap the stator 14 in the axial direction DRa. The thickness of the sealing member 30 is smaller than the thickness of the stator 14.

In the sealing member 30, a first through hole 30a through which a fluid is allowed to pass is formed in a portion facing the first flow path hole 141. Further, in the sealing member 30, a second through hole 30b through which a fluid is allowed to pass is formed in a portion facing the second flow path hole 142. Moreover, in the sealing member 30, an insertion hole 30c through which the shaft 20 is inserted is formed in a substantially central portion of the sealing member 30.

The other configurations are similar to those of the first embodiment. As in the first embodiment, the valve device 10 of the present embodiment can obtain effects exhibited by a configuration similar or equal to those of the first embodiment.

In the valve device 10 of the present embodiment, the sealing member 30 is disposed between the stator 14 and the housing 12. Thereby, sealing performance between the stator 14 and the housing 12 can be ensured by the sealing member 30. For example, when the pressure acting on the rotor 22 varies in the circumferential direction DRc, the rotor 22 may be in an inclined posture. However, even in this case, the stator 14 can be inclined following the rotor 22 due to the deformation of the sealing member 30. As described above, with the configuration in which the sealing member 30 is interposed between the stator 14 and the housing 12, it is possible to ensure the close contact between the stator 14 and the rotor 22 and sufficiently restrict fluid leakage in the valve device 10.

Seventh Embodiment

Next, a seventh embodiment will be described with reference to FIG. 19. In the present embodiment, a portion different from the first embodiment will be mainly described.

Figure 19:
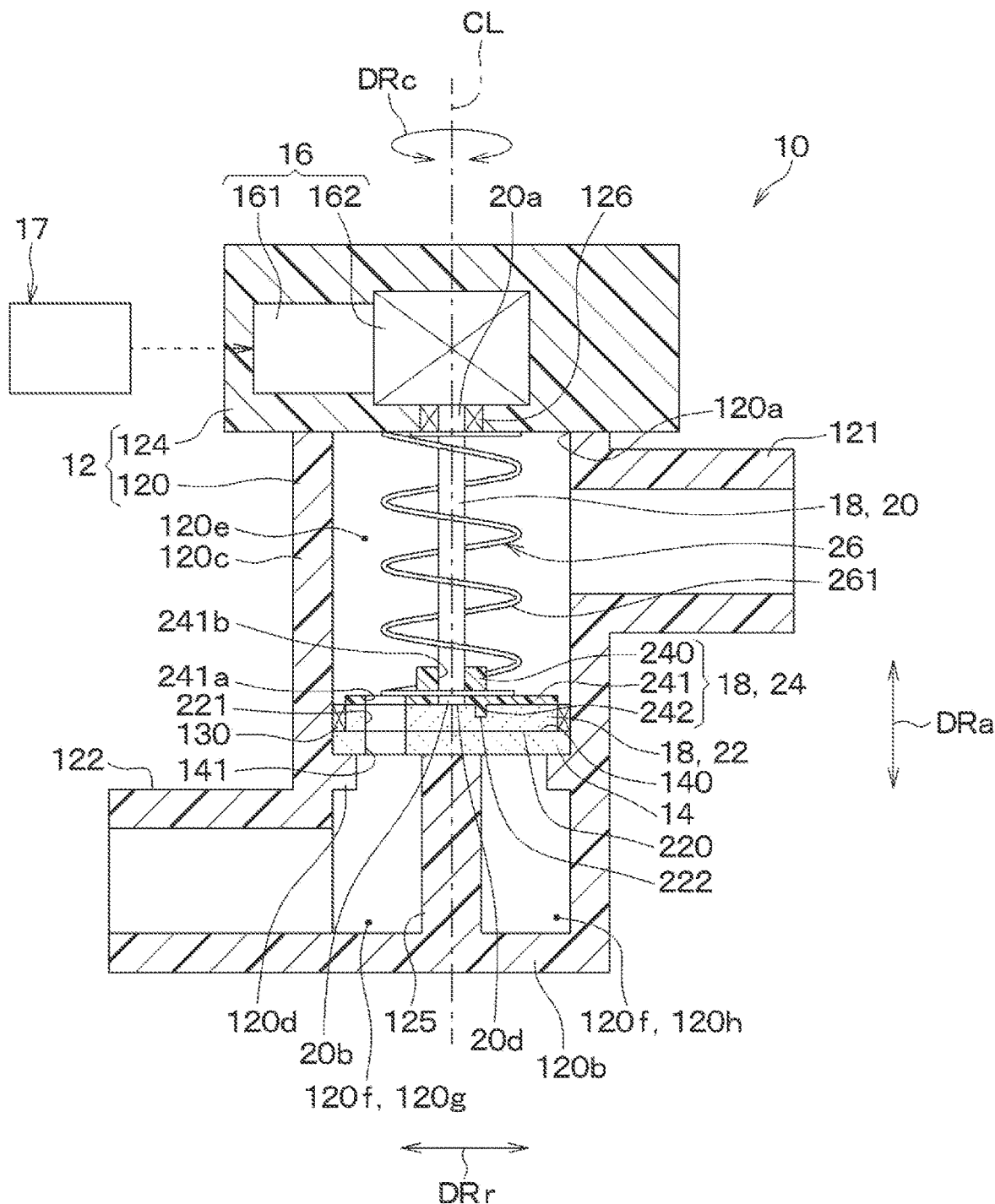
FIG. 19 is a schematic cross-sectional view illustrating a valve device according to a seventh embodiment.

As illustrated in FIG. 19, in the valve device 10, not the shaft 20 but the rotor 22 is rotatably held by the housing 12. Specifically, the outer peripheral portion of the rotor 22 is rotatably supported by a rotor bearing part 130 provided inside the body 120. The rotor bearing part 130 is formed of a plain bearing that receives an outer peripheral portion of the rotor 22 by a plain surface. The rotor bearing part 130 may be formed of another bearing such as a ball bearing instead of the plain bearing.

Further, the shaft 20 is merely coupled to the intermediate element 24 and is not inserted into the rotor 22 or the stator 14. The rotor 22 or the stator 14 of the present embodiment is not formed with an insertion hole through which the shaft 20 is inserted. The partition 125 of the present embodiment is not formed with the end reception groove 127.

The other configurations are similar to those of the first embodiment. As in the first embodiment, the valve device 10 of the present embodiment can obtain effects exhibited by a configuration similar or equal to those of the first embodiment.

In the valve device 10 of the present embodiment, the rotor 22 of the rotation part 18 is rotatably held by the housing 12 instead of the stator 14 constituting the flow path formation part. With such a configuration, as compared to a configuration in which the rotation part 18 is held by a member attached to the housing 12, the positional deviation of the end of the shaft 20 inside the housing 12 is less likely to occur.

Thus, also by the valve device 10 of the present embodiment, a change in the posture of the shaft 20 due to the positional deviation of the shaft 20 can be restricted, and the posture of the rotor 22 is easily stabilized. It is thus possible to restrict a deterioration in the accuracy of the flow rate control of the fluid due to a change in the postures of the rotor 22 and the occurrence of unintended fluid leakage.

Modification of Seventh Embodiment

In the valve device 10 of the seventh embodiment, not the shaft 20 but the rotor 22 is rotatably held by the housing 12, but it is not limited thereto. In the valve device 10, for example, each of the shaft 20 and the rotor 22 may be rotatably held by the housing 12.

Eighth Embodiment

Next, an eighth embodiment will be described with reference to FIGS. 20 and 21. In the present embodiment, a portion different from the first embodiment will be mainly described.

A valve device 10A of the present embodiment is configured as a two-way valve instead of a three-way valve. In addition, the valve device 10A is configured not as a disc valve but as a rotary type sleeve valve that performs a valve switching operation by rotation of a cylindrical valve body around the axis CL of the shaft 20.

Figure 20:
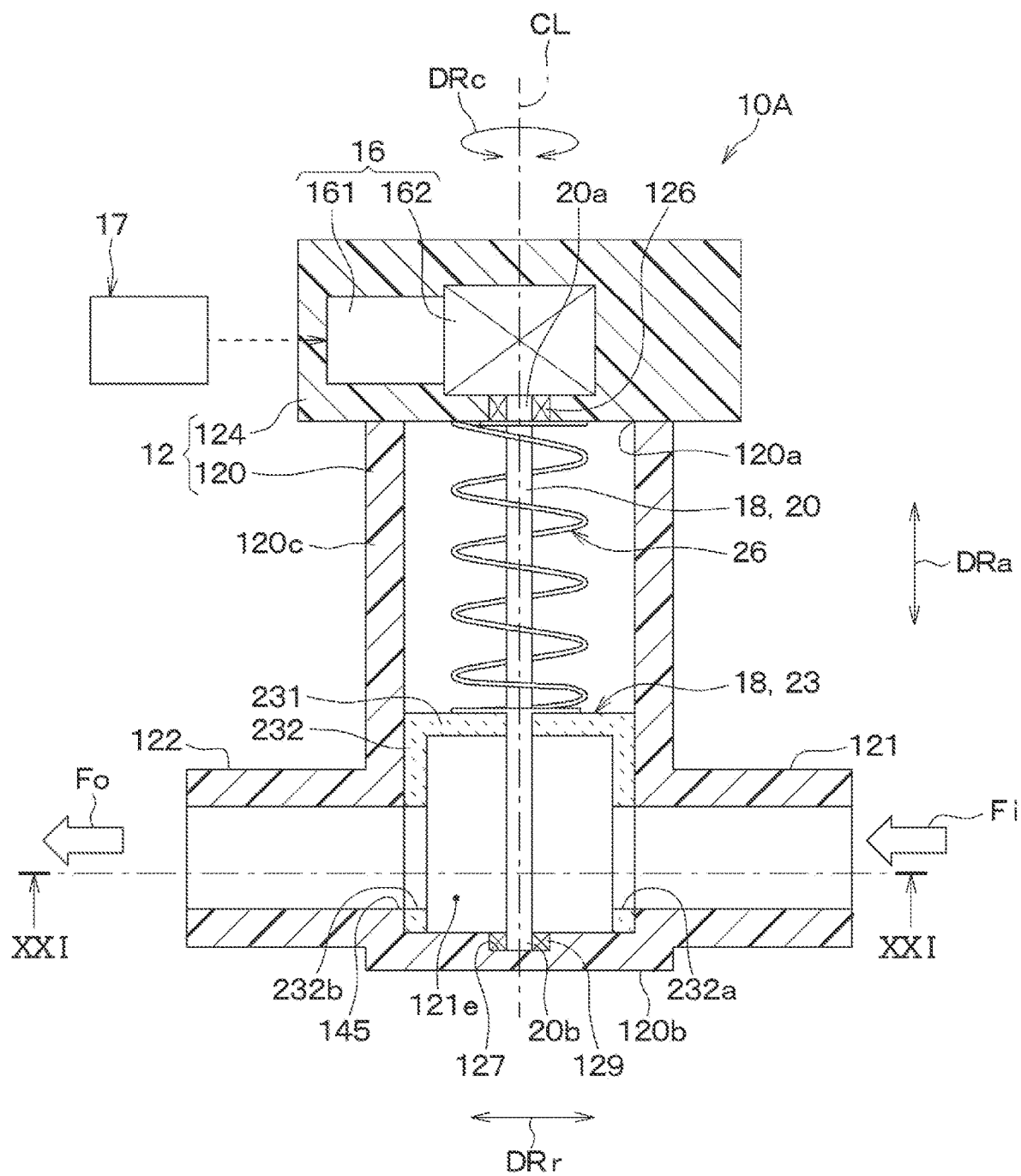
FIG. 20 is a schematic cross-sectional view illustrating a valve device according to an eighth embodiment.
Figure 21:
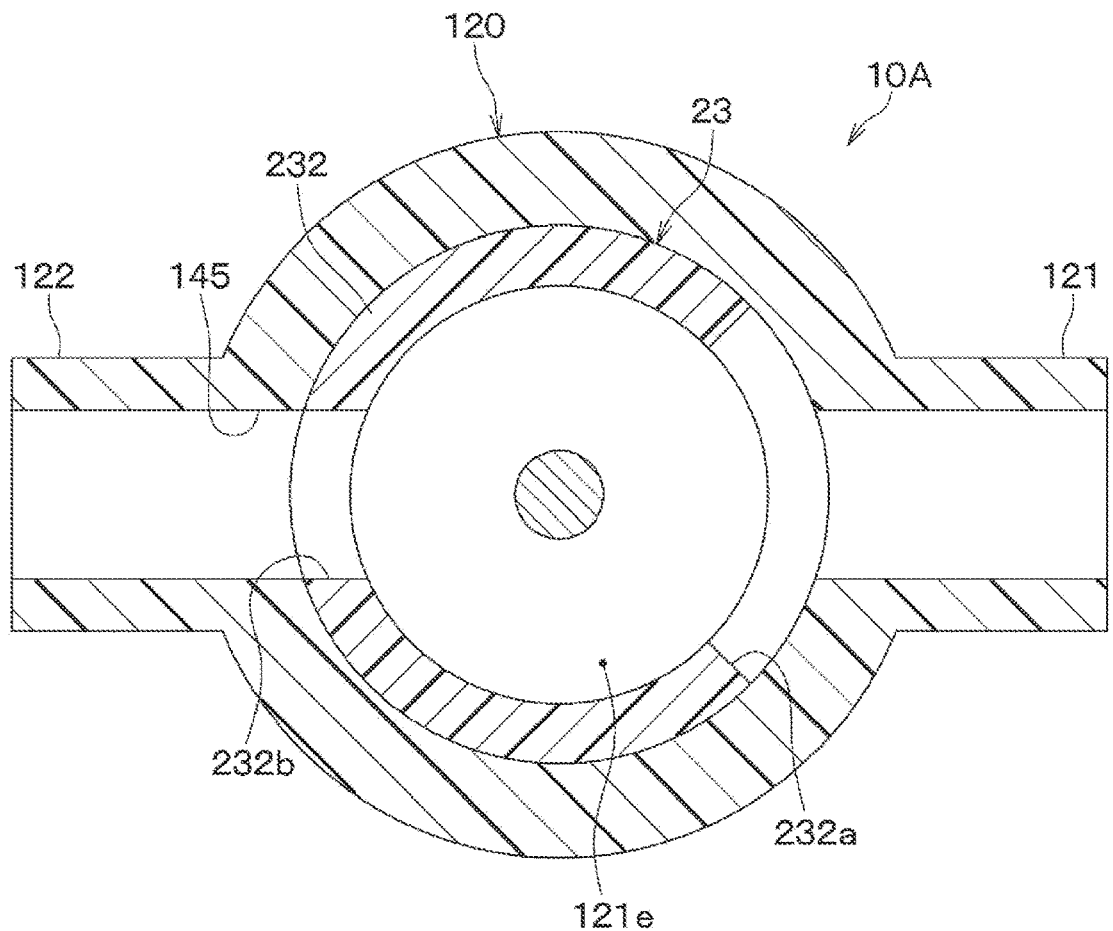
FIG. 21 is a cross-sectional view taken along a line XXI-XXI in FIG. 20.

As illustrated in FIGS. 20 and 21, the housing 12 is provided with the inlet 121 and the first outlet 122 and is not provided with the second outlet 123. The inlet 121 is provided in a portion of the housing 12 overlapping the rotor 23 in the radial direction DRr. Specifically, the inlet 121 is provided on the opposite side to the first outlet 122 across the rotor 23. The second-outlet-side space 121h is not formed inside the housing 12 due to the structure of the valve device 10A.

In the housing 12, a flow path hole 145 through which a fluid passes is formed at a connection portion between the body 120 and the first outlet 122. In the present embodiment, the housing 12 constitutes a flow path formation part. That is, in the valve device 10A, the flow path formation part is integrally formed with the housing 12. The valve device 10A does not have a configuration corresponding to the stator 14 described in the first embodiment.

The rotation part 18 includes the shaft 20 and a rotor 23 that increases or decreases the opening degree of the flow path hole 145 with the rotation of the shaft 20. The rotor 23 is directly coupled to the shaft 20. Hence the valve device 10A does not have a configuration corresponding to the intermediate element 24 described in the first embodiment.

The rotor 23 is rotatably housed inside the body 120 of the housing 12. The rotor 23 is a bottomed cylindrical valve body. The rotor 23 includes a top plate 231 and a cylindrical part 232.

The top plate 231 is formed of a disc-shaped member a thickness direction of which is the axial direction DRa of the shaft 20. The energization member 26 is provided between the top plate 231 and the body cover 124. The energization member 26 is provided, for example, to hold the rotor 23 in a predetermined posture.

The cylindrical part 232 extends along the axial direction DRa of the shaft 20 and has a substantially cylindrical shape centered on the axis CL of the shaft 20. The cylindrical part 232 extends from the outer peripheral portion of the top plate 231 toward the bottom wall 120b of the housing 12.

The cylindrical part 232 is formed with an inlet-side communication hole 232a that causes the inside of the cylindrical part 232 to communicate with the inlet 121. An inlet-side space 121e into which the fluid from the inlet 121 flows is formed inside the cylindrical part 232.

In the cylindrical part 232, a rotor hole 232b is formed at a position opposite to the inlet-side communication hole 232a across the axis CL of the shaft 20. The rotor hole 232b is formed in a portion of the rotor 23 overlapping the flow path hole 145 in the radial direction DRr when the rotor 23 is rotated.

Both sides of the shaft 20 in the axial direction DRa are rotatably held by the housing 12. The one-end-side portion 20a of the shaft 20 is rotatably held by a one-end-side bearing part 126 provided in the body cover 124. The other-end-side portion 20b of the shaft 20 is rotatably held by the other-end-side bearing part 129. The other-end-side bearing part 129 is installed in the end reception groove 127 formed in the bottom wall 120b of the housing 12. The other-end-side portion 20b of the shaft 20 may be rotatably supported not by the end reception groove 127 but by the end reception part 128 formed in the bottom wall 120b.

The other configurations are similar to those of the first embodiment. As in the first embodiment, the valve device 10A of the present embodiment can obtain effects exhibited by a configuration similar or equal to those of the first embodiment.

In the valve device 10A of the present embodiment, the rotor 23 of the rotation part 18 is rotatably held by the housing 12. With such a configuration, as compared to a configuration in which the rotation part 18 is held by a member attached to the housing 12, the positional deviation of the end of the shaft 20 inside the housing 12 is less likely to occur.

Therefore, also by the valve device 10A of the present embodiment, the change in the posture of the shaft 20 due to the positional deviation of the shaft 20 is restricted, and the posture of the rotor 22 can be stabilized. It is thus possible to restrict a deterioration in the accuracy of the flow rate control of the fluid due to changes in the postures of the shaft 20 and the rotor 22 and the occurrence of unintended fluid leakage.

Modification of Eighth Embodiment

The valve device 10A described in the eighth embodiment may be configured as, for example, a three-way valve instead of a two-way valve. In the valve device 10A, for example, the inlet 121 may be formed in the bottom wall 120b of the housing 12.

Ninth Embodiment

Next, a ninth embodiment will be described with reference to FIG. 22. In the present embodiment, a portion different from the first embodiment will be mainly described.

Figure 22:
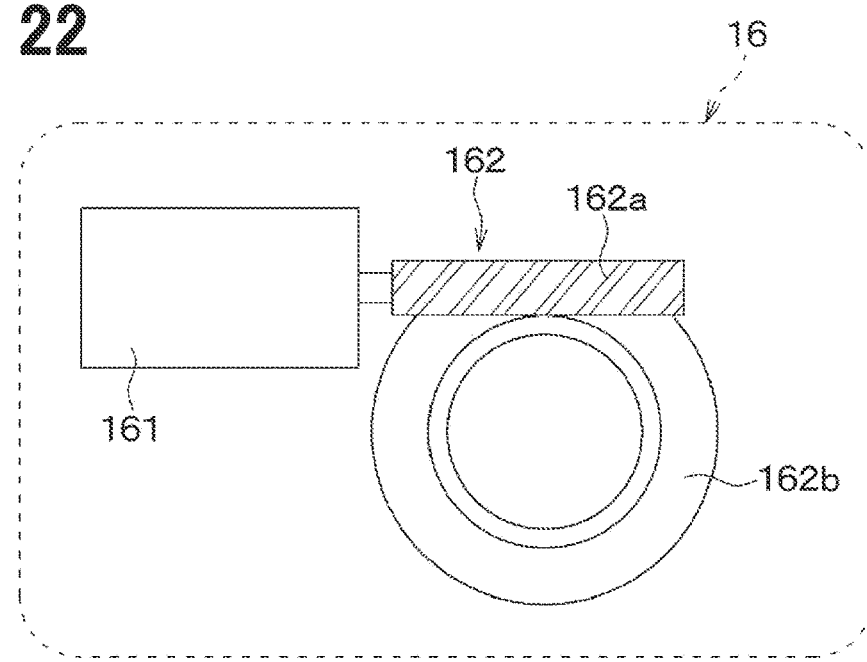
FIG. 22 is a schematic view illustrating a drive part of a valve device according to a ninth embodiment.

As illustrated in FIG. 22, the gear part 162 of the drive part 16 is formed of a worm gear instead of a gear mechanism including a helical gear or a spur gear. That is, the gear part 162 is formed of a worm gear that includes a worm 162a having helical teeth and a worm wheel 162b meshing with the worm 162a.

The worm gear has a self-locking function and basically cannot move the worm 162a from the worm wheel 162b. Therefore, even when a force in the circumferential direction DRc acts on the rotor 22 and the shaft 20 for some reason, the gear part 162 of the drive part 16 is restricted from moving unintentionally.

The other configurations are similar to those of the first embodiment. As in the first embodiment, the valve device 10 of the present embodiment can obtain effects exhibited by a configuration similar or equal to those of the first embodiment.

As described above, in the valve device 10 of the present embodiment, the worm gear is employed as the gear part 162. Thus, even when a force in the circumferential direction DRc acts on the rotor 22 and the shaft 20 at the stoppage of the drive part 16 or some other time like, the self-lock function of the worm gear can restrict the deviation of the rotor 22 and the shaft 20 in the circumferential direction DRc. This particularly effective in ensuring the accuracy of fluid flow rate control and restricting unintended fluid leakage.

Tenth Embodiment

Next, a tenth embodiment will be described with reference to FIGS. 23 to 35. In the present embodiment, a portion different from the first embodiment will be mainly described. In the present embodiment, the valve device 10 described in the first embodiment is applied to a control valve mounted on a temperature regulating apparatus 1 illustrated in FIG. 23.

The temperature regulating apparatus 1 is mounted on an electric vehicle that obtains a driving force for traveling from an electric motor. The temperature regulating apparatus 1 regulates the temperature of ventilation air into a cabin, which is a space to be air-conditioned, and regulates the temperatures of in-vehicle devices including a battery BT in the electric vehicle. The temperature regulating apparatus 1 can be interpreted as an air conditioner with a temperature regulating function for an in-vehicle device.

Figure 23:
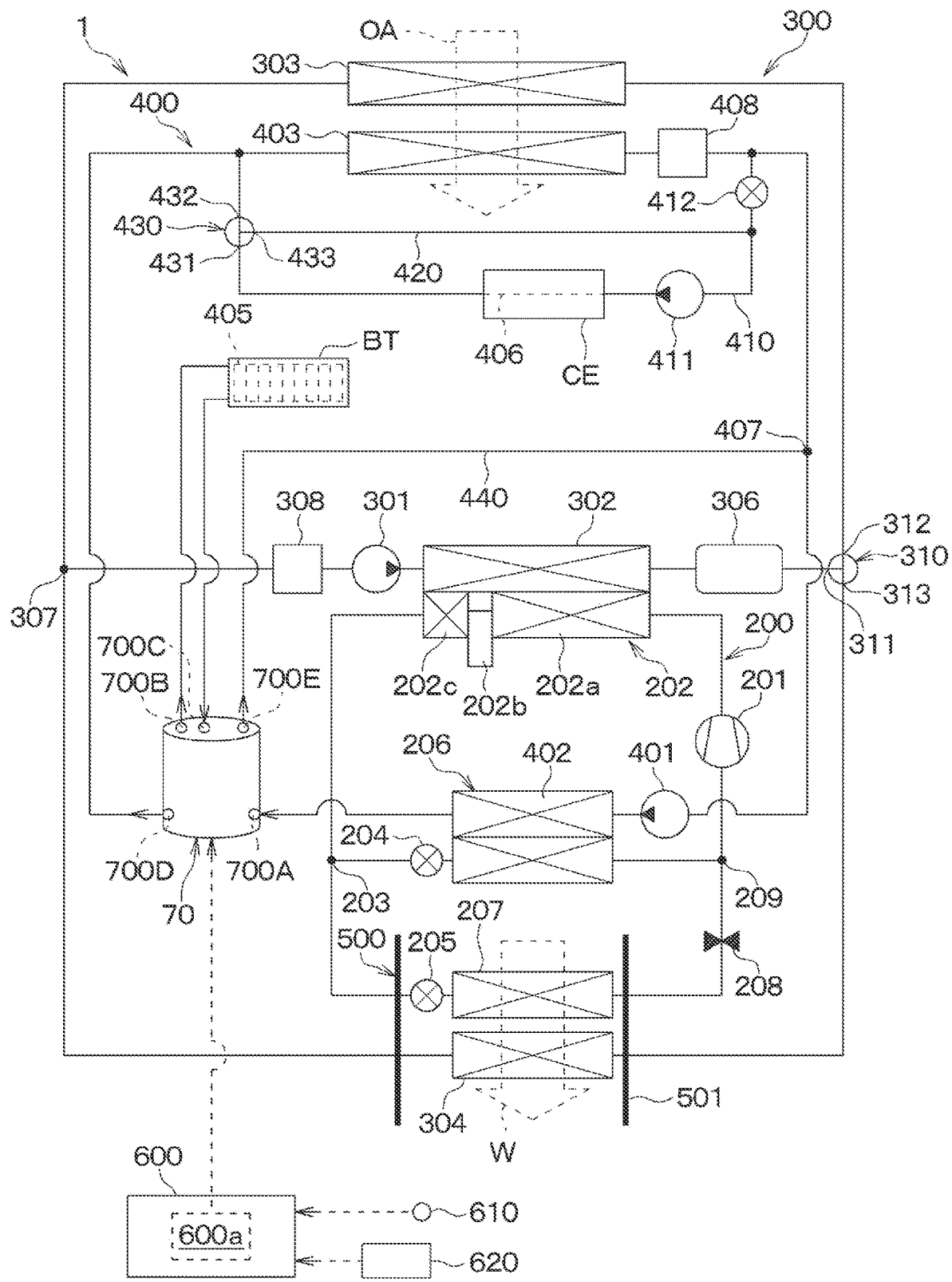
FIG. 23 is an overall configuration diagram of a temperature regulating apparatus according to a tenth embodiment.

As illustrated in FIG. 23, the temperature regulating apparatus 1 includes a refrigeration cycle device 200, a first fluid circulation circuit 300, a second fluid circulation circuit 400, an interior air conditioning unit 500, a control device 600, and the like.

The refrigeration cycle device 200 constitutes a vapor compression refrigeration cycle. The refrigeration cycle device 200 includes a compressor 201, a heat radiator 202, a first expansion valve 204, a second expansion valve 205, a chiller 206, an interior evaporator 207, an evaporating pressure regulating valve 208, and the like. The refrigeration cycle device 200 can switch a circuit configuration of a refrigerant circuit in accordance with various operation modes to be described later.

The refrigeration cycle device 200 uses a hydrofluoroolefin (HFO) refrigerant (e.g., R1234yf) as a refrigerant. The refrigeration cycle device 200 constitutes a subcritical refrigeration cycle in which the maximum value of the refrigerant pressure does not exceed the critical pressure of the refrigerant. Refrigerant oil (e.g., polyalkylene glycol (PAG) oil) for lubricating the sliding portions of the compressor 201 and the like is mixed in the refrigerant. A part of the refrigerant oil circulates in the refrigerant circuit of the refrigeration cycle device 200 together with the refrigerant.

The compressor 201 compresses and discharges the sucked refrigerant. The compressor 201 is disposed in a drive system housing chamber on the front side of the vehicle. The drive system housing chamber is a space in which an electric motor or the like serving as a drive source for traveling is disposed. The drive system housing chamber and the inside of the cabin are separated from each other by a firewall.

In the compressor 201, the refrigerant inlet side of the heat radiator 202 is connected to the refrigerant discharge side. The heat radiator 202 is a heat exchanger that exchanges heat between the refrigerant discharged from the compressor 201 and a high-temperature heat medium circulating in the first fluid circulation circuit 300 to dissipate heat from the refrigerant. The heat radiator 202 also functions as a heating heat exchanger that heats the high-temperature heating medium.

The refrigeration cycle device 200 employs a so-called subcooling heat exchanger as the heat radiator 202. That is, the heat radiator 202 is provided with a condensing part 202a, a receiver part 202b, and a subcooling part 202c.

The condensing part 202a is a condensing heat exchanging part that exchanges heat between the refrigerant discharged from the compressor 201 and the high-temperature heat medium to condense the high-pressure refrigerant. The receiver part 202b is a liquid reception part that separates the refrigerant flowing out of the condensing part 202a into gas and liquid and stores the separated liquid-phase refrigerant. The subcooling part 202c is a subcooling heat exchange part that exchanges heat between the liquid-phase refrigerant flowing out of the receiver part 202b and the high-temperature heat medium to subcool the liquid-phase refrigerant.

A refrigerant branch 203 is connected to the refrigerant outlet side of the heat radiator 202. The refrigerant branch 203 branches the flow of the refrigerant flowing out of the heat radiator 202. The refrigerant branch 203 is a three-way joint having three inflow outlets communicating with each other. One of the three inflow outlets of the refrigerant branch 203 is used as an inflow port, and the remaining two are used as outflow ports.

The refrigerant inlet side of the chiller 206 is connected to one outflow port of the refrigerant branch 203 via a first expansion valve 204. The refrigerant inlet side of the interior evaporator 207 is connected to the other outflow port of the refrigerant branch 203 via a second expansion valve 205.

The first expansion valve 204 is a decompression part that decompresses the refrigerant flowing out of one outflow port of the refrigerant branch 203. The first expansion valve 204 is an electric variable throttle mechanism including a valve body that changes a throttle opening and an electric actuator (e.g., stepping motor) that shifts the valve body. The operation of the first expansion valve 204 is controlled by a control pulse output from the control device 600.

The second expansion valve 205 is a decompression part that decompresses the refrigerant flowing out of the other outflow port of the refrigerant branch 203. The basic configuration of the second expansion valve 205 is the same as that of the first expansion valve 204.

Each of the first expansion valve 204 and the second expansion valve 205 has a full-open function of functioning as a simple refrigerant passage while hardly exerting a refrigerant decompressing action and a flow rate regulating action by fully opening the valve opening degree. Further, each of the first expansion valve 204 and the second expansion valve 205 has a full-close function of closing the refrigerant passage by fully closing the valve opening degree.

The first expansion valve 204 and the second expansion valve 205 can switch refrigerant circuits in various operation modes by the full-open function and the full-close function. Accordingly, each of the first expansion valve 204 and the second expansion valve 205 also functions as a refrigerant circuit switching part that switches the circuit configuration of the refrigeration cycle device 200.

The refrigerant inlet side of the chiller 206 is connected to the refrigerant outlet side of the first expansion valve 204. The chiller 206 is a heat exchanger that exchanges heat between a low-pressure refrigerant decompressed by the first expansion valve 204 and a low-temperature heating medium circulating in the second fluid circulation circuit 400. The chiller 206 is an evaporation part that cools the low-temperature heating medium by evaporating the low-pressure refrigerant to exert a heat absorbing action.

Thus, the chiller 206 in the second fluid circulation circuit 400 is a cooling device that cools the low-temperature heat medium. One inflow port side of a refrigerant junction 209 is connected to the refrigerant outlet side of the chiller 206.

The refrigerant inlet side of the interior evaporator 207 is connected to the refrigerant outlet side of the second expansion valve 205. The interior evaporator 207 is a heat exchanger that exchanges heat between a low-pressure refrigerant decompressed by the second expansion valve 205 and a ventilation air W blown into the cabin. The interior evaporator 207 is a cooling heat exchange unit that cools the ventilation air W by evaporating the low-pressure refrigerant to exert a heat absorbing action. The interior evaporator 207 is disposed in a casing 501 of an interior air conditioning unit 500 to be described later.

The refrigerant inlet side of the evaporating pressure regulating valve 208 is connected to the refrigerant outlet side of the interior evaporator 207. The evaporating pressure regulating valve 208 is an evaporating pressure regulating part that holds the refrigerant evaporating pressure at the interior evaporator 207 at a predetermined reference pressure or higher.

The evaporating pressure regulating valve 208 is a mechanical variable throttle mechanism that increases the valve opening degree with an increase in pressure on the refrigerant outlet side of the interior evaporator 207. The evaporating pressure regulating valve 208 holds a refrigerant evaporation temperature at the interior evaporator 207 to be equal to or higher than a frosting restriction temperature (e.g., 1° C.) at which frosting at the interior evaporator 207 can be restricted. The refrigerant outlet side of the evaporating pressure regulating valve 208 is connected to the other inflow port side of the refrigerant junction 209.

The refrigerant junction 209 joins the flow of the refrigerant flowing out of the chiller 206 and the flow of the refrigerant flowing out of the evaporating pressure regulating valve 208. The refrigerant junction 209 is a three-way joint similar to the refrigerant branch 203. Two of the three inflow outlets of the refrigerant junction 209 are used as inflow ports, and the remaining one is used as an outflow port. The refrigerant suction side of the compressor 201 is connected to the outflow port of the refrigerant junction 209.

Next, the first fluid circulation circuit 300 will be described. The first fluid circulation circuit 300 is a fluid circulation circuit in which a high-temperature heat medium, which is a fluid, circulates. In the first fluid circulation circuit 300, an ethylene glycol aqueous solution is employed as the high-temperature heat medium. In the first fluid circulation circuit 300, a high-temperature-side pump 301, the heat radiator 202, a high-temperature-side radiator 303, a heater core 304, a high-temperature-side switching valve 310, and the like are disposed.

The inlet side of a heat medium passage 302 of the heat radiator 202 is connected to a discharge port of the high-temperature-side pump 301. The high-temperature-side pump 301 pumps the high-temperature heat medium to the heat medium passage 302 of the heat radiator 202. The high-temperature-side pump 301 is an electric pump with its rotation speed (i.e., pumping capacity) controlled by a control voltage output from the control device 600.

An electric heater 306 is disposed on the outlet side of the heat medium passage 302 of the heat radiator 202. The electric heater 306 is a heating device that heats the high-temperature heat medium flowing out of the heat medium passage 302 of the heat radiator 202. In the first fluid circulation circuit 300, a positive temperature coefficient (PTC) heater having a PTC element (i.e., positive characteristic thermistor) is employed as the electric heater 306. The calorific value of the electric heater 306 is controlled by the control voltage output from the control device 600.

An inlet 311 of the high-temperature-side switching valve 310 is connected to the downstream side of the electric heater 306. The high-temperature-side switching valve 310 regulates a flow rate ratio between the high-temperature heat medium flowing into the high-temperature-side radiator 303 and the high-temperature heat medium flowing into the heater core 304. The high-temperature-side switching valve 310 constitutes the valve device of the present disclosure. The high-temperature-side switching valve 310 is configured as in the valve device 10 described in the first embodiment.

Figure 24:
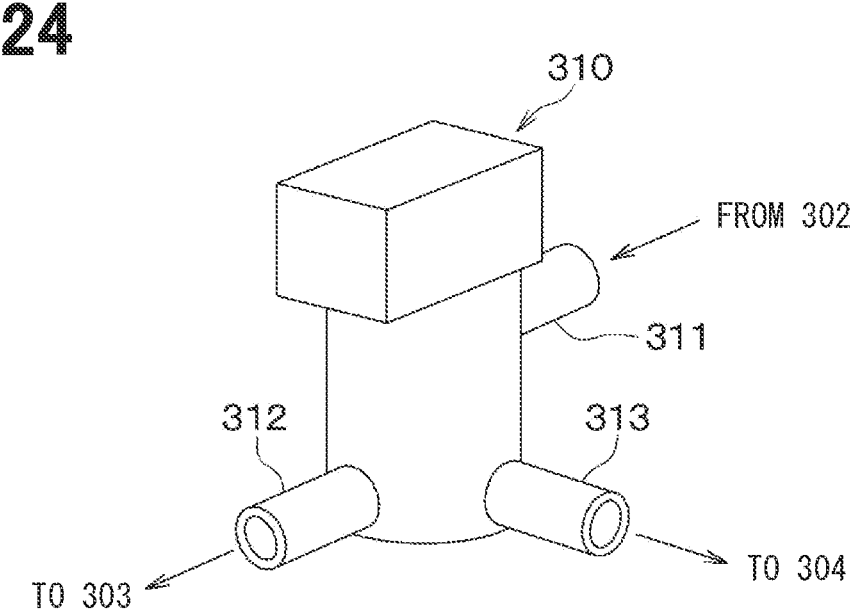
FIG. 24 is a schematic perspective view of a high-temperature-side switching valve according to the tenth embodiment.

As illustrated in FIG. 24, the high-temperature-side switching valve 310 includes an inlet 311 into which the high-temperature heat medium flows, a first outlet 312 from which the high-temperature heat medium is allowed to flow out to the high-temperature-side radiator 303, and a second outlet 313 from which the high-temperature heat medium is allowed to flow out to the heater core 304.

The first outlet 312 is connected to the fluid inlet side of the high-temperature-side radiator 303 and allows the high-temperature heat medium to flow out to the high-temperature-side radiator 303. The first outlet 312 corresponds to the first outlet 122 in the valve device 10 of the first embodiment.

The second outlet 313 is connected to the fluid inlet side of the heater core 304 and allows the high-temperature heating medium to flow out to the heater core 304. The second outlet 313 corresponds to the second outlet 123 in the valve device 10 of the first embodiment.

The inlet 311 is connected to the fluid outlet side of the high-temperature-side radiator 303 and the fluid outlet side of the heater core 304, and the high-temperature heat medium flows in from the high-temperature-side radiator 303 and the heater core 304. The inlet 311 corresponds to the inlet 121 in the valve device 10 of the first embodiment.

The high-temperature-side switching valve 310 is configured such that a flow rate ratio between the high-temperature heat medium passing through the high-temperature-side radiator 303 and the high-temperature heat medium passing through the heater core 304 is regulated by rotationally shifting the rotor 22. Specifically, by increasing or decreasing the opening degree of the first flow path hole 141 and the opening degree of the second flow path hole 142 by the rotor 22, the high-temperature-side switching valve 310 regulates the flow rate ratio of the high-temperature heat medium passing through the high-temperature-side radiator 303 and the high-temperature heat medium passing through the heater core 304.

The operation of the high-temperature-side switching valve 310 is controlled by a control pulse output from the control device 600. The control device 600 also has a function as the valve controller 17 described in the first embodiment.

Returning to FIG. 23, the high-temperature-side radiator 303 is an exterior heat exchanger that exchanges heat between the high-temperature heat medium heated by the heat radiator 202 and the like and the air outside the cabin (i.e., outside air OA) blown from an outside air fan (not illustrated).

The high-temperature-side radiator 303 is disposed on the front side of the drive system housing chamber. During the traveling of the vehicle, traveling air (i.e., outside air OA) flowing into the drive system housing chamber via a grill can be blown against the high-temperature-side radiator 303. One inflow port side of a high-temperature-side junction 307 is connected to the fluid outlet side of the high-temperature-side radiator 303.

The heater core 304 is an interior heat exchanger that heats the ventilation air W by exchanging heat between the high-temperature heat medium heated by the heat radiator 202 and the like and the ventilation air W blown into the room. The heater core 304 is disposed in the casing 501 of the interior air conditioning unit 500. In the heater core 304, the ventilation air W is heated using the heat absorbed by the refrigerant in the chiller 206 as a heating source. The other inflow port side of the high-temperature-side junction 307 is connected to the fluid outlet side of the heater core 304.

The high-temperature-side junction 307 joins the flow of the refrigerant flowing out of the high-temperature-side radiator 303 and the flow of the refrigerant flowing out of the heater core 304. The high-temperature-side junction 307 is a three-way joint similar to refrigerant junction 209. The fluid suction side of the high-temperature-side pump 301 is connected to the fluid outlet side of the high-temperature-side junction 307 via a high-temperature-side reserve tank 308.

The high-temperature-side reserve tank 308 is a storage part for a high-temperature heat medium that stores the high-temperature heat medium that is surplus in the first fluid circulation circuit 300. In the first fluid circulation circuit 300, by disposing the high-temperature-side reserve tank 308, a decrease in the liquid amount of the high-temperature heat medium circulating in the first fluid circulation circuit 300 is restricted. The high-temperature-side reserve tank 308 has a heat medium supply port for supplying the high-temperature heat medium when the liquid amount of the high-temperature heat medium circulating in the first fluid circulation circuit 300 is insufficient.

Next, the second fluid circulation circuit 400 will be described. The second fluid circulation circuit 400 is a fluid circulation circuit in which a low-temperature heating medium, which is a fluid, circulates. In the second fluid circulation circuit 400, the same type of heat medium as the high-temperature heat medium is employed as the low-temperature heat medium.

In the second fluid circulation circuit 400, a low-temperature-side pump 401, a heat medium passage 402 of the chiller 206, a low-temperature-side radiator 403, to flow path switching valve 70, a cooling water passage 405 of the battery BT, a cooling water passage 406 of an in-vehicle device CE, and the like are disposed.

The inlet side of the heat medium passage 402 of the chiller 206 is connected to the fluid outlet side of the low-temperature-side pump 401. The low-temperature-side pump 401 is a pumping part that pumps the low-temperature heat medium to the heat medium passage 402 of the chiller 206. The basic configuration of the low-temperature-side pump 401 is the same as that of the high-temperature-side pump 301.

A first inlet 700A side of the flow path switching valve 70 is connected to the fluid outlet side of the heat medium passage 402 of the chiller 206. The flow path switching valve 70 is a circuit switching part that switches the circuit configuration of the second fluid circulation circuit 400. The flow path switching valve 70 is provided with a plurality of inlets and a plurality of outlets. The cooling water passage 405, the low-temperature-side radiator 403, and the like of the battery BT are connected to these inlets and outlets. The detailed configuration of the flow path switching valve 70 will be described later.

The battery BT supplies power to the electric in-vehicle device CE such as an electric motor. The battery BT is an assembled battery formed by electrically connecting a plurality of battery cells in series or in parallel. The battery cell is formed of a secondary battery that can be charged and discharged (e.g., lithium-ion battery). The battery BT is a battery in which a plurality of battery cells are stacked and arranged in a substantially rectangular parallelepiped shape and housed in a dedicated case.

In this type of battery BT, a chemical reaction is less likely to proceed, and the output is likely to decrease at a low temperature. The battery BT generates heat during charging and discharging. Further, the battery BT is likely to deteriorate at a high temperature. Therefore, the temperature of the battery BT is desirably held within an appropriate temperature range (e.g., 15° C. or higher and 55° C. or lower) in which the charge-discharge capacity of the battery BT can be utilized sufficiently.

The cooling water passage 405 of the battery BT is formed in the dedicated case of the battery BT. The cooling water passage 405 is a heat medium passage for exchanging heat between the low-temperature heat medium and the battery BT. More specifically, the cooling water passage 405 is a heat medium passage for absorbing heat that causes the low-temperature heat medium to absorb heat of the battery BT. Therefore, the battery BT also functions as a heating device that heats the low-temperature heating medium in the second fluid circulation circuit 400.

The passage configuration of the cooling water passage 405 of the battery BT is a passage configuration in which a plurality of passages are connected in parallel inside the dedicated case. As a result, the cooling water passage 405 of the battery BT is formed to be capable of uniformly absorbing heat from the entire region of the battery BT. In other words, the cooling water passage 405 is formed so as to uniformly absorb the heat of all the battery cells and uniformly cool all the battery cells.

The low-temperature-side radiator 403 is an exterior heat exchanger that exchanges heat between the low-temperature heat medium flowing out of a second outlet 700D of the flow path switching valve 70 and the outside air OA blown from the outside air fan. The low-temperature-side radiator 403 is disposed on the front side of the drive system housing chamber and on the outside airflow downstream side of the high-temperature-side radiator 303. Therefore, the low-temperature-side radiator 403 exchanges heat between the outside air OA after passing through the high-temperature-side radiator 303 and the low-temperature heat medium. The low-temperature-side radiator 403 may be formed integrally with the high-temperature-side radiator 303.

The heat medium outlet of the low-temperature-side radiator 403 is connected to one inflow port side of a low-temperature-side junction 407 via a low-temperature-side reserve tank 408.

The low-temperature-side reserve tank 408 is a storage part for a low-temperature heating medium that stores the low-temperature heating medium that is surplus in the second fluid circulation circuit 400. The basic configuration of the low-temperature-side reserve tank 408 is the same as that of the high-temperature-side reserve tank 308. The low-temperature-side junction 407 is a three-way joint similar to the high-temperature-side junction 307 and the like.

The fluid suction side of the low-temperature-side pump 401 is connected to the fluid outlet side of the low-temperature-side junction 407. In other words, the low-temperature-side pump 401 is disposed in the flow path from the outflow port of the low-temperature-side junction 407 to the fluid inlet side of the heat medium passage 402 of the chiller 206 in the second fluid circulation circuit 400.

A device cooling passage 410 in which the cooling water passage 406 of the in-vehicle device CE is disposed is connected to the second fluid circulation circuit 400. The device cooling passage 410 is connected to return the low-temperature heat medium on the downstream side of the low-temperature-side reserve tank 408 and on the upstream side of the low-temperature-side junction 407 to the inlet side of the low-temperature-side radiator 403 again.

A device pump 411 is disposed in the device cooling passage 410. The device pump 411 pumps the low-temperature heating medium to the cooling water passage 406 of the in-vehicle device CE. The basic configuration of the device pump 411 is the same as that of the low-temperature-side pump 401.

The in-vehicle device CE is a heat generator that generates heat during operation. Specifically, the in-vehicle device CE is an electric motor, an inverter, a control device for an advanced operation system, or the like. The electric motor is an in-vehicle device that outputs a driving force for traveling. The inverter is an in-vehicle device that supplies electric power to the electric motor. An advanced driving system control device is a control device for a so-called ADAS. ADAS is an abbreviation for advanced driver assistance system.

In order to appropriately operate the in-vehicle device CE, similarly to the battery BT, it is desirable that the in-vehicle device CE is held within an appropriate temperature range. However, an appropriate temperature range of the battery BT and an appropriate temperature range of the in-vehicle device CE are different. In the present embodiment, the upper limit value of the appropriate temperature range of the in-vehicle device CE is higher than the upper limit value of the appropriate temperature range of the battery BT.

The cooling water passage 406 through which the low-temperature heating medium is allowed to flow is formed inside a housing part or a case forming an outer shell of the in-vehicle device CE. The cooling water passage 406 is a heat medium passage for absorbing heat that causes the low-temperature heat medium to absorb heat (i.e., waste heat of the in-vehicle device CE) of the in-vehicle device CE. The cooling water passage 406 constitutes a temperature regulating part that regulates the temperature of the in-vehicle device CE which is a heat generator.

Further, a device bypass passage 420 is connected to the second fluid circulation circuit 400. The device bypass passage 420 is a heat medium passage that returns the low-temperature heat medium flowing out of the cooling water passage 406 of the in-vehicle device CE to the fluid inlet side of the device pump 411 again, while causing the low-temperature heat medium to bypass the low-temperature-side radiator 403 and the like. The device bypass passage 420 constitutes a bypass part that causes the low-temperature heat medium to flow while bypassing the low-temperature-side radiator 403 which is the exterior heat exchanger.

In the device cooling passage 410, a device flow rate regulating valve 412 is disposed on the upstream side of the connection part with the device bypass passage 420. The device flow rate regulating valve 412 is an electric flow rate regulating valve including a valve body that changes a passage cross-sectional area of the device cooling passage 410 and an electric actuator (e.g., stepping motor) that shifts the valve body. The operation of the device flow rate regulating valve 412 is controlled by a control pulse output from the control device 600.

A low-temperature-side switching valve 430 is disposed at a connection part between the device cooling passage 410 and the device bypass passage 420. The low-temperature-side switching valve 430 regulates a flow rate ratio between the low-temperature heat medium flowing into the low-temperature-side radiator 403 and the low-temperature heat medium flowing into the device bypass passage 420. The low-temperature-side switching valve 430 constitutes the valve device of the present disclosure similarly to the high-temperature-side switching valve 310. The low-temperature-side switching valve 430 is configured as in the valve device 10 described in the first embodiment.

Figure 25:
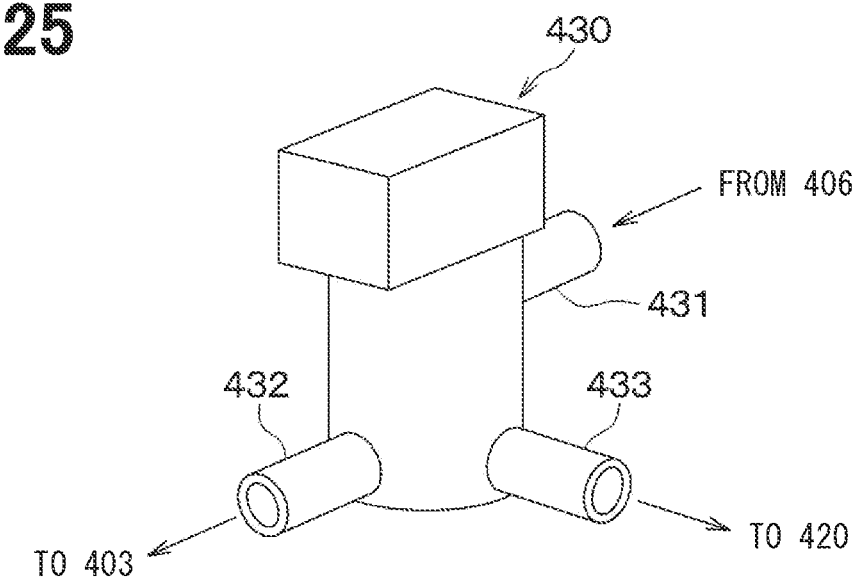
FIG. 25 is a schematic perspective view of a low-temperature-side switching valve according to the tenth embodiment.

As illustrated in FIG. 25, the low-temperature-side switching valve 430 includes an inlet 431 into which the low-temperature heat medium flows, a first outlet 432 from which the low-temperature heat medium is allowed to flow out to the low-temperature-side radiator 403, and a second outlet 433 from which the low-temperature heat medium is allowed to flow out to the device bypass passage 420.

The first outlet 432 is connected to the fluid inlet side of the low-temperature-side radiator 403 and allows the low-temperature heat medium to flow out to the low-temperature-side radiator 403. The first outlet 432 corresponds to the first outlet 122 in the valve device 10 of the first embodiment.

The second outlet 433 is connected to the fluid inlet side of the device bypass passage 420 and allows the low-temperature heating medium to flow out to the device bypass passage 420. The second outlet 433 corresponds to the second outlet 123 in the valve device 10 of the first embodiment.

The inlet 431 is connected to the fluid outlet side of the cooling water passage 406 of the in-vehicle device CE which is the temperature regulating part, and the fluid passing through the cooling water passage 406 flows into the inlet 431. The inlet 431 corresponds to the inlet 121 in the valve device 10 of the first embodiment.

The low-temperature-side switching valve 430 is configured such that a flow rate ratio between the low-temperature heat medium passing through the low-temperature-side radiator 403 and the low-temperature heat medium passing through the device bypass passage 420 is regulated by rotationally shifting the rotor 22. Specifically, by increasing or decreasing the opening degree of the first flow path hole 141 and the opening degree of the second flow path hole 142 by the rotor 22, in the low-temperature-side switching valve 430 regulates the flow rate ratio of the low-temperature heat medium passing through the low-temperature-side radiator 403 and the low-temperature heat medium passing through the device bypass passage 420.

The operation of the low-temperature-side switching valve 430 is controlled by a control pulse output from the control device 600. The control device 600 also has a function as the valve controller 17 described in the first embodiment.

Returning to FIG. 23, the second fluid circulation circuit 400 is connected with a short-circuiting heat medium passage 440 that guides the low-temperature heat medium flowing out of the third outlet 700E of the flow path switching valve 70 to the other inflow port of the low-temperature-side junction 407.

Figure 26:
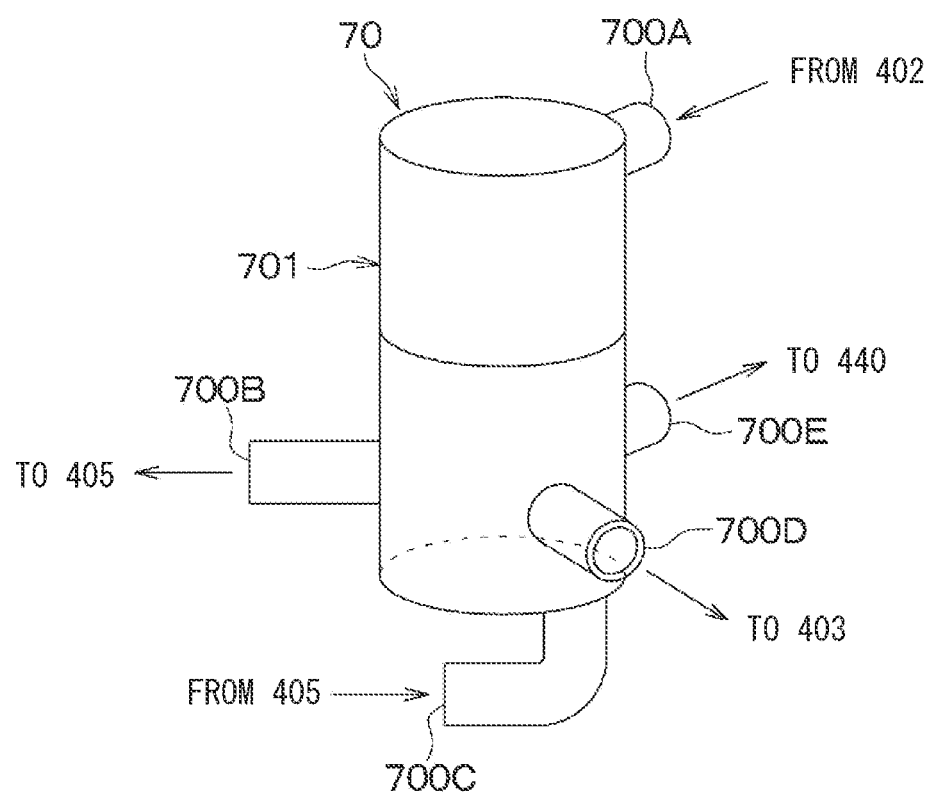
FIG. 26 is a schematic perspective view of a flow path switching valve according to the tenth embodiment.
Figure 27:
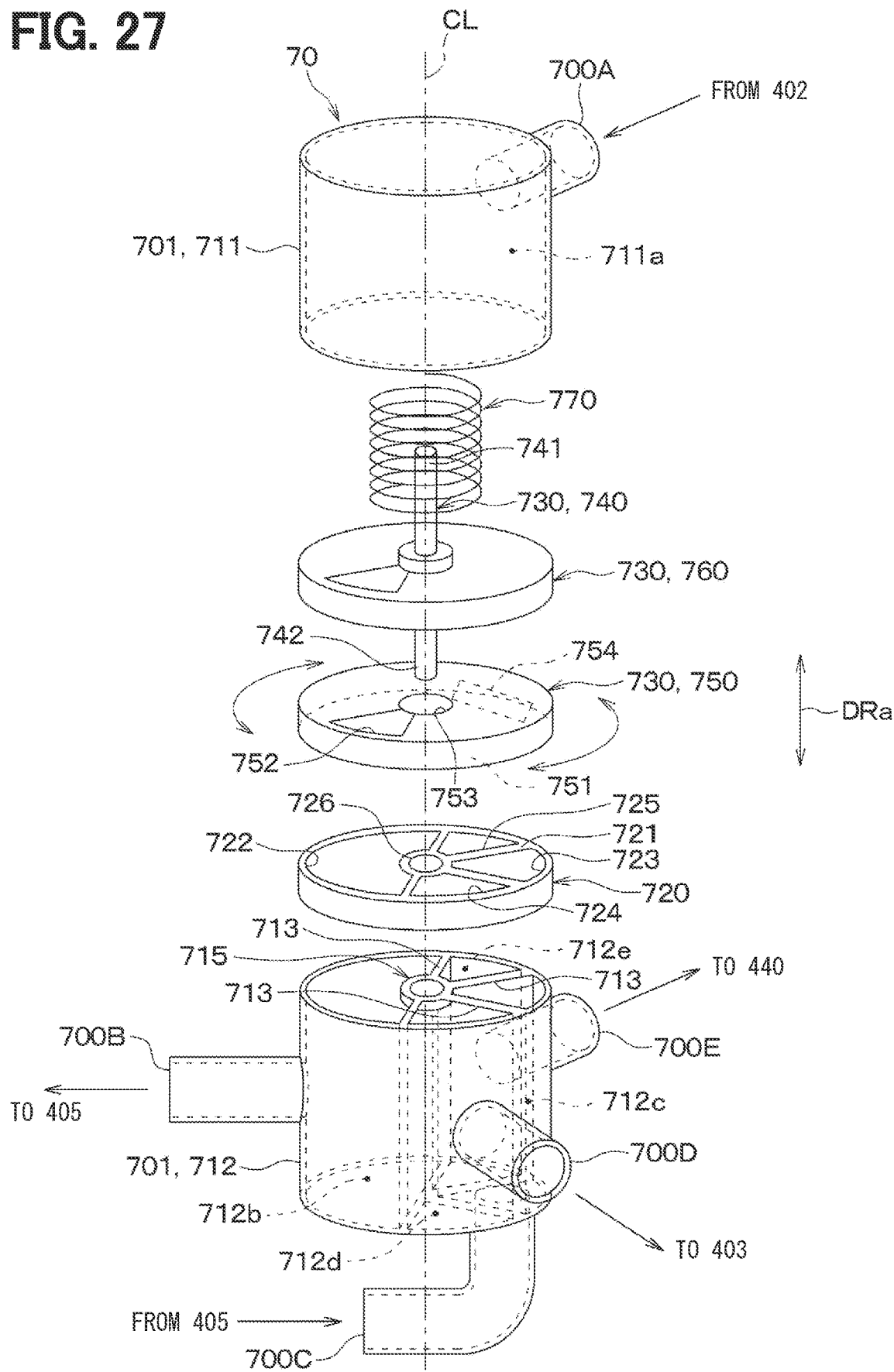
FIG. 27 is a schematic exploded perspective view of the flow path switching valve.

Next, a detailed configuration of the flow path switching valve 70 will be described with reference to FIGS. 26 and 27. As illustrated in the external perspective view of FIG. 26, the flow path switching valve 70 has a body 701 made of resin and formed in a bottomed cylindrical shape. The body 701 is a housing having a plurality of inlets into which the low-temperature heating medium is allowed to flow and a plurality of outlets from which the low-temperature heating medium is allowed to flow out of the inside. Specifically, the body 701 of the present embodiment has two inlets and three outlets. Hence, the flow path switching valve 70 is a five-way valve having five ports.

Specifically, the flow path switching valve 70 is provided with the first inlet 700A and a second inlet 700C. The first inlet 700A is an inlet into which the low-temperature heat medium, which is pumped from the low-temperature-side pump 401 and has passed through the heat medium passage 402 of the chiller 206, is allowed to flow. The second inlet 700C is an inlet into which the low-temperature heat medium flowing out of the cooling water passage 405 of the battery BT is allowed to flow.

The flow path switching valve 70 is provided with a first outlet 700B, the second outlet 700D, and a third outlet 700E. The first outlet 700B is an outlet from which the low-temperature heating medium is allowed to flow out to the fluid inlet side of the cooling water passage 405 of the battery BT. The second outlet 700D is an outlet from which the low-temperature heat medium is allowed to flow out to the fluid inlet side of the low-temperature-side radiator 403. The third outlet 700E is an outlet from which the low-temperature heat medium is allowed to flow out to the fluid inlet side of the heat medium passage 402 of the chiller 206 (i.e., to the short-circuiting heat medium passage 440).

Here, the cooling water passage 405 of the battery BT is disposed in the heat medium passage from the first outlet 700B to the second inlet 700C. In other words, the cooling water passage 405 of the battery BT is disposed in the heat medium passage from the first outlet 700B to the second inlet 700C. The second inlet 700C serves as an inlet through which the low-temperature heating medium flowing out of the body 701 from the first outlet 700B is allowed to flow into the inside again.

The body 701 of the flow path switching valve 70 is divided into a first body 711 and a second body 712. The first body 711 and the second body 712 are both formed in a cylindrical shape and disposed coaxially. One end side of the first body 711 in the axial direction DRa is closed by the lid part, and the other end side is opened. The other end side in the axial direction DRa of the second body 712 is closed by the bottom part, and one end side is opened.

A stator 720 is disposed inside the body 701. The stator 720 is disposed near a connection part between the first body 711 and the second body 712. A plurality of spaces are formed inside the body 701 by the stator 720.

Specifically, a first-inlet-side space 711a is formed inside the first body 711. The first-inlet-side space 711a is a substantially columnar space communicating with the first inlet 700A. A first-outlet-side space 712b, a second-inlet-side space 712c, a second-outlet-side space 712d, and a third-outlet-side space 712e are formed inside the second body 712. More specifically, a plurality of partition plates 713 radially extending from an axis CL of a shaft 740 is disposed inside the second body 712. The partition plate 713 partitions the internal space of the second body 712 into a plurality of spaces in the circumferential direction DRc.

The first-outlet-side space 712b is a space communicating with the first outlet 700B. The second-inlet-side space 712c is a space communicating with the second inlet 700C. The second-outlet-side space 712d is a space communicating with the second outlet 700D. The third-outlet-side space 712e is a space communicating with the third outlet 700E.

Each of the first-outlet-side space 712b, the second-inlet-side space 712c, the second-outlet-side space 712d, and the third-outlet-side space 712e is a columnar space formed in a sector shape (i.e., a fan shape) in cross section and extending in the axial direction DRa. The first-outlet-side space 712b, the third-outlet-side space 712e, the second-inlet-side space 712c, and the second-outlet-side space 712d are arranged in this order in the clockwise direction when viewed from the first body 711 side in the axial direction DRa. That is, the second-inlet-side space 712c is disposed so as to be adjacent to both the second-outlet-side space 712d and the third-outlet-side space 712e in the circumferential direction DRc.

The stator 720 is a member corresponding to the stator 14 of the valve device 10 of the first embodiment. The constituent material and the like of the stator 720 are configured in the same manner as those of the stator 14 of the first embodiment.

The stator 720 is formed of a disc-shaped member a thickness direction of which is the axial direction DRa. The stator 720 has an opening surface 721 as a surface on which a rotor 750 to be described later slides. The opening surface 721 is a sealing surface corresponding to a sliding surface 751 of the rotor 750 to be described later.

The stator 720 constitutes a flow path formation part formed with a flow path hole through which a fluid passes. In the stator 720, a first flow path hole 722, a second flow path hole 723, a third flow path hole 724, and a fourth flow path hole 725 through which a fluid passes are formed.

Specifically, the first flow path hole 722 is provided in a portion of the stator 720 corresponding to the first-outlet-side space 712b so as to communicate with the first-outlet-side space 712b. The second flow path hole 723 is provided in a portion of the stator 720 corresponding to the second-inlet-side space 712c so as to communicate with the second-inlet-side space 712c. The third flow path hole 724 is provided in a portion of the stator 720 corresponding to the second-outlet-side space 712d so as to communicate with the second-outlet-side space 712d. The fourth flow path hole 725 is provided in a portion of the stator 720 corresponding to the third-outlet-side space 712e so as to communicate with the third-outlet-side space 712e.

A stator insertion hole 726 through which an other-end-side portion 742 of the shaft 740 is inserted is formed in a substantially central portion of the stator 720. The other-end-side portion 742 of the shaft 740 is a portion of the shaft 740 opposite to a one-end-side portion 741 to which a rotational force is transmitted from the drive part (not illustrated) in the axial direction DRa. The stator insertion hole 726 has an inner diameter larger than the diameter of the shaft 740 so that the shaft 740 does not slide.

The drive part is a device for outputting rotational force. The drive part is a device corresponding to the drive part 16 of the valve device 10 of the first embodiment. The drive part of the present embodiment is configured in the same manner as the drive part 16 of the first embodiment.

A rotation part 730, which rotates by a rotational force output from the drive part, and an energization member 770 are disposed inside the body 701. The rotation part 730 corresponds to the rotation part 18 of the valve device 10 of the first embodiment. The rotation part 730 includes the shaft 740, the rotor 750 as a valve body, and an intermediate element 760 that couples the rotor 750 to the shaft 740.

The shaft 740 is a rotation shaft that rotates about a predetermined axis CL by the rotational force output from the drive part. The shaft 740 extends along the axial direction DRa. The shaft 740 has the one-end-side portion 741 to which the rotational force is transmitted from the drive part to one side in the axial direction DRa and the other-end-side portion 742 opposite to the one-end-side portion 741 in the axial direction DRa. The shaft 740 is coupled to the rotor 750 via the intermediate element 760 so as to be relatively non-rotatable.

The flow path switching valve 70 has a both-end holding structure in which both sides in the axial direction DRa of the shaft 740 are rotatably held by the body 701 that is a housing. The one-end-side portion 741 of the shaft 740 is rotatably held by the first body 711 constituting the housing.

On the other hand, the other-end-side portion 742 of the shaft 740 is rotatably held with respect to an end reception part 715 provided in the second body 712 constituting the housing. The holding structure of the other-end-side portion 742 of the shaft 740 is similar to the holding structure of the shaft 20 of the first embodiment, and hence the description thereof will be omitted in the present embodiment.

The rotor 750 is a valve body that increases or decreases the opening degree of each of the flow path holes 722 to 725 formed in the stator 720 with the rotation of the shaft 740. The rotor 750 is a member corresponding to the rotor 22 of the valve device 10 of the first embodiment. The constituent material and the like of the rotor 750 are configured in the same manner as those of the rotor 22 of the first embodiment.

The rotor 750 is disposed in the first-inlet-side space 711a so as to face the stator 14 in the axial direction DRa. The rotor 750 has the sliding surface 751 facing the opening surface 721 of the stator 720. The sliding surface 751 is a sealing surface that seals the opening surface 721 of the stator 720.

A rotor hole 752 is formed in the rotor 750 at a position eccentric to the axis CL of the shaft 20. The rotor hole 752 is a through hole penetrating in the axial direction DRa. The rotor hole 752 is formed in a portion of the rotor 750 overlapping each of the flow path holes 722 to 725 in the axial direction DRa when the rotor 750 is rotated.

A rotor insertion hole 753 through which the shaft 740 is inserted is formed in a substantially central portion of the rotor 750. The rotor insertion hole 753 has an inner diameter larger than the diameter of the shaft 740 so that the shaft 740 does not slide.

The intermediate element 760 is a member that couples the rotor 750 to the shaft 740, and forms a part of a coupling structure that couples the rotor 750 to the shaft 740. The intermediate element 760 is configured in the same manner as the intermediate element 24 of the valve device 10 of the first embodiment.

The energization member 770 is a member that energizes the rotor 22 toward the stator 14 corresponding to the flow path formation part. The energization member 770 is configured in the same manner as the energization member 26 of the valve device 10 of the first embodiment.

The flow path switching valve 70 of the present embodiment can cause the first-inlet-side space 711a to communicate with any one of the outlet-side spaces 712b, 712d, 712e via the rotor hole 752 and one of the flow path holes 723, 724, 725 by rotationally shifting the rotor 750. That is, the flow path switching valve 70 can allow the low-temperature heat medium flowing in from the first inlet 700A to flow out of any one of the plurality of outlets 700B, 700D, 700E by rotationally shifting the rotor 750.

Specifically, the flow path switching valve 70 can cause the first-inlet-side space 711a to communicate with any one of the first-outlet-side space 712b, the second-outlet-side space 712d, and the third-outlet-side space 712e by rotationally shifting the rotor 750. Accordingly, the low-temperature heat medium flowing in from the first inlet 700A can be switched to any one of a passage configuration for allowing the low-temperature heat medium to flow out of the first outlet 700B, a passage configuration for allowing the low-temperature heat medium to flow out of the second outlet 700D, and a passage configuration for allowing the low-temperature heat medium to flow out of the third outlet 700E.

In the passage configuration for allowing the low-temperature heat medium flowing in from the first inlet 700A to flow out of the first outlet 700B, the low-temperature heat medium flowing in the first-inlet-side space 711a is allowed to flow from one side to the other side in the axial direction DRa of the body 701. This also applies to the passage configuration for allowing the low-temperature heat medium flowing in from the first inlet 700A to flow out of the second outlet 700D and the passage configuration for allowing the low-temperature heat medium flowing in from the first inlet 700A to flow out of the third outlet 700E.

Figure 28:
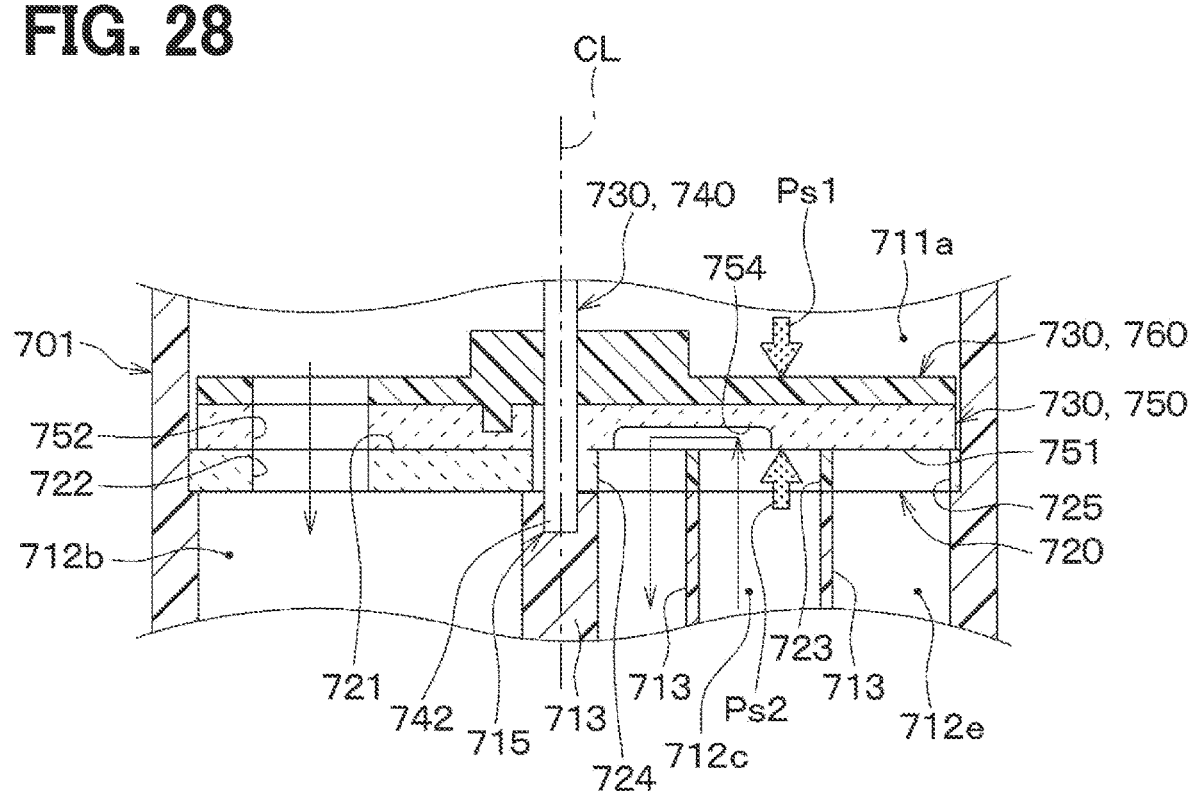
FIG. 28 is an explanatory view for explaining a passage configuration of the flow path switching valve.

Here, as illustrated in FIG. 28, the sliding surface 751 of the rotor 750 is formed with a communication groove 754 that causes adjacent spaces among the second-inlet-side space 712c, the second-outlet-side space 712d, the first-outlet-side space 712b, and the third-outlet-side space 712e to communicate with each other. The rotor hole 752 and the communication groove 754 are disposed substantially symmetrically with respect to the axis CL of the shaft 740. That is, the rotor hole 752 and the communication groove 754 are arranged at an angle of about 180° around the axis CL of the shaft 740.

Thus, the second-inlet-side space 712c can be caused to communicate with any one of the plurality of outlet-side spaces via the communication groove 754 by rotationally shifting the rotor 750. In the present embodiment, an appropriate setting of the positional relationship between the rotor hole 752 and the communication groove 754 has made different the outlet-side space communicating the first-inlet-side space 711a and the outlet-side space communicating the second-inlet-side space 712c.

In other words, by rotationally shifting the rotor 750, it is possible to switch to the passage configuration for allowing the low-temperature heat medium flowing in from the second inlet 700C to flow out of any one of the plurality of outlets. The outlet from which the low-temperature heat medium flowing in from the second inlet 700C is allowed to flow out and the outlet from which the low-temperature heat medium flowing in from the first inlet 700A is allowed to flow out are different outlets.

In the present embodiment, specifically, the second-inlet-side space 712c can be caused to communicate with any one of the second-outlet-side space 712d and the third-outlet-side space 712e by rotationally shifting the rotor 750. Accordingly, the low-temperature heat medium flowing in from the second inlet 700C can be switched to either the passage configuration for allowing the low-temperature heat medium to flow out of the second outlet 700D or the passage configuration for allowing the low-temperature heat medium to flow out of the third outlet 700E.

In the passage configuration for allowing the low-temperature heat medium flowing in from the second inlet 700C to flow out of the second outlet 700D, the flow of the low-temperature heat medium flowing in the second-inlet-side space 712c from the other side to the one side in the axial direction DRa of the shaft 740 is diverted in the opposite direction in the communication groove 754. As a result, in the second-outlet-side space 712d, the low-temperature heat medium flows from one side to the other side in the axial direction DRa of the shaft 740. This also applies to the passage configuration for allowing the low-temperature heat medium flowing in from the second inlet 700C to flow out of the third outlet 700E.

Here, the first-inlet-side space 711a and the second-inlet-side space 712c are formed on opposite sides of the rotor 750. Therefore, the rotor 750 is disposed inside the body 701 as a housing such that the pressure Ps1 of the first-inlet-side space 711a and the pressure Ps2 of the second-inlet-side space 712c act in opposite directions to each other.

Figure 29:
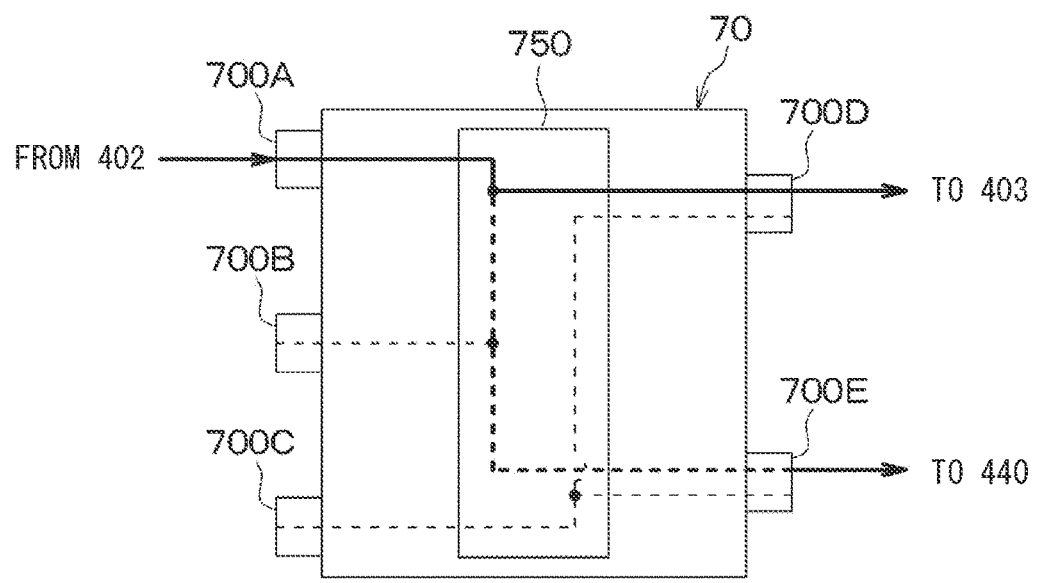
FIG. 29 is an explanatory diagram illustrating an example of a switching mode of a passage configuration of a flow path switching valve.

As indicated by a thick line and a thick broken line in FIG. 29, the flow path switching valve 70 configured as described above can switch between the passage configuration for allowing the low-temperature heat medium flowing into the inside from the first inlet 700A to flow out of the second outlet 700D and the passage configuration for allowing the low-temperature heat medium to flow out of the third outlet 700E.

Figure 30:
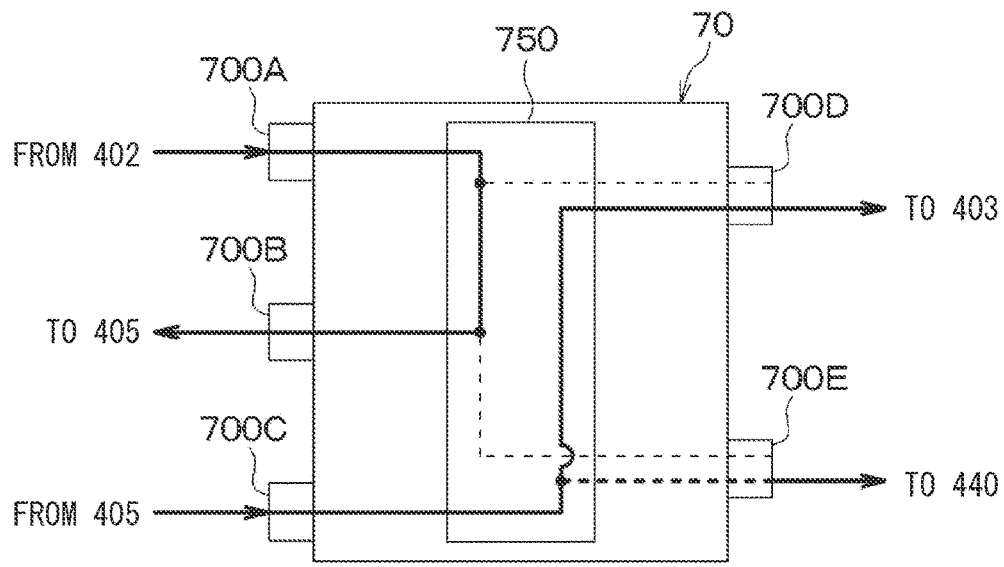
FIG. 30 is an explanatory diagram illustrating another example of the switching mode of the passage configuration of the flow path switching valve.

Further, as indicated by a thick solid line in FIG. 30, the flow path switching valve 70 can allow the low-temperature heat medium flowing into the inside from the first inlet 700A to flow out of the first outlet 700B. In this state, as indicated by a thick line and a thick broken line in FIG. 30, it is possible to switch between the passage configuration for allowing the low-temperature heat medium flowing into the inside from the second inlet 700C to flow out of the second outlet 700D and the passage configuration for allowing the low-temperature heat medium to flow out of the third outlet 700E.

Figure 31:
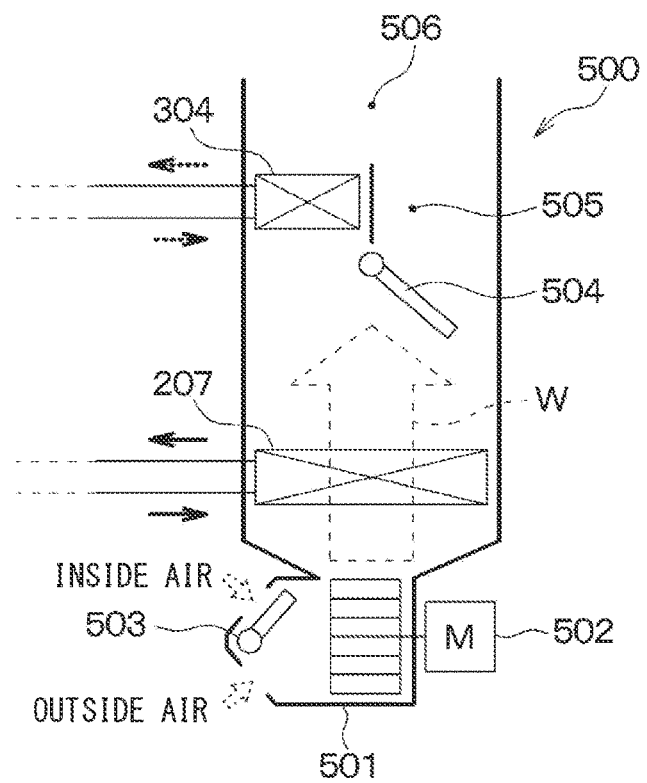
FIG. 31 is a schematic configuration diagram of an air conditioning unit according to the tenth embodiment.

Next, the interior air conditioning unit 500 will be described with reference to FIG. 31. The interior air conditioning unit 500 is a unit for blowing the ventilation air W with its temperature appropriately regulated to an appropriate position in the cabin in the temperature regulating apparatus 1. The interior air conditioning unit 500 is disposed inside an instrument panel at the foremost part in the cabin.

The interior air conditioning unit 500 includes the casing 501 that forms an air passage for the ventilation air W. An interior blower 502, the interior evaporator 207, the heater core 304, and the like are disposed in an air passage formed in the casing 501. The casing 501 is made of resin (e.g., polypropylene) having a certain degree of elasticity and excellent strength.

An inside and outside air switching device 503 is disposed on the most upstream side in the ventilation airflow of the casing 501. The inside and outside air switching device 503 make switching to introduce air inside the cabin (i.e., inside air) and the air outside the cabin (i.e., outside air) into the casing 501. The operation of the electric actuator for driving the inside and outside air switching device 503 is controlled by a control signal output from the control device 600.

The interior blower 502 is disposed on the ventilation airflow downstream side of the inside and outside air switching device 503. The interior blower 502 blows air sucked through the inside and outside air switching device 503 toward the cabin. The interior blower 502 is an electric blower that drives a fan with an electric motor. The rotation speed (i.e., air blowing capacity) of the interior blower 502 is controlled by a control voltage output from the control device 600.

On the ventilation airflow downstream side of the interior blower 502, the interior evaporator 207 and the heater core 304 are disposed in this order with respect to the ventilation airflow. That is, the interior evaporator 207 is disposed on the ventilation airflow upstream side of the heater core 304. A cold air bypass passage 505 is formed in the casing 501 to cause the ventilation air W having passed through the interior evaporator 207 to flow downstream while bypassing the heater core 304.

An air mix door 504 is disposed on the ventilation airflow downstream side of the interior evaporator 207 and on the ventilation airflow upstream side of the heater core 304. The air mix door 504 regulates an air volume ratio between the volume of air caused to pass through the heater core 304 and the volume of air caused to pass through the cold air bypass passage 505 in the ventilation air W after passing through the interior evaporator 207. The operation of the electric actuator for driving the air mix door is controlled by a control signal output from the control device 600.

A mixing space 506 for mixing the ventilation air W heated by the heater core 304 and the ventilation air W passing through the cold air bypass passage 505 and not heated by the heater core 304 is provided on the ventilation airflow downstream side of the heater core 304. Further, an opening hole (not illustrated) through which the conditioned air mixed in the mixing space 506 is blown into the cabin is disposed on the most downstream side in the ventilation airflow of the casing 501.

Therefore, the temperature of the conditioned air mixed in the mixing space 506 is regulated by the air mix door 504 regulating the air volume ratio between the volume of air caused to pass through the heater core 304 and the volume of air caused to pass through the cold air bypass passage 505. Then, the temperature of the ventilation air W blown into the cabin from each opening hole can be regulated.

As the opening hole, a face opening hole, a foot opening hole, and a defroster opening hole (none is illustrated) are provided. The face opening hole is an opening hole for blowing out the conditioned air toward the upper body of an occupant in the cabin. The foot opening hole is an opening hole for blowing the conditioned air toward the feet of the occupant. The defroster opening hole is an opening hole through which the conditioned air is blown toward the inside surface of the front window glass of the vehicle.

A blowing mode switching door (not illustrated) is disposed on the upstream side of these opening holes. The blowing mode switching door opens and closes each opening hole to switch the opening hole through which the conditioned air is blown. The operation of the electric actuator for driving the blowing mode switching door is controlled by a control signal output from the control device 600.

Next, an outline of an electric controller of the temperature regulating apparatus 1 will be described. The control device 600 is made up of a microcomputer including a processor, a memory, and the like, and peripheral circuits thereof. The control device 600 performs various calculations and processing based on an air conditioning control program stored in the memory and controls operations of various devices and the like connected to the output side. The memory is a non-transitory tangible storage medium.

As illustrated in FIG. 23, a control sensor group 610 is connected to the input side of the control device 600. The control sensor group 610 includes an inside air temperature detector that detects a cabin temperature (inside air temperature) Tr, a battery temperature detector that detects a temperature of the battery BT, an in-vehicle device temperature detector that detects a temperature of the in-vehicle device CE, and the like.

An operation panel 620 is connected to the input side of the control device 600. The operation panel 620 is provided with, for example, a temperature setting part that sets the cabin temperature. A detection signal of the sensor group 610 and an operation signal of the operation panel 620 are input to the control device 600.

The control device 600 is integrally formed with a controller that controls various devices connected to the output side of the control device 600. That is, a configuration (i.e., hardware and software) for controlling the operation of each control target device constitutes a controller that controls the operation of each control target device. For example, in the control device 600, a configuration that controls the operations of the high-temperature-side switching valve 320, the low-temperature-side switching valve 430, and the flow path switching valve 70 constitutes a valve controller 600a. In FIG. 23, for clarity, the illustration of signal lines and power lines connecting the control device 600 and various control target devices, signal lines connecting the control device 600 and various sensors, and the like is omitted.

Next, the operation of the temperature regulating apparatus 1 having the above configuration will be described. The temperature regulating apparatus 1 of the present embodiment can switch various operation modes for air conditioning in the cabin and temperature regulation of the battery BT. Specifically, the temperature regulating apparatus 1 can be switched to an equipment cooling mode, an outside-air cooling mode, and an outside-air heat-absorption mode. Hereinafter, each operation mode will be described.

(A) Equipment Cooling Mode

The equipment cooling mode is an operation mode in which the refrigeration cycle device 200 is operated to perform air conditioning in the cabin and the battery BT is cooled by the low-temperature heat medium cooled by the refrigeration cycle device 200.

In the equipment cooling mode, the control device 600 controls the operation of the flow path switching valve 70 so that the low-temperature heat medium flowing in from the first inlet 700A flows out of the first outlet 700B and the low-temperature heat medium flowing in from the second inlet 700C flows out of the third outlet 700E.

Figure 32:
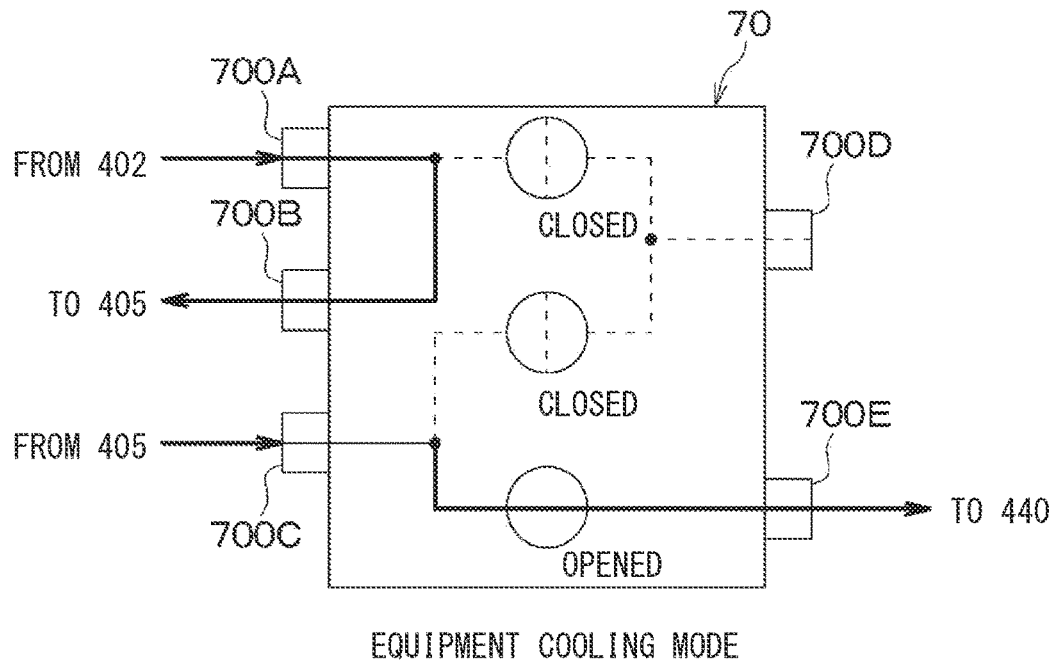
FIG. 32 is an explanatory diagram illustrating a passage configuration of the flow path switching valve in a equipment cooling mode.

Therefore, in the second fluid circulation circuit 400 in the equipment cooling mode, as illustrated in FIG. 32, the low-temperature heat medium discharged from the low-temperature-side pump 401 flows into the first inlet 700A of the flow path switching valve 70 via the heat medium passage of the chiller 206. Then, the low-temperature heat medium flowing into the first inlet 700A flows out of the first outlet 700B of the flow path switching valve 70 and then flows into the second inlet 700C of the flow path switching valve 70 via the cooling water passage 405 of the battery BT. The low-temperature heat medium flowing into the second inlet 700C flows out of the third outlet 700E of the flow path switching valve 70 and is then sucked again into the low-temperature-side pump 401 via the short-circuiting heat medium passage 440.

In the refrigeration cycle device 200 in the equipment cooling mode, when the control device 600 operates the compressor 201, the high-pressure refrigerant discharged from the compressor 201 flows into the heat radiator 202. The control device 600 regulates the refrigerant discharge capacity of the compressor 201 so that the temperature of the ventilation air W cooled by the interior evaporator 207 becomes a target evaporator temperature TEO.

The target evaporator temperature TEO is determined based on a detection signal of the sensor group 610 connected to the control device 600 with reference to a control map stored in advance in the control device 600. The control map is configured such that the target evaporator temperature TEO is equal to or higher than a frosting restriction temperature (e.g., 1° C.) in order to restrict frosting on the interior evaporator 207.

The refrigerant flowing into the heat radiator 202 is pumped from the high-temperature-side pump 301 and dissipates heat to the high-temperature heat medium flowing through the heat medium passage 302 to become a sub-cooled liquid-phase refrigerant. As a result, the high-temperature heat medium flowing through the heat medium passage 302 is heated.

The flow of the refrigerant flowing out of the heat radiator 202 is branched at the refrigerant branch 203. One refrigerant branched at the refrigerant branch 203 is decompressed by the first expansion valve 204 and flows into the chiller 206. The control device 600 regulates the throttle opening of the first expansion valve 204 such that the temperature of the low-temperature heat medium flowing out of the heat medium passage 402 of the chiller 206 approaches the target cooling temperature TBO.

The target cooling temperature TBO is determined based on a detection signal of the sensor group 610 connected to the control device 600 with reference to a control map stored in advance in the control device 600. In this control map, the target cooling temperature TBO is determined such that the temperature of the battery BT is held within an appropriate temperature range.

The refrigerant flowing into the chiller 206 absorbs heat from the low-temperature heat medium flowing through the heat medium passage 402 and evaporates. As a result, the low-temperature heating medium flowing through the heat medium passage 402 is cooled. The refrigerant flowing out of the chiller 206 flows into the refrigerant junction 209.

The other refrigerant branched at the refrigerant branch 203 is decompressed by the second expansion valve 205 and flows into the interior evaporator 207. The control device 600 regulates the throttle opening of the second expansion valve 205 such that the refrigerant sucked into the compressor 201 approaches a predetermined reference superheating degree KSH (e.g., 5° C.). Thus, in the equipment cooling mode, the refrigerant evaporation temperature at the interior evaporator 207 may be equivalent to the refrigerant evaporation temperature in the chiller 206.

The refrigerant flowing into the interior evaporator 207 absorbs heat from the ventilation air W blown from the interior blower 502 and evaporates. Thereby, the ventilation air W is cooled. The refrigerant flowing out of the interior evaporator 207 flows into the refrigerant junction 209 via the evaporating pressure regulating valve 208. The refrigerant junction 209 joins the flow of the refrigerant flowing out of the interior evaporator 207 and the flow of the refrigerant flowing out of the chiller 206 and allows the joined refrigerant to flow out to the suction side of the compressor 201.

In the first fluid circulation circuit 300, when the control device 600 operates the high-temperature-side pump 301, the high-temperature heat medium pumped from the high-temperature-side pump 301 flows into the heat medium passage 302 of the heat radiator 202. The high-temperature heat medium flowing into the heat medium passage 302 exchanges heat with the high-pressure refrigerant to be heated.

The high-temperature heat medium flowing out of the heat radiator 202 flows into the high-temperature-side switching valve 310 and is divided into a flow flowing into the high-temperature-side radiator 303 and a flow flowing into the heater core 304 from the high-temperature-side switching valve 310.

The control device 600 controls the operation of the high-temperature-side switching valve 310 such that an outlet-side heat medium temperature THC, which is the temperature of the high-temperature heat medium flowing out of the heater core 304, approaches a predetermined reference outlet-side heat medium temperature KTHC. That is, the control device 600 regulates the high-temperature-side flow rate ratio such that the outlet-side heat medium temperature THC approaches the reference outlet-side heat medium temperature KTHC.

Further, in a case where the outlet-side heat medium temperature THC does not reach the reference outlet-side heat medium temperature KTHC even when the control device 600 controls the high-temperature-side switching valve 310 such that the entire amount of the high-temperature heat medium from the heat radiator 202 flows to the heater core 304, the high-temperature heat medium is heated by the electric heater 306. The heating capacity of the electric heater 306 is regulated such that the outlet-side heat medium temperature THC approaches the reference outlet-side heat medium temperature KTHC.

The high-temperature heat medium flowing into the high-temperature-side radiator 303 exchanges heat with the outside air OA blown from the outside air fan to dissipate heat. Thereby, the high-temperature heat medium flowing through the high-temperature-side radiator 303 is cooled. The high-temperature heat medium flowing out of the high-temperature-side radiator 303 flows into the high-temperature-side junction 307.

On the other hand, the high-temperature heat medium flowing into the heater core 304 exchanges heat with the ventilation air W passing through the interior evaporator 207 to dissipate heat. Accordingly, the ventilation air W cooled by the interior evaporator 207 is reheated. Further, the control device 600 regulates the opening degree of the air mix door 504 so that the ventilation air temperature of the ventilation air W blown into the cabin approaches a target ventilation air temperature TAO.

The high-temperature heat medium flowing out of the heater core 304 flows into the high-temperature-side junction 307. The high-temperature-side junction 307 joins the high-temperature heat medium flowing out of the heater core 304 and the high-temperature heat medium flowing out of the high-temperature-side radiator 303 and allows the joined medium to flow out to the fluid suction side of the high-temperature-side pump 301.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled.

The low-temperature heat medium flowing out of the chiller 206 flows into the inside from the first inlet 700A of the flow path switching valve 70 and flows out of the first outlet 700B. The low-temperature heat medium flowing out of the first outlet 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the inside from the second inlet 700C of the flow path switching valve 70 and flows out of the third outlet 700E. The low-temperature heat medium flowing out of the third outlet 700E is guided to the suction side of the low-temperature-side pump 401 via the short-circuiting heat medium passage 440 and the low-temperature-side junction 407.

In the equipment cooling mode, the operation as described above enables the ventilation air W cooled by the interior evaporator 207 to be reheated by the heater core 304 and blown into the cabin. At this time, excessive heat for reheating the ventilation air W can be dissipated to the outside air by the high-temperature-side radiator 303. Therefore, the ventilation air W regulated to an appropriate temperature can be blown into the cabin to achieve comfortable air conditioning. Further, in the equipment cooling mode, the low-temperature heat medium cooled by the chiller 206 is allowed to flow into the cooling water passage 405 of the battery BT, whereby the battery BT can be cooled.

(B) Outside-Air Cooling Mode

The outside-air cooling mode is an operation mode in which the refrigeration cycle device 200 is operated to perform air conditioning in the cabin and the battery BT is cooled by the low-temperature heating medium cooled by the outside air.

In the outside-air cooling mode, the control device 600 controls the operation of the flow path switching valve 70 so that the low-temperature heat medium flowing in from the first inlet 700A flows out of the first outlet 700B and the low-temperature heat medium flowing in from the second inlet 700C flows out of the second outlet 700D. The control device 600 brings the first expansion valve 204 into a fully closed state.

Figure 33:
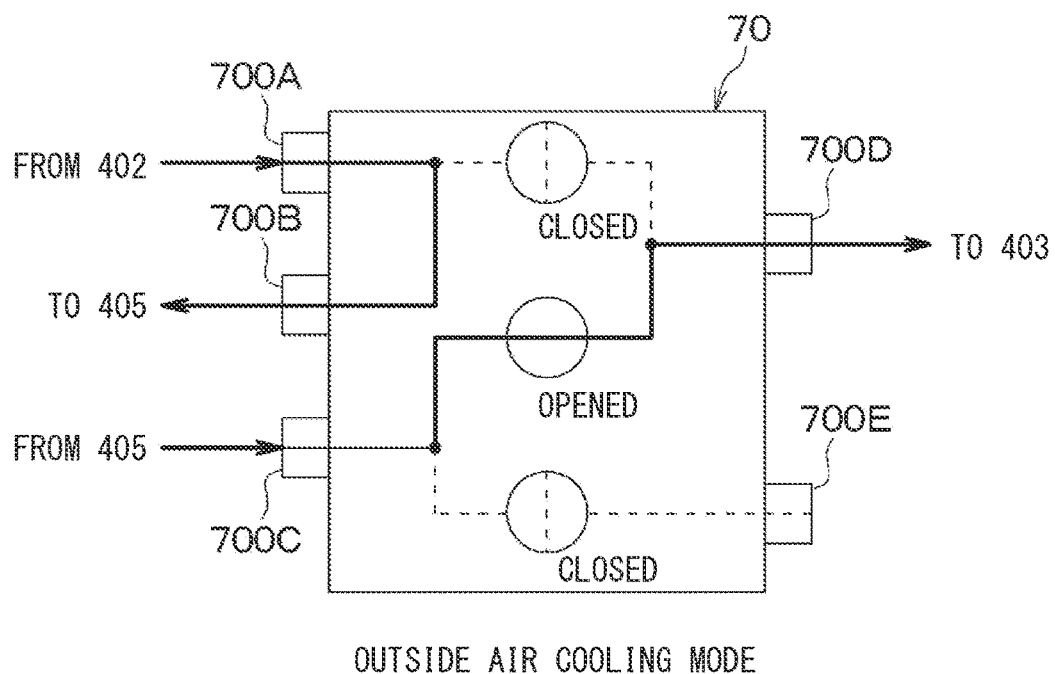
FIG. 33 is an explanatory diagram illustrating a passage configuration in an outside air cooling mode of the flow path switching valve.

Therefore, in the second fluid circulation circuit 400 in the outside-air cooling mode, as illustrated in FIG. 33, the low-temperature heat medium discharged from the low-temperature-side pump 401 flows into the first inlet 700A of the flow path switching valve 70 via the heat medium passage 402 of the chiller 206. The low-temperature heat medium flowing into the first inlet 700A of the flow path switching valve 70 flows out of the first outlet 700B of the flow path switching valve 70 and then flows into the second inlet 700C of the flow path switching valve 70 via the cooling water passage 405 of the battery BT. The low-temperature heat medium flowing into the second inlet 700C flows out of the second outlet 700D of the flow path switching valve 70 and is then sucked again into the low-temperature-side pump 401 via the low-temperature-side radiator 403.

In the refrigeration cycle device 200 in the outside-air cooling mode, as in the equipment cooling mode, the high-pressure refrigerant discharged from the compressor 201 is cooled until the high-pressure refrigerant becomes the subcooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the first expansion valve 204 in the fully closed state, the refrigerant flowing into the refrigerant branch 203 is decompressed by the second expansion valve 205 and flows into the interior evaporator 207. As in the equipment cooling mode, the control device 600 regulates the throttle opening of the second expansion valve 205.

The low-pressure refrigerant having flowed into the interior evaporator 207 absorbs heat from the ventilation air W and evaporates as in the equipment cooling mode. Thereby, the ventilation air W is cooled. The refrigerant flowing out of the interior evaporator 207 is sucked into the compressor 201 via the evaporating pressure regulating valve 208 and the refrigerant junction 209.

In the first fluid circulation circuit 300, the control device 600 controls the operation of the components as in the equipment cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. In the outside-air cooling mode, with the first expansion valve 204 in the fully closed state, the low-temperature heat medium flowing into the heat medium passage 402 of the chiller 206 flows out without exchanging heat with the low-pressure refrigerant.

The low-temperature heat medium flowing out of the chiller 206 flows into the inside from the first inlet 700A of the flow path switching valve 70 and flows out of the first outlet 700B. The low-temperature heat medium flowing out of the first outlet 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the inside from the second inlet 700C of the flow path switching valve 70 and flows out of the second outlet 700D. The low-temperature heat medium flowing out of the second outlet 700D flows into the low-temperature-side radiator 403.

The low-temperature heat medium flowing into the low-temperature-side radiator 403 is blown from the outside air fan, exchanges heat with the outside air OA after passing through the high-temperature-side radiator 303, and dissipates heat. As a result, the low-temperature heat medium flowing through the low-temperature-side radiator 403 is cooled. The low-temperature heat medium flowing out of the low-temperature-side radiator 403 is guided to the suction side of the low-temperature-side pump 401 via the low-temperature-side junction 407.

In the outside-air cooling mode, the operation as described above enables the ventilation air W cooled by the interior evaporator 207 to be reheated by the heater core 304 and blown into the cabin. Therefore, as in the equipment cooling mode, the ventilation air W regulated to an appropriate temperature can be blown into the cabin to achieve comfortable air conditioning. Further, in the outside-air cooling mode, the low-temperature heat medium cooled by heat exchange with the outside air in the low-temperature-side radiator 403 is allowed to flow into the cooling water passage 405 of the battery BT, whereby the battery BT can be cooled.

Here, when the cooling of the battery BT is no longer required in the outside-air cooling mode, the control device 600 may allow the low-temperature heat medium flowing in from the first inlet 700A to flow out of the third outlet 700E. Accordingly, the low-temperature heat medium flowing out of the heat medium passage 402 of the chiller 206 can be returned to the suction side of the low-temperature-side pump 401 via the short-circuiting heat medium passage 440 and the low-temperature-side junction 407.

(C) Outside-Air Heat-Absorption Mode

The outside-air heat-absorption mode is an operation mode for heating the inside of the cabin by operating the refrigeration cycle device 200 without cooling the battery BT. The outside-air heat-absorption mode is an operation mode executed at a low outside air temperature (e.g., when the temperature is 10° C. or lower).

In the outside-air heat-absorption mode, the control device 600 controls the operation of the flow path switching valve 70 so that the low-temperature heat medium flowing in from the first inlet 700A flows out of the second outlet 700D. The control device 600 brings the second expansion valve 205 into the fully closed state. Further, the control device 600 regulates the opening degree of the air mix door 504 so as to fully close the cold air bypass passage 505.

Figure 34:
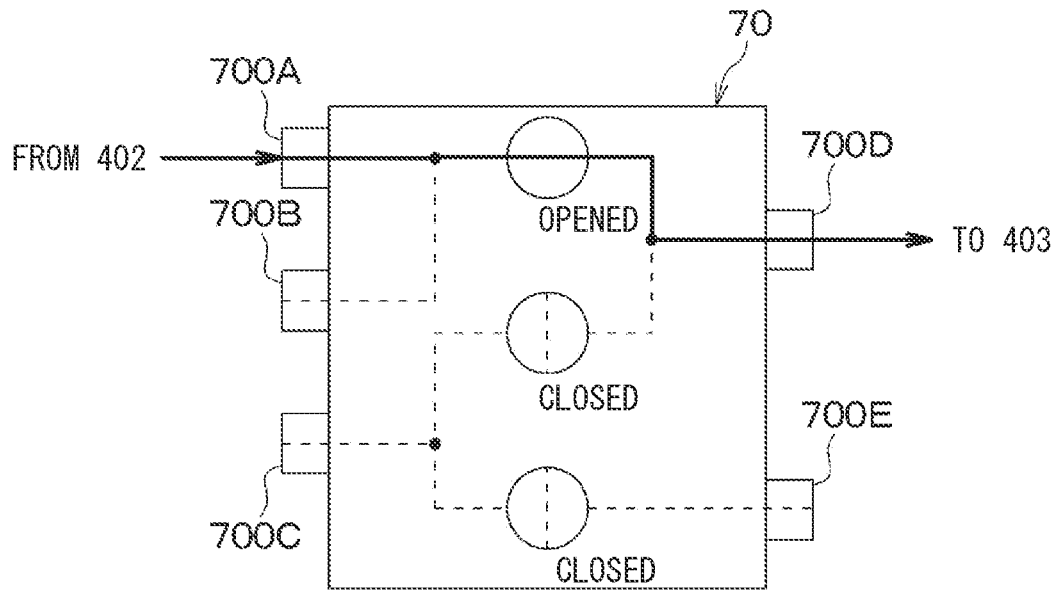
FIG. 34 is an explanatory diagram illustrating a passage configuration in an outside air heat-absorption mode of the flow path switching valve.
Figure 35:
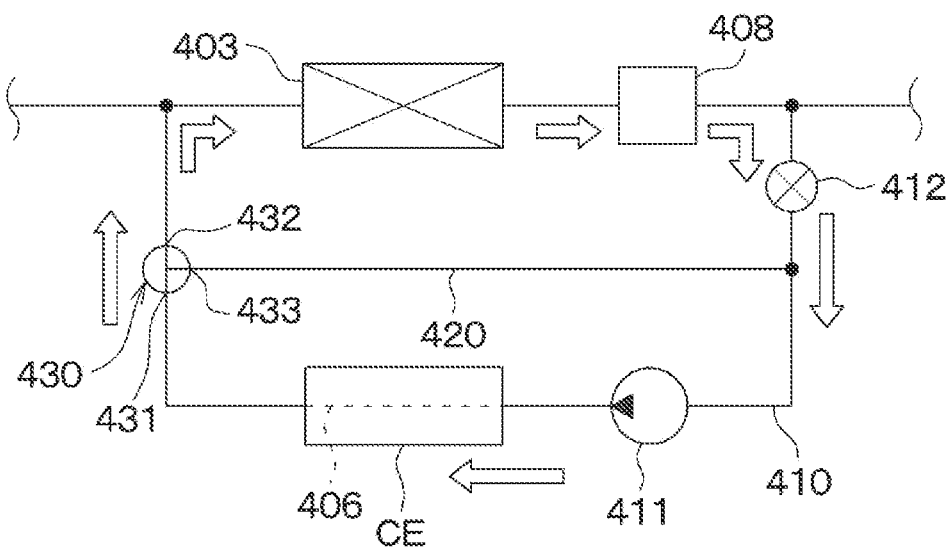
FIG. 35 is an explanatory diagram illustrating an example of a circuit configuration in a defrosting mode.

Therefore, in the second fluid circulation circuit 400 in the outside-air cooling mode, as illustrated in FIG. 34, the low-temperature heat medium discharged from the low-temperature-side pump 401 flows into the first inlet 700A of the flow path switching valve 70 via the heat medium passage 402 of the chiller 206. The low-temperature heat medium flowing into the first inlet 700A of the flow path switching valve 70 flows out of the second outlet 700D of the flow path switching valve 70 and is then sucked again into the low-temperature-side pump 401 via the low-temperature-side radiator 403.

In the refrigeration cycle device 200 in the outside-air cooling mode, as in the equipment cooling mode, the high-pressure refrigerant discharged from the compressor 201 is cooled until the high-pressure refrigerant becomes the subcooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the second expansion valve 205 in the fully closed state, the refrigerant flowing into the refrigerant branch 203 is decompressed by the first expansion valve 204 and flows into the chiller 206. The control device 600 regulates the throttle opening of the first expansion valve 204 so that the refrigerant evaporation temperature in the chiller 206 becomes lower than the outside air temperature.

As in the equipment cooling mode, the low-pressure refrigerant flowing into the chiller 206 absorbs heat from the low-temperature heat medium flowing through the heat medium passage 402 and evaporates. Accordingly, the low-temperature heating medium is cooled. The refrigerant flowing out of the chiller 206 is sucked into the compressor 201 via the refrigerant junction 209.

In the first fluid circulation circuit 300, the control device 600 controls the operation of the components as in the equipment cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled to a temperature lower than the outside air temperature.

The low-temperature heat medium flowing out of the chiller 206 flows into the inside from the first inlet 700A of the flow path switching valve 70 and flows out of the second outlet 700D. The low-temperature heat medium flowing out of the second outlet 700D flows into the low-temperature-side radiator 403.

The low-temperature heat medium flowing into the low-temperature-side radiator 403 is blown from the outside air fan, exchanges heat with the outside air OA after passing through the high-temperature-side radiator 303, and absorbs heat. As a result, the temperature of the low-temperature heat medium flowing through the low-temperature-side radiator 403 rises so as to approach the outside air temperature. The low-temperature heat medium flowing out of the low-temperature-side radiator 403 is guided to the suction side of the low-temperature-side pump 401 via the low-temperature-side junction 407.

In the outside-air heat-absorption mode, the operation as described above enables the ventilation air W heated by the heater core 304 to be blown into the cabin. Therefore, in the outside-air heat-absorption mode, it is possible to achieve the heating of the inside of the cabin without cooling the battery BT.

(D) Temperature Control, Etc., of In-Vehicle Device CE

Here, in the temperature regulating apparatus 1, the control device 600 controls the operations of the various control target devices so that the temperature of the in-vehicle device CE is held within an appropriate temperature range regardless of the various operation modes described above. Specifically, the control device 600 operates the device pump 411 so as to exhibit a predetermined pumping capacity regardless of the various operation modes described above.

When the temperature of the in-vehicle device CE becomes equal to or higher than a reference upper limit value, the device flow rate regulating valve 412 is set to an appropriate opening degree, and the low-temperature-side switching valve 430 is switched to a setting in which the low-temperature heat medium of the device cooling passage 410 flows to the low-temperature-side radiator 403. For example, the low-temperature-side switching valve 430 shifts the rotor 22 to a position that opens the first flow path hole 141 and closes the second flow path hole 142. Hence, the low-temperature heat medium cooled by the low-temperature-side radiator 403 can flow into the cooling water passage 406 of the in-vehicle device CE. As a result, the in-vehicle device CE can be cooled by the low-temperature heating medium cooled by the outside air.

On the other hand, when the temperature of the in-vehicle device CE becomes equal to or lower than the reference lower limit value, the device flow rate regulating valve 412 is brought into the fully closed state, and the low-temperature-side switching valve 430 is switched to a setting in which the low-temperature heat medium of the device cooling passage 410 flows to the device bypass passage 420. For example, the low-temperature-side switching valve 430 shifts the rotor 22 to a position for closing the first flow path hole 141 and opens the second flow path hole 142. Thereby, the low-temperature heat medium flowing out of the cooling water passage 406 of the in-vehicle device CE can be returned to the inlet side of the cooling water passage 406 again via the device bypass passage 420. As a result, the in-vehicle device CE can be warmed up by self-heating of the in-vehicle device CE.

When the outside air temperature is extremely low (e.g., 0° C. or lower), frost may be formed on the outer surface of the low-temperature-side radiator 403. When the frost is formed on the low-temperature-side radiator 403, the amount of heat absorbed from the outside air decreases, and hence the temperature regulating apparatus 1 cannot be appropriately operated.

Therefore, when a frosting condition for frost formation on the low-temperature-side radiator 403 is satisfied, the temperature regulating apparatus 1 switches the operation mode to the defrosting mode. The defrosting mode is a mode for removing frost formed on the low-temperature-side radiator 403. The frosting condition is, for example, a condition that is satisfied when a difference in the temperature of the low-temperature heat medium between the front and rear of the low-temperature-side radiator 403 becomes equal to or lower than a predetermined temperature. The condition is an example, and the frosting condition may be another condition.

In the defrosting mode, the temperature regulating apparatus 1 operates the device pump 411 so as to exhibit a predetermined pumping capacity. Then, the temperature regulating apparatus 1 sets the device flow rate regulating valve 412 to an appropriate opening degree and switches the low-temperature-side switching valve 430 to a setting in which the low-temperature heat medium of the device cooling passage 410 flows to the low-temperature-side radiator 403. For example, the low-temperature-side switching valve 430 shifts the rotor 22 to a position that opens the first flow path hole 141 and closes the second flow path hole 142. Accordingly, by allowing the low-temperature heat medium, the temperature of which has risen during the passage through the cooling water passage 406 of the in-vehicle device CE, to flow into the low-temperature-side radiator 403, it is possible to remove frost formed on the low-temperature-side radiator 403.

The temperature regulating apparatus 1 described above can achieve comfortable air conditioning in the cabin and regulate the battery BT and the in-vehicle device CE to appropriate temperatures by switching various operation modes.

The high-temperature-side switching valve 310 and the low-temperature-side switching valve 430 of the present embodiment are configured as in the valve device 10 described in the first embodiment. Therefore, the high-temperature-side switching valve 310 and the low-temperature-side switching valve 430 can obtain the effects exhibited by the valve device 10 described in the first embodiment as in the valve device 10.

Specifically, the high-temperature-side switching valve 310 can appropriately regulate the flow rate ratio of the high-temperature heat medium passing through the high-temperature-side radiator 303 and the high-temperature heat medium passing through the heater core 304 by increasing or decreasing the opening degree of the first flow path hole 141 and the opening degree of the second flow path hole 142 by the rotor 22.

Here, when the resolution of the opening-degree control of the high-temperature-side switching valve 310 is large, the flow rate ratio of the high-temperature heat medium passing through the high-temperature-side radiator 303 and the high-temperature heat medium passing through the heater core 304 cannot be appropriately regulated, and the temperature variation of the ventilation air blown into the cabin increases. In this case, an increase in the operation of the air mix door 504 or the like increases power consumption and deteriorates a power consumption rate in the vehicle.

In contrast, the high-temperature-side switching valve 310 of the present embodiment can restrict fluid leakage due to changes in the postures of the shaft 20 and the rotor 22, thus enabling fine regulation of the flow rate of the high-temperature heat medium passing through the heater core 304. That is, according to the high-temperature-side switching valve 310 of the present embodiment described above, the problem can be solved.

The low-temperature-side switching valve 430 can appropriately regulate the flow rate ratio between the low-temperature heat medium passing through the low-temperature-side radiator 403 and the low-temperature heat medium passing through the device bypass passage 420 by increasing or decreasing the opening degree of the first flow path hole 141 and the opening degree of the second flow path hole 142 by the rotor 22.

For example, during the defrosting operation, the entire amount of the fluid heated by the in-vehicle device CE can be appropriately guided to the low-temperature-side radiator 403. Thereby, the defrosting of the low-temperature-side radiator 403 can be performed in a short time, so that the influence of the defrosting operation on the air conditioning in the cabin and the device temperature control can be restricted sufficiently.

In addition, since the flow path switching valve 70 is not formed by combining a plurality of on-off valves, three-way valves, or the like, it is difficult to cause an increase in size. It is thus possible to restrict an increase in the size of the second fluid circulation circuit 400 to which the flow path switching valve 70 is applied.

In particular, the flow path switching valve 70 has a configuration equivalent to that of the valve device 10 of the first embodiment, and the holding structure of the other-end-side portion 742 of the shaft 740 is configured in the same manner as the holding structure of the shaft 20 of the valve device 10. Therefore, the flow path switching valve 70 can obtain the effects exhibited by the valve device 10 described in the first embodiment as in the valve device 10. That is, the flow path switching valve 70 can achieve the optimum distribution of the low-temperature heat medium by increasing or decreasing the opening degree of each flow path hole 722 to 725 by the rotor 22.

Here, in the second fluid circulation circuit 400, when the distribution of the low-temperature heating medium by the flow path switching valve 70 cannot be appropriately performed, the temperature variation of each battery constituting the battery BT increases. In this case, the degradation in the battery BT is promoted to cause a decrease in the cruising distance of the vehicle. It is conceivable that the battery is excessively mounted in consideration of the deterioration in the battery BT, but in this case, the initial cost increases greatly.

In contrast, the flow path switching valve 70 of the present embodiment can restrict fluid leakage due to changes in the postures of the shaft 20 and the rotor 22 and can achieve optimum distribution of the low-temperature heating medium, so that the problem can be solved.

In the flow path switching valve 70, the pressure in the first-inlet-side space 711a and the pressure in the second-inlet-side space 712c of the rotor 750 act in opposite directions to each other. Thus, in the flow path switching valve 70, when the pressure of one of the low-temperature heat medium flowing in from the first inlet 700A and the low-temperature heat medium flowing in from the second inlet 700C changes, the pressure balance acting on the front and rear of the rotor 750 changes. Such a change in the pressure balance may be a factor that hinders the close contact between the rotor 750 and the stator 720.

In contrast, the flow path switching valve 70 of the present embodiment is configured such that the rotor 750 is pressed against the stator 720 by the energization member 770. Therefore, even when the pressure of the fluid flowing in from each of the inlets 700A, 700C changes, the posture of the rotor 750 can be held in a posture in contact with the stator 720.

Modification of Tenth Embodiment

In the tenth embodiment, the high-temperature-side switching valve 310, the low-temperature-side switching valve 430, and the flow path switching valve 70 have configurations similar to those of the valve device 10 of the present disclosure, but the temperature regulating apparatus 1 is not limited thereto. In the temperature regulating apparatus 1, at least one of the high-temperature-side switching valve 310, the low-temperature-side switching valve 430, and the flow path switching valve 70 may have a configuration similar to that of the valve device 10 of the present disclosure. The valve device 10 of the present disclosure is also applicable to a fluid circulation circuit (e.g., the refrigeration cycle device 200) different from the first fluid circulation circuit 300 and the second fluid circulation circuit 400.

For example, the first fluid circulation circuit 300 may have a circuit configuration in which the high-temperature-side radiator 303, the heater core 304, and the cooling water passage 405 of the battery BT are connected in parallel on the downstream side of the high-temperature-side pump 301 so that the battery BT can be warmed up. In this case, the valve device 10 of the present disclosure can be applied as a flow path switching valve that switches the circuit configuration of the first fluid circulation circuit 300.

Such a flow path switching valve can be achieved by a four-way valve having one inlet and three outlets. That is, the flow path switching valve includes an inlet into which the high-temperature heat medium flows, a first outlet from which the high-temperature heat medium is allowed to flow out to the high-temperature-side radiator 303, a second outlet from which the high-temperature heat medium is allowed to flow out to the heater core 304, and a third outlet from which the high-temperature heat medium is allowed to flow out to the cooling water passage 405 of the battery BT. The flow path switching valve is configured such that a flow rate ratio of the high-temperature heat medium passing through the high-temperature-side radiator 303, the high-temperature heat medium passing through the heater core 304, and the high-temperature heat medium passing through the cooling water passage 405 of the battery BT is regulated by rotationally shifting the rotor 22.

Specifically, in the flow path switching valve, the flow rate ratio of the high-temperature heat medium passing through each of the high-temperature-side radiator 303, the heater core 304, and the cooling water passage 405 of the battery BT is regulated by increasing or decreasing the opening degree of the first flow path hole, the opening degree of the second flow path hole, and the opening degree of the third flow path hole by the rotor 22. The first flow path hole, the second flow path hole, and the third flow path hole are flow path holes formed in the stator 14. Specifically, the first flow path hole is a flow path hole through which the high-temperature heat medium flowing into the high-temperature-side radiator 303 passes. The second flow path hole is a flow path hole through which the high-temperature heat medium flowing into the heater core 304 passes. The third flow path hole is a flow path hole through which the high-temperature heat medium flowing into the cooling water passage 405 of the battery BT passes.

In the tenth embodiment, the temperature regulating apparatus 1 is applied to an electric vehicle, but an application target of the temperature regulating apparatus 1 is not limited to the electric vehicle. The temperature regulating apparatus 1 can be widely applied to, for example, a moving body in addition to an electric vehicle, a stationary device, and the like. These also apply to the valve devices 10 of the first to ninth embodiments.

Other Embodiments

Although the representative embodiments of the present disclosure have been described above, the present disclosure is not limited to the embodiments but can be variously modified as follows, for example.

As in the embodiments described above, in the valve device 10, it is desirable that the one-end-side portion 20*a* of the shaft 20 be supported by the one-end-side bearing part 126 and the other-end-side portion 20*b* of the shaft 20 be supported by the other-end-side bearing part 129, but it is not limited thereto. For example, the valve device 10 may have a structure in which at least one of the one-end-side portion 20*a* and the other-end-side bearing part 144 of the shaft 20 is not supported by the bearing.

In the embodiments described above, the device in which the rotor 22 is coupled to the shaft 20 via the intermediate element 24 has been illustrated, but the valve device 10 is not limited thereto. In the valve device 10, for example, the rotor 22 may be directly coupled to the shaft 20.

As in the embodiments described above, the rotor 22 and the stator 14 are desirably made of ceramic, but are not limited thereto, and may be made of a material except for ceramic. The rotor 22 and the stator 14 are desirably made of a material having a small linear expansion coefficient and excellent wear resistance as compared to the constituent material of the housing 12.

In the embodiments described above, the device formed of a three-way valve having one fluid inlet and two fluid outlets has been illustrated as the valve device 10, but the valve device 10 is not limited thereto. The valve device 10 of the present disclosure may be formed of a three-way valve having two fluid inlets and one fluid outlet.

In the embodiments described above, the device formed of a three-way valve has been illustrated as the valve device 10, but the valve device 10 is not limited to the three-way valve. The valve device 10 of the present disclosure may be configured as a five-way valve like the flow path switching valve 70. The valve device 10 of the present disclosure may be configured as, for example, a flow rate regulating valve or an on-off valve having one fluid inlet and one fluid outlet. In this case, one flow path hole is formed in the stator 14. The valve device 10 of the present disclosure may be formed of, for example, a multi-way valve having one fluid inlet and three or more fluid outlets, a multi-way valve having three or more fluid inlets and one fluid outlet, a multi-way valve having a plurality of fluid inlets and a plurality of fluid outlets, or the like.

In the valve device 10 described in the embodiments described above, the housing 12 and the stator 14 are configured separately, but it is not limited thereto. In the valve device 10, for example, a portion corresponding to the stator 14 may be integrally formed with the housing 12.

As in the embodiments described above, the valve device 10 desirably includes the energization member 26, but it is not limited thereto, and the energization member 26 may be omitted. In the embodiments described above, the elastic member is illustrated as the energization member 26, but the energization member 26 is not limited thereto. The energization member 26 may be formed of a member except for the elastic member so long as the member can press the rotor 22 against the stator 14. The compression spring 261 is desirably disposed so as to surround the outer side of the shaft 20, but is not limited thereto. The compression spring 261 may be disposed around the shaft 20, for example.

In the embodiments described above, the valve device 10 in which the flow path hole is formed in the stator 14 configured separately from the housing 12 has been illustrated, but the valve device 10 is not limited thereto. In the valve device 10, for example, a flow path hole may be formed directly in the housing 12. In this case, the sliding portion of the housing 12 where the rotor 22 slides is desirably formed of a material, such as ceramic, having a small linear expansion coefficient and excellent wear resistance as compared to the constituent material of the portion except for the sliding part.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

In a case where a reference is made to the components of the respective embodiments above as to shapes and positional relations, the components are not limited to the shapes and the positional relations unless explicitly specified or limited to particular shapes and positional relations in principle.

(Overview)

According to a first aspect illustrated in some or all of the embodiments, a valve device includes a housing, a drive part, and a rotation part. The rotation part includes a shaft, and a rotor having a sliding surface and increases or decreases an opening degree of the flow path hole with rotation of the shaft, and at least a part of the rotation part is rotatably held by the housing.

According to a second aspect, the shaft has a one-end-side portion to which a rotational force is transmitted from the drive part and an other-end-side portion opposite to the one-end-side portion in the axial direction of the shaft, and at least a part of the other-end-side portion is rotatably held by the housing. Thus, by holding the other-end-side portion of the shaft by the housing, it is possible to restrict the positional deviation of the end of the shaft inside the housing.

According to a third aspect, the rotation part includes an intermediate element that couples the rotor to the shaft such that a gap is formed between the other-end-side portion and the rotor. The housing has an end reception part that receives at least a part of the other-end-side portion.

Thus, by holding the other-end-side portion separated from the rotor by the end reception part of the housing, it is possible to restrict the positional deviation of the end of the shaft inside the housing. The end reception part is provided so as to be interposed between the other-end-side portion of the shaft and the rotor, and hence there is no need for separate provision of a space where the end reception part is disposed. That is, it is possible to restrict an increase in the size of the valve device due to the addition of the end reception part.

According to a fourth aspect, in the valve device, an other-end-side bearing part that rotatably supports the other-end-side portion is provided inside the end reception part. Thereby, the position of the other-end-side portion of the shaft can be restricted with high accuracy.

According to a fifth aspect, the end reception part is disposed at a position where the end reception part overlaps at least a part of the rotation part in a radial direction of the shaft so as to function as a rotation guide that guides the rotation of the rotation part.

Thus, when the end reception part of the housing is caused to function as a rotation guide of the rotation part, the position of the rotation center of the rotation part is restricted with high accuracy, so that it is possible to ensure the accuracy of the flow rate control of the fluid and restrict unintended fluid leakage.

According to a sixth aspect, the end reception part is formed in a bottomed cylindrical shape extending along the axial direction of the shaft and having a bottom wall that faces an end face of the other-end-side portion and a side wall that surrounds an outer periphery of the other-end-side portion. The end reception part is disposed inside the rotation part so as to overlap at least one of the rotor and the intermediate element in the radial direction of the shaft.

As described above, when the end reception part is positioned inside the rotor or the intermediate element, it is possible to cause the end reception part to function as a holding part of the shaft and to function as a rotation guide of the rotation part.

According to a seventh aspect, the intermediate element is provided at a position closer to the one-end-side portion in the axial direction of the shaft than the rotor. The shaft is configured such that an end face of the other-end-side portion is located to overlap the inner side of the intermediate element in the radial direction of the shaft.

It is thereby possible to reduce the length of the shaft in the axial direction as compared to a case where the end face of the other-end-side portion is located to overlap the inner side of the rotor in the radial direction of the shaft. In this case, at the time of holding a part of the shaft inside the end reception part, the shaft is less likely to come into contact with the inside of the end reception part, so that galling of the shaft due to contact with the inside of the end reception part can be restricted.

According to an eighth aspect, in the valve device, a one-end-side bearing part that rotatably supports the one-end-side portion is provided inside the housing. As described above, when the portions on both end sides of the shaft are held, it is possible to sufficiently restrict the positional deviation of the end of the shaft and restrict a change in the posture of the shaft due to the positional deviation of the end of the shaft.

According to a ninth aspect, the rotor is made of ceramic. Ceramic is a material having a small linear expansion coefficient and a small dimensional change due to water absorption and is also excellent in wear resistance. Therefore, when the rotor is made of ceramic, the relative positional relationship between the rotor and the shaft and the relative positional relationship between the rotor and the housing are stabilized, so that the accuracy of the flow rate control of the fluid can be ensured, and unintended fluid leakage can be restricted.

According to a tenth aspect, the valve device is applied to a fluid circulation circuit including an exterior heat exchanger that exchanges heat between a fluid and air outside a cabin and an interior heat exchanger that exchanges heat between air flowing into the cabin and the fluid. The housing includes a first outlet that is connected to a fluid inlet side of the exterior heat exchanger and from which the fluid is allowed to flow out to the exterior heat exchanger, and a second outlet that is connected to a fluid inlet side of the interior heat exchanger and from which the fluid is allowed to flow out to the interior heat exchanger. Further, the housing includes an inlet that is connected to the fluid outlet side of the exterior heat exchanger and the fluid outlet side of the interior heat exchanger and into which the fluid flows from the exterior heat exchanger and the interior heat exchanger. In the valve device, a flow rate ratio between the fluid passing in the exterior heat exchanger and the fluid passing in the interior heat exchanger is regulated by rotationally shifting the rotor.

Thereby, the valve device can regulate the flow rate ratio between the fluid passing through the exterior heat exchanger and the fluid passing through the interior heat exchanger. In particular, since the valve device of the present disclosure can restrict fluid leakage due to a change in the posture of the shaft, it is possible to accurately regulate the flow rate ratio in each heat exchanger.

For example, in a case where the temperature of the air flowing into the cabin is regulated by the interior heat exchanger, the temperature of the air flowing into the cabin can be finely regulated by regulating the flow rate ratios in the interior heat exchanger and the exterior heat exchanger.

According to an eleventh aspect, the valve device is applied to a fluid circulation circuit including an exterior heat exchanger that exchanges heat between the fluid and air outside a cabin, a temperature regulating part that regulates a temperature of a heat generator by the fluid, and a bypass part that bypasses the exterior heat exchanger and allows the fluid to flow, The housing includes a first outlet that is connected to a fluid inlet side of the exterior heat exchanger and from which the fluid is allowed to flow out to the exterior heat exchanger, and a second outlet that is connected to a fluid inlet side of the bypass part and from which the fluid is allowed to flow out to the bypass part. Also, the housing includes an inlet that is connected to the fluid outlet side of the temperature regulating part and into which the fluid flows from the temperature regulating part. In the valve device, a flow rate ratio between the fluid passing in the bypass part and the fluid passing in the exterior heat exchanger is regulated by rotationally shifting the rotor.

Thereby, the valve device can regulate the flow rate ratio between the fluid passing through the exterior heat exchanger and the fluid passing through the bypass part. In particular, since the valve device of the present disclosure can restrict fluid leakage due to a change in the posture of the shaft, it is possible to accurately regulate the flow rate ratios in the exterior heat exchanger and the bypass part.

For example, during the defrosting operation, the entire amount of the fluid heated by the temperature regulating part can be appropriately guided to the exterior heat exchanger. Thereby, the defrosting of the exterior heat exchanger can be performed in a short time, so that the influence of the defrosting operation on the air conditioning in the cabin and the device temperature control can be restricted sufficiently.

According to a twelfth aspect, the housing includes a first inlet into which the fluid flows, a second inlet into which the fluid flows, and at least one outlet from which the fluid is allowed to flow out to the outside. A first-inlet-side space communicating with the first inlet and a second-inlet-side space communicating with the second inlet are formed inside the housing. The rotor is disposed inside the housing such that the pressure in the first-inlet-side space and the pressure in the second-inlet-side space act in opposite directions to each other.

In the valve device configured as described above, when the pressure of one of the fluid flowing in from the first inlet and the fluid flowing in from the second inlet changes, the pressure balance acting on the front and rear of the rotor changes.

In the valve device of the present disclosure, with the rotation part being held by the housing, the rotor can be held in a posture in contact with the flow path formation part even when the pressure of the fluid flowing in from each inlet changes.

According to a thirteenth aspect, a valve device includes a housing, a drive part, and a rotation part. The rotation part includes a shaft and a rotor that increases or decreases an opening degree of the flow path hole with rotation of the shaft, and at least a part of the rotation part is rotatably held by the housing.

According to a fourteenth aspect, a fluid circulation circuit includes a plurality of devices in which a fluid passes, and a valve device that regulates a flow rate of the fluid passing in the plurality of devices. The valve device includes a housing, a drive part, and a rotation part. The rotation part includes a shaft and a rotor, and at least a part of the rotation part is rotatably held by the housing.

What is claimed is:

1. A valve device comprising:
    a housing integrally or separately having a flow path formation part where at least one flow path hole through which a fluid passes is formed;
    a drive part that outputs a rotational force; and
    a rotation part that rotates about a predetermined axis by the rotational force output from the drive part, wherein
    the rotation part includes
    a shaft, and
    a rotor having a sliding surface that slides while facing an opening surface of the flow path formation part where the flow path hole is opened, the rotor increasing or decreasing an opening degree of the flow path hole with rotation of the shaft,
    at least a part of the rotation part is rotatably held by the housing,
    the shaft has a one-end-side portion to which the rotational force is transmitted from the drive part and an other-end-side portion opposite to the one-end-side portion in an axial direction of the shaft,
    at least a part of the other-end-side portion is rotatably held by the housing,
    the rotation part includes an intermediate element that couples the rotor to the shaft such that a gap is formed between the other-end-side portion and the rotor,
    the gap is formed between the other-end-side portion and the rotor in a radial direction of the shaft, and
    the housing has an end reception part that receives at least a part of the other-end-side portion.

2. The valve device according to claim 1, wherein an other-end-side bearing part that rotatably supports the other-end-side portion is provided inside the end reception part.

3. The valve device according to claim 1, wherein the end reception part is disposed at a position where the end reception part overlaps at least a part of the rotation part in a radial direction of the shaft so as to function as a rotation guide that guides rotation of the rotation part.

4. The valve device according to claim 1, wherein
    the end reception part is formed in a bottomed cylindrical shape extending along the axial direction of the shaft and having
    a bottom wall that faces an end face of the other-end-side portion, and
    a side wall that surrounds an outer periphery of the other-end-side portion, and
    the end reception part is disposed inside the rotation part so as to overlap at least one of the rotor and the intermediate element in a radial direction of the shaft.

5. The valve device according to claim 1, wherein
    the intermediate element is provided at a position closer to the one-end-side portion in the axial direction of the shaft than the rotor is, and
    the shaft is configured such that an end face of the other-end-side portion is located to overlap an inner side of the intermediate element in a radial direction of the shaft.

6. The valve device according to claim 1, wherein a one-end-side bearing part that rotatably supports the one-end-side portion is provided inside the housing.

7. The valve device according to claim 1, wherein the rotor is made of ceramic.

8. The valve device according to claim 1, which is applied to a fluid circulation circuit including: an exterior heat exchanger that exchanges heat between the fluid and air outside a cabin; and an interior heat exchanger that exchanges heat between air flowing into the cabin and the fluid, wherein
    the housing includes
    a first outlet connected to a fluid inlet side of the exterior heat exchanger and from which the fluid is allowed to flow out to the exterior heat exchanger,
    a second outlet connected to a fluid inlet side of the interior heat exchanger and from which the fluid is allowed to flow out to the interior heat exchanger, and
    an inlet connected to a fluid outlet side of the exterior heat exchanger and a fluid outlet side of the interior heat exchanger and into which the fluid flows from the exterior heat exchanger and the interior heat exchanger, and
    the rotor is rotationally displaced to regulate a flow rate ratio between the fluid passing in the exterior heat exchanger and the fluid passing in the interior heat exchanger.

9. The valve device according to claim 1, which is applied to a fluid circulation circuit including: an exterior heat exchanger that exchanges heat between the fluid and air outside a cabin; a temperature regulating part that regulates a temperature of a heat generator by the fluid; and a bypass part that bypasses the exterior heat exchanger and allows the fluid to flow, wherein
the housing includes
a first outlet connected to a fluid inlet side of the exterior heat exchanger and from which the fluid is allowed to flow out to the exterior heat exchanger,
a second outlet connected to a fluid inlet side of the bypass part and from which the fluid is allowed to flow out to the bypass part, and
an inlet connected to a fluid outlet side of the temperature regulating part and into which the fluid flows from the temperature regulating part, and
the rotor is rotationally displaced to regulate a flow rate ratio between the fluid passing in the bypass part and the fluid passing in the exterior heat exchanger.

10. The valve device according to claim 1, wherein the housing includes
a first inlet into which the fluid flows,
a second inlet into which the fluid flows,
at least one outlet from which the fluid is allowed to flow out to the outside,
a first-inlet-side space communicating with the first inlet, and
a second-inlet-side space communicating with the second inlet, and
the rotor is disposed inside the housing such that a pressure in the first-inlet-side space and a pressure in the second-inlet-side space act in opposite directions to each other.

11. The valve device according to claim 1, wherein a hole is defined in the flow path formation part; the other-end-side portion of the shaft is inserted through the hole, the hole has an inner diameter larger than a diameter of the shaft so that the shaft does not slide on the flow formation part.

12. A valve device comprising:
a housing integrally or separately having a flow path formation part where at least one flow path hole through which a fluid passes is formed;
a drive part that outputs a rotational force; and
a rotation part that rotates about a predetermined axis by the rotational force output from the drive part,
the rotation part includes
a shaft and a rotor that increases or decreases an opening degree of the flow path hole with rotation of the shaft,
at least a part of the rotation part is rotatably held by the housing,
the shaft has a one-end-side portion to which the rotational force is transmitted from the drive part and an other-end-side portion opposite to the one-end-side portion in an axial direction of the shaft,
at least a part of the other-end-side portion is rotatably held by the housing,
the rotation part includes an intermediate element that couples the rotor to the shaft such that a gap is formed between the other-end-side portion and the rotor,
the gap is formed between the other-end-side portion and the rotor in a radial direction of the shaft, and
the housing has an end reception part that receives at least a part of the other-end-side portion.

13. The valve device according to claim 12, wherein a hole is defined in the flow path formation part; the other-end-side portion of the shaft is inserted through the hole, the hole has an inner diameter larger than a diameter of the shaft so that the shaft does not slide on the flow formation part.

14. A fluid circulation circuit comprising:
a plurality of devices in which a fluid passes; and
a valve device that regulates a flow rate of the fluid passing in the plurality of devices, wherein
the valve device includes
a housing integrally or separately having a flow path formation part where at least one flow path hole in which the fluid passes is formed;
a drive part that outputs a rotational force; and
a rotation part that rotates about a predetermined axis by the rotational force output from the drive part,
the rotation part includes a shaft and a rotor having a sliding surface that slides while facing an opening surface of the flow path formation part where the flow path hole is opened, the rotor increasing or decreasing an opening degree of the flow path hole with rotation of the shaft,
at least a part of the rotation part is rotatably held by the housing,
the shaft has a one-end-side portion to which the rotational force is transmitted from the drive part and an other-end-side portion opposite to the one-end-side portion in an axial direction of the shaft,
at least a part of the other-end-side portion is rotatably held by the housing,
the rotation part includes an intermediate element that couples the rotor to the shaft such that a gap is formed between the other-end-side portion and the rotor,
the gap is formed between the other-end-side portion and the rotor in a radial direction of the shaft, and
the housing has an end reception part that receives at least a part of the other-end-side portion.

15. The fluid circulation circuit according to claim 14, wherein a hole is defined in the flow path formation part; the other-end-side portion of the shaft is inserted through the hole, the hole has an inner diameter larger than a diameter of the shaft so that the shaft does not slide on the flow formation part.

* * * * *